US011488241B2

(12) United States Patent
Shoen et al.

(10) Patent No.: US 11,488,241 B2
(45) Date of Patent: *Nov. 1, 2022

(54) METHOD AND APPARATUS FOR MOBILE RENTAL OF VEHICLES

(71) Applicant: U-Haul International, Inc., Phoenix, AZ (US)

(72) Inventors: Edward J. Shoen, Phoenix, AZ (US); Arthur Scott Tonan, Phoenix, AZ (US); John Samuel Wathen, Phoenix, AZ (US)

(73) Assignee: U-HAUL INTERNATIONAL, INC., Phoenix, AZ (US)

( * ) Notice: Subject to any disclaimer, the term of this patent is extended or adjusted under 35 U.S.C. 154(b) by 475 days.

This patent is subject to a terminal disclaimer.

(21) Appl. No.: 15/926,993

(22) Filed: Mar. 20, 2018

(65) Prior Publication Data

US 2018/0225749 A1    Aug. 9, 2018

Related U.S. Application Data

(63) Continuation-in-part of application No. 15/473,429, filed on Mar. 29, 2017, which is a
(Continued)

(51) Int. Cl.
*G06Q 30/06* (2012.01)
*G06Q 20/40* (2012.01)
(Continued)

(52) U.S. Cl.
CPC ..... *G06Q 30/0645* (2013.01); *G06Q 20/4014* (2013.01); *G06T 1/0007* (2013.01); *H04W 4/021* (2013.01); *G06Q 10/02* (2013.01)

(58) Field of Classification Search
CPC ..... G06Q 30/0645; G06Q 10/02; G06Q 50/30
(Continued)

(56) References Cited

U.S. PATENT DOCUMENTS

| 7,991,388 B1 | 8/2011 | Becker et al. |
| 8,577,810 B1 | 11/2013 | Dalit et al. |

(Continued)

FOREIGN PATENT DOCUMENTS

| WO | WO2013137181 | 9/2013 | |
| WO | WO-2014152916 A2 * | 9/2014 | ............. B60R 25/24 |

OTHER PUBLICATIONS

J. Luo, M. Yang and M. Yang, "An Anonymous Car Rental System Based on NFC," 2013 International Symposium on Biometrics and Security Technologies, Jul. 1, 2013, pp. 97-104. (Year: 2013).*

*Primary Examiner* — Jeff Zimmerman
*Assistant Examiner* — Hunter A Molnar
(74) *Attorney, Agent, or Firm* — Richard E. Oney; Venjuris, P.C.

(57) ABSTRACT

A system for rental of vehicles stores reservation information for a customer reservation of a rental vehicle, including a scheduled pickup time and pickup location for the rental vehicle. The system receives information from the customer's a mobile device, including image information and location information. When the customer arrives at the rental pickup location, the system prompts the customer to use the mobile device to capture and upload an image of the customer's driver's license, a current image of the customer, and location information for confirming that the customer image was captured at the rental pickup location. The system displays the uploaded driver's license image, the uploaded customer image and the stored reservation information to an operator to verify the identity of the customer before the customer is approved to pick up the rental vehicle.

22 Claims, 70 Drawing Sheets

Related U.S. Application Data continuation-in-part of application No. 14/341,610, filed on Jul. 25, 2014.

(60) Provisional application No. 61/859,151, filed on Jul. 26, 2013.

(51) Int. Cl.
  *G06Q 10/02* (2012.01)
  *H04W 4/021* (2018.01)
  *G06T 1/00* (2006.01)

(58) Field of Classification Search
  USPC ........................................................ 705/307
  See application file for complete search history.

(56) References Cited

U.S. PATENT DOCUMENTS

| | | | |
|---|---|---|---|
| 9,240,990 B1* | 1/2016 | Ruma | H04L 63/0861 |
| 9,292,982 B1* | 3/2016 | Higgs | G07C 5/008 |
| 10,579,780 B1* | 3/2020 | Carlos | G06F 21/31 |
| 2002/0186144 A1 | 12/2002 | Meunier | |
| 2008/0067242 A1 | 3/2008 | Bonalle et al. | |
| 2009/0321517 A1 | 12/2009 | Deane et al. | |
| 2010/0106608 A1 | 4/2010 | Menendez et al. | |
| 2010/0280700 A1 | 11/2010 | Morgal et al. | |
| 2011/0040692 A1 | 2/2011 | Ahroon | |
| 2011/0058048 A1 | 3/2011 | Elazar et al. | |
| 2011/0112969 A1 | 5/2011 | Zaid et al. | |
| 2011/0173041 A1* | 7/2011 | Breitenbach | G06Q 30/0277 |
| | | | 705/7.13 |
| 2011/0276484 A1* | 11/2011 | Pearson | G06Q 20/40 |
| | | | 705/44 |
| 2011/0288891 A1 | 11/2011 | Zaid et al. | |
| 2011/0307375 A1 | 12/2011 | Maney | |
| 2011/0313937 A1 | 12/2011 | Moore, Jr. et al. | |
| 2012/0070029 A1 | 3/2012 | Muriello et al. | |
| 2012/0105197 A1* | 5/2012 | Kobres | G06Q 10/02 |
| | | | 340/5.72 |
| 2012/0114196 A1 | 5/2012 | Lee | |
| 2012/0200390 A1* | 8/2012 | Saravanan | G07C 9/28 |
| | | | 340/5.61 |
| 2012/0323930 A1 | 12/2012 | Kennberg et al. | |
| 2013/0011820 A1 | 1/2013 | Yancosek | |
| 2013/0073349 A1 | 3/2013 | Kolling | |
| 2013/0221101 A1* | 8/2013 | Lebaschi | G06K 7/10732 |
| | | | 235/454 |
| 2013/0222616 A1* | 8/2013 | Mendis | G06K 9/00637 |
| | | | 348/207.1 |
| 2013/0317693 A1 | 11/2013 | Jefferies | |
| 2013/0325521 A1* | 12/2013 | Jameel | G06Q 10/02 |
| | | | 705/5 |
| 2015/0019304 A1* | 1/2015 | Vakili | G06Q 20/326 |
| | | | 705/13 |
| 2015/0032487 A1* | 1/2015 | Shoen | G06Q 30/0645 |
| | | | 705/5 |
| 2016/0063616 A1 | 3/2016 | Bassett | |
| 2017/0039489 A1* | 2/2017 | Reh | G08C 17/02 |
| 2018/0204279 A1* | 7/2018 | Painter | G06F 16/23 |
| 2019/0095877 A1* | 3/2019 | Li | G06Q 10/20 |

* cited by examiner

FIG. 7

STEP 3 OF 8

Truck Condition — 220

Report Damage

Is there any damage to the truck that has not already been marked with an "X" sticker?

| Yes | No |
|---|---|

222 — Yes · 224 — No

You must provide a description of the damage or photos.

Damage Details

Describe damage here — 226

Please take a photo that clearly shows damaged area.
② See Example

[📷] Add Photo — 228

Credit cards and most auto insurance policies do not cover damage or theft to rental equipment, even if they cover damage to rental cars. As a result, we proudly offer protection packages to relieve you of responsibility for damage to our equipment. Please choose one.

Rental Truck Coverage

○ Safemove
$14.00
Most Popular

○ Safemove Plus
$28.00

○ Immediately reimburse U-Haul for damage.
The rental truck you have selected has an approximate value of up to $45,000 USD. Credit cards and most auto insurance policies to not cover damage to rental trucks.

Continue — 232

Sitemap

Site en farncais | Sitio web en español

To reserve by phone, call

FIG. 18

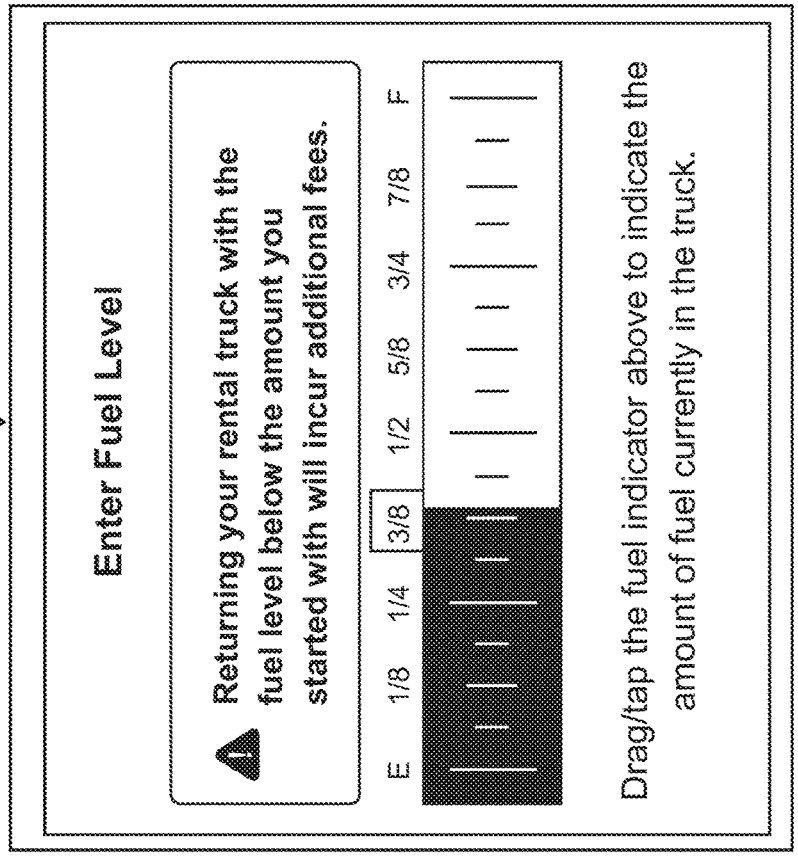
FIG. 41

Cleanliness

Is the trailer clean enough for the next family to use?

Yes | No

Standing at the back of the trailer with the door/gate open, take a photo of the trailer bed and upload it to confirm the trailer is clean.

◉ See Example

◉ Add Photo

Photo

Report Trailer Damage

Is there any new damage to the equipment?

Yes | No

Provide Details About Damage

Please take a photo(s) that clearly shows damaged area(s).

⊙ See Example

📷 Add Photo

U-HAUL

Truck Return Summary

Pending Charges

| | |
|---|---|
| Rental-15' Moving Van | $29.95 |
| SafeMove | $14.00 |
| Mileage-15.0 @ 0.69/mi | $10.35 |
| Environmental Fee | $1.00 |
| Cleaning | $25.00 |
| Rental-Furniture Pads | $5.00 |
| Rental-Utility Dolly | $5.00 |
| Tax | $6.81 |
| Total pending charges | $97.11 |

How would you like to pay?

You will be charged $97.11

[ Select ▼ ]

[ Complete Truck Return ]

FIG. 64

Trailer Return Summary — 410

Pending Charges

| | |
|---|---|
| Rental-5' X 8' Open Trailer | $18.95 |
| Rental-Furniture Pads | $5.00 |
| Rental-Utility Dolly | $5.00 |
| Tax | $3.30 |
| Total pending charges | $32.25 |

How would you like to pay?

You will be charged $32.25

[ Select ▼ ]

[ Complete Trailer Return ]

FIG. 65

≡ U-HAUL

Thank You!

Your rental trailer has been successfully returned and your card has been charged. Please check your email for your receipt.

Next Steps:

1. Make sure you have all your belongings
2. Put the contract in the key/document drop box/slot >

*Help us improve the mobile truck return process by providing feedback about your experience.*

[ Leave Feedback ]

RESERVATION INFORMATION uhaul.com Reservation #23026011 ⬜

Reservation #23026011
2/7/2018 at 3:00 PM to 2/8/2018 at
3:00 PM

Customer Name
John Doe

Entity Number
836033 ⬜

Name of Location
U-Haul Moving & Storage of S. Fort
Worth - Westcreek

Pickup Address
Fort Worth, TX

Hours of Operation
Mon : 7:00 AM - 7:00 PM
Tue : 7:00 AM - 7:00 PM
Wed : 7:00 AM - 7:00 PM
Thu : 7:00 AM - 7:00 PM
Fri : 7:00 AM - 8:00 PM
Sat : 7:00 AM - 7:00 PM
Sun : 9:00 AM - 5:00 PM

Phone Number
(817) 294-7617

MCO Number
836

Entity's Local Time
2/7/2018 3:10:05 PM

OTHER PHOTO

Waiting for customers to upload new photo.

| 1 | Work ID |

CUSTOMER HISTORY

E-ALERTS
This customer is not currently on E-Alert.

PREVIOUS APPROVAL TASKS

| | |
|---|---|
| Successful | 0 |
| Unsuccessful | 0 |
| Abandoned | 0 |

U-MOVE HISTORY

| RESERVED DATE | DOCUMENT NUMBER | RESERVATION | CANCELED | DISPATCH ENTITY |
|---|---|---|---|---|
| 2/7/2018 | 23036011/Doe | One-way | NO | |

UHAULCARSHARE HISTORY
This customer has no equipment history with UhaulCarShare.

HISTORY

| Note | |
|---|---|
| | Add Note |

TEXT CHAT

[Agent] Amanda Shortland - 02/07/2018
02:09 PM
ok, I'll just need you to also submit a photo of
your work Id badge please.

[Customer] John Doe - 02/07/2018
02:09 PM
Sure

Message | Send

RECENT PHOTOS

History

| DATE | AGENT | EVENT |
|---|---|---|
| 2/7/2018 1:46:32 PM | | Created |
| 2/7/2018 1:51:29 PM | | Added to "Awaiting Approval" list. |
| 2/7/2018 1:51:23 PM | Melanie Harvey | Claimed |
| 2/7/2018 1:51:23 PM | Melanie Harvey | Viewed |
| 2/7/2018 1:51:34 PM | Melanie Harvey | Viewed |
| 2/7/2018 1:53:50 PM | Melanie Harvey | Returned to queue. |
| 2/7/2018 1:53:55 PM | Stuart Hoffman | Claimed |
| 2/7/2018 1:53:55 PM | Stuart Hoffman | Viewed |
| 2/7/2018 1:54:21 PM | Stuart Hoffman | Returned to queue |
| 2/7/2018 1:54:42 PM | Melanie Harvey | Claimed |
| 2/7/2018 1:54:42 PM | Melanie Harvey | Viewed |

Note

Add Note

METHOD AND APPARATUS FOR MOBILE RENTAL OF VEHICLES

RELATED APPLICATIONS

This patent application is a Continuation-in-Part Patent Application of and claims priority to U.S. patent application Ser. No. 15/473,429, filed on Mar. 29, 2017, entitled "Method and Apparatus for Online Rental of Vehicles," which is incorporated herein in its entirety by this reference and which claims the benefit of U.S. patent application Ser. No. 14/341,610, filed on Jul. 25, 2014, entitled "Method and Apparatus for Real-Time Qualification of Rental Customers," which is incorporated herein in its entirety by this reference and which claims the benefit of U.S. Provisional Application No. 61/859,151, filed Jul. 26, 2013, entitled "Method and Apparatus for Real-Time Qualification of Rental Customers," which is incorporated herein in its entirety by this reference.

COPYRIGHT NOTIFICATION

Portions of this patent application include materials that are subject to copyright protection. The copyright owner has no objection to the facsimile reproduction by anyone of the patent document itself, or of the patent application as it appears in the files of the United States Patent and Trademark Office, but otherwise reserves all copyright rights whatsoever in such included copyrighted materials.

BACKGROUND

This invention generally is directed to a method and system for rental of vehicles, such as trucks, vans and trailers for self-moving. More specifically, the invention is directed to a method and system for rental of vehicles that allows a customer to dispatch the vehicle and return the vehicle using the customer's mobile device, without requiring special equipment in the rental vehicle and without requiring the presence of rental personnel at the dispatch location or return location.

It is an object of the present invention to provide a method and system that allows rental customers to open a rental contract and pick up their rental equipment without having to wait in line for assistance from a rental representative.

Another object of the present invention is to provide a method and system that allows rental customers to open a rental contract and pick up their rental equipment after normal business hours of the equipment pickup location.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in this specification and the appended claims.

SUMMARY

To achieve the foregoing objects, and in accordance with the purposes of the invention as embodied and broadly described in this document, there is provided a method and system for rental of vehicles using a mobile device. The system includes a database, a processor, an input component and an output component. The database stores reservation information for a customer reservation of a rental vehicle, including a scheduled pickup time and pickup location for the rental vehicle. The input component is operative to receive information from a mobile device used by the customer, including image information and location information. The processor is in communication with the database and the input component and is operative to advise the customer that a mobile device will be required to pick up the rental vehicle. At or about the time when the customer arrives at the rental pickup location, the processor: confirms via the mobile device that the customer is at the rental pickup location; and prompts the customer to use the mobile device to capture an image of the customer's driver's license and to upload the driver's license image to the rental management computer system, wherein the driver's license image includes a photograph of the customer. Also at or about the time when the customer arrives at the rental pickup location, the processor prompts the customer to use the mobile device to capture a current image of the customer and to upload to the rental management computer system the customer image and location information for confirming that the customer image was captured at the rental pickup location. The output component is operative with the processor to display the uploaded driver's license image, the uploaded customer image and the stored reservation information to an operator to verify the identity of the customer before the customer is approved to pick up the rental vehicle.

In some embodiments of the system, the processor is operative to confirm via the mobile device that the customer is at the rental pickup location by using GPS location information for the mobile device. In some embodiments, the processor is operative to confirm via the mobile device that the customer is at the rental pickup location by prompting the customer to include in the uploaded customer image the customer's surroundings showing that the customer is physically present at the rental location or near the rental vehicle. The processor can prompt the customer to capture an image of himself or herself holding the customer's driver's license and to upload the image to the rental management computer system. The processor also can prompt the customer to use the mobile device to capture an image of a barcode on the customer's driver's license and to upload the barcode image to the rental management computer system for decoding. In some embodiments, the rental management computer system can store and use other information associated with the uploaded customer image, such as a date and timestamp that indicates when the customer image was created or meta data associated with the uploaded customer image.

To facilitate verification of the customer, in a preferred embodiment, the system displays the uploaded driver's license image and the uploaded customer image to allow an operator to compare the photograph of the customer in the uploaded driver's license image to the uploaded customer image. Also to facilitate such verification, the system can be used to confirm that the location where the equipment is being dispatched is in the state that issued the customer's license and to confirm that the stored reservation information matches the corresponding information from the uploaded driver' license image.

According to one aspect of the invention, the processor is operative to confirm via the mobile device that the customer is at the designated rental return location before the customer returns the vehicle. To do so, the processor can prompt the customer to cause the mobile device to share its location with the rental management computer system before the customer returns the vehicle. In one embodiment, the processor provides this prompt when the mobile device is located within a pre-defined distance from the rental return location (such as between about one-half mile and one mile).

According to another aspect of the invention, during the rental return process, the system downloads to the mobile device stored fuel level and mileage information for the rental vehicle and prompts the customer to confirm that the downloaded fuel level and mileage information is accurate before driving the vehicle. If the downloaded fuel level and mileage information is not accurate, the system prompts the customer to manually input to the mobile device corrected fuel level and mileage information for the rental vehicle and to use the mobile device to upload the corrected fuel level and mileage information to the rental management computer system before driving the vehicle. The system prompts the customer to use the mobile device to capture image information for confirming the accuracy of the downloaded fuel level and mileage information and to send the captured image information to the rental management computer system, wherein the image information includes one or more images of the mileage and fuel level displays of the rental vehicle.

BRIEF DESCRIPTION OF THE DRAWINGS

The accompanying drawings, which are incorporated in and constitute a part of the specification, illustrate the presently preferred embodiments and methods of the invention and, together with the general description given above and the detailed description of the preferred embodiments and methods given below, serve to explain the principles of the invention.

FIGS. 6-8 show exemplary screen displays of web pages served by the rental management computer system to a customer computer or mobile device that prompt a rental customer to provide information via a checkout process for completing the rental order.

FIGS. 15 and 16 show exemplary web pages displayed on the screen of a mobile computer device for enabling a customer to report existing damage to a vehicle during the dispatch process.

FIGS. 17 and 18 show an exemplary web page displayed on the screen of a customer's mobile device for enabling a customer to select or decline insurance coverage for a rental vehicle during the dispatch process.

FIGS. 38-41 show exemplary web pages displayed on the screen of a customer's mobile device for prompting the customer to input information about the mileage and fuel level for the rental vehicle during the return process.

FIG. 53-57 show a series of exemplary damage report web pages displayed on the screen of a customer's mobile device for entering information during the return process regarding the cleanliness of and any new damage to a rental trailer.

FIG. 64 shows an exemplary return summary web page displayed on the screen of a customer's mobile device for displaying truck rental charges to the customer during the return process and prompting the customer to approve final payment of charges.

FIG. 65 shows an exemplary return summary web page displayed on the screen of a customer's mobile device for displaying trailer rental charges to the customer during the return process and prompting the customer to approve final payment of charges.

FIG. 67 shows an exemplary mobile version of a rental completion web page displayed on the screen of a customer's mobile device for notifying the customer that the return of a trailer has been successfully completed.

DESCRIPTION

Reference will now be made in more detail to presently preferred embodiments of the invention. While the invention is described more fully with reference to these examples, the invention in its broader aspects is not limited to the specific details, representative devices, and illustrative examples shown and described. Rather, the description which follows is to be understood as a broad, teaching disclosure directed to persons of ordinary skill in the appropriate arts, and not as limiting upon the invention.

According to the present invention, a rental customer can dispatch and return a rented vehicle using his or her mobile device. With the dispatch feature, the customer can use the mobile device to provide the information for verifying the customer's identity and for picking up the rental vehicle. After the customer successfully completes the dispatch process, the reservation management computer system activates the reservation. With the return feature, the customer can use his or her mobile device to provide the necessary information to return the vehicle and close the reservation. With these features, no expensive equipment is required in the vehicle to track or communicate information regarding the rental. Rather, the customer's mobile device can be used to provide the information for dispatching the rental vehicle, including verifying the customer's identity, and for returning the rental vehicle. Although the present invention is described with respect to truck and trailer rentals, it will be understood that it also can be used with rentals of other types of vehicles or equipment.

Computer Network System

Figure 1:
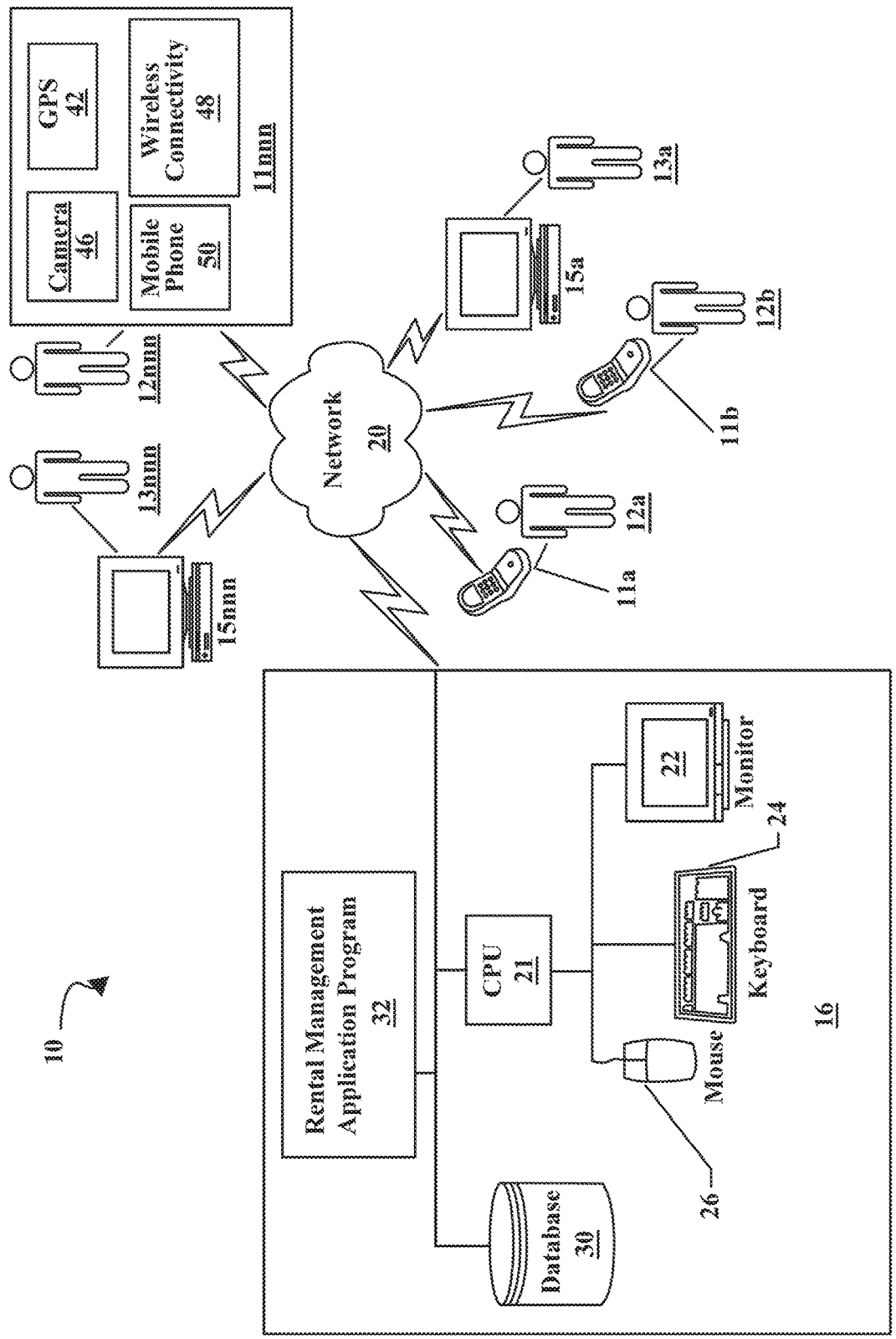
FIG. 1 is a functional block diagram of a preferred computer system and a network for practicing the present invention, including a rental management computer system (which can be used to host a website), and mobile computer devices.

According to a presently preferred embodiment and method of the invention, a rental management computer system 10 is used to manage and provide rental services, such as truck and trailer rentals, to customers. FIG. 1 illustrates a preferred computer network system 10 for doing so. The computer network system 10 includes a rental management computer system 16, which hosts a website and stores and processes the information described below for creating an account for a customer, quickly qualifying the customer for a rental transaction, processing the transaction and confirming the transaction to the customer. Customers 12 can access and communicate with the rental management computer system 16 via mobile computer devices 11a, 11b and 11nnn, (where nnn refers to any number of users and user devices) coupled to the rental management computer system 16 via a computer network 20, such as the Internet, or by other suitable communications means. In addition, in a presently preferred embodiment, rental customers 13a-13nnn can use computers 15a-15nnn coupled to the computer system 16 via the computer network 20. In a preferred embodiment of the invention, the computer network 20 comprises the Internet and the mobile computer devices 11 and computers 15 each have a web browser application for accessing content on the World Wide Web. The mobile computer device 11 can be, by way of example, a smart phone or similar device. In a preferred embodiment, the mobile computer device 11 includes a web browser, a global positioning system (GPS) program 42, a digital camera 46, wireless connectivity 48 and a mobile telephone 50. Upon reading this specification, those skilled in the art will understand that, under appropriate circumstances, considering issues such as developments in computer hardware, software and connectivity, etc., other network configurations and devices also may suffice. For example, the mobile computer device 11 can be any mobile device suitable for communication over the Internet, including without limitation, smartphone, PDA, handheld mobile digital electronic device, tablet computer, portable computer or the like.

Still referring to FIG. 1, the rental management computer system 16 includes a central processing unit (CPU) 21 for processing data and program instructions. The rental management computer system 16 also includes input and output devices, as is well known in the art. For example, the rental management computer system 16 preferably includes a display screen or monitor 22, a keyboard 24, a mouse 26, a printer (not shown), etc. The rental management computer system 16 further includes data storage and memory devices, as are known in the art, for storing a database 30. The database 30 is used to store customer data and other rental data required to provide the functionality described below. Preferably, the database 30 is a relational database, as is well known in the art. A rental management application program 32 is operable with the database 30 and the mobile computer device 11 to provide the functionality described below. In a presently preferred embodiment, the rental management application program 32 is written using the ASP.NET MVC framework utilizing the Model-View-Controller (MVC) architectural pattern, marketed by Microsoft Corporation of Redmond, Wash. The database 30 is implemented using the SQL Server database management system, also marketed by Microsoft Corporation. Upon reading this specification, those skilled in the art will understand that, under appropriate circumstances, considering issues such as developments in computer hardware, software and connectivity, etc., other operating systems, programming languages and database management systems can be used.

Rental Reservation

FIGS. 2-5 illustrate exemplary sections of web pages served by the rental management computer system 16 to a customer computer 15 or mobile device 11, through which a customer can reserve a vehicle for self-pickup and return according to the present invention.

Figure 2:
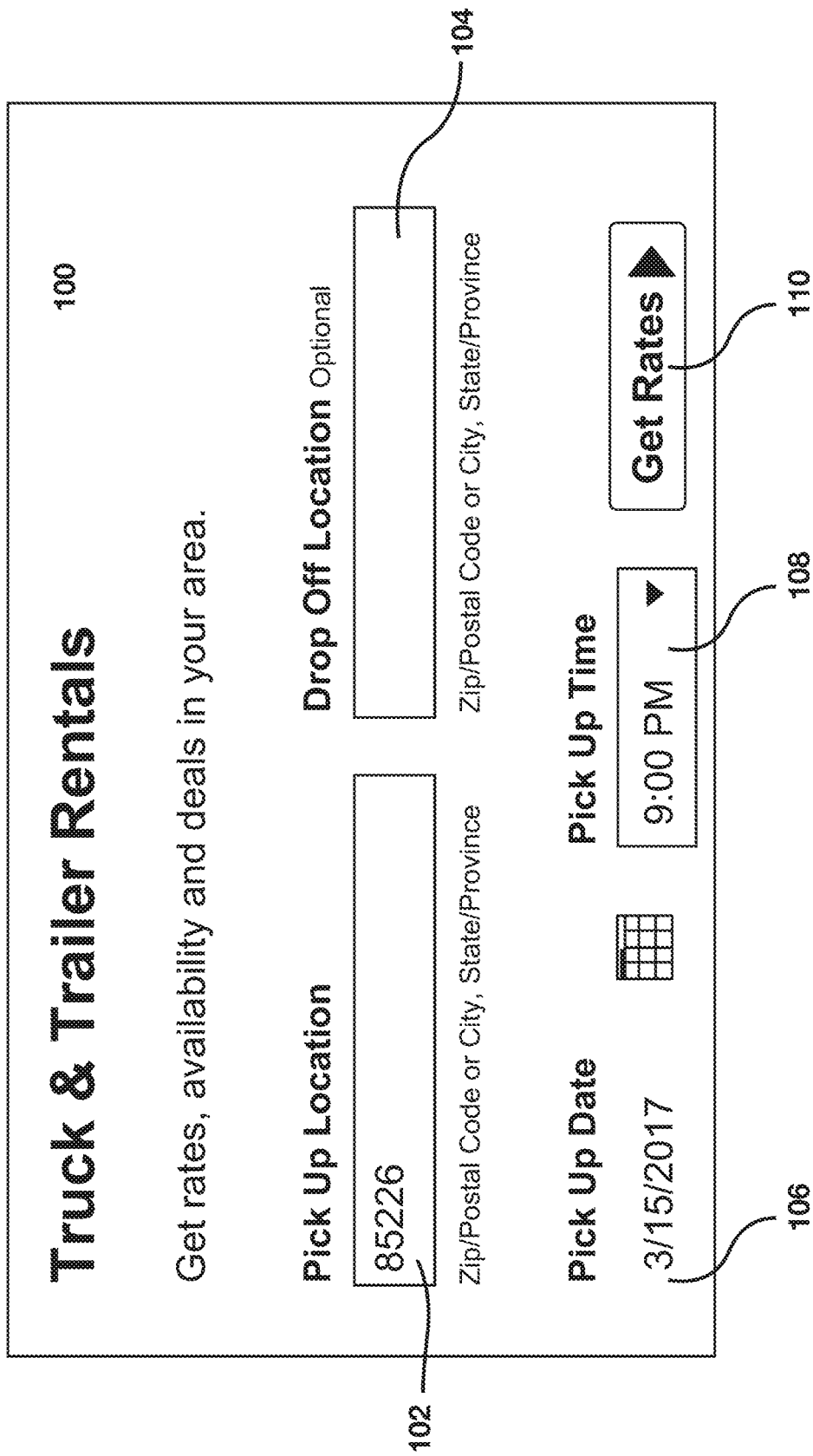
FIG. 2 shows a portion of an exemplary web page served by the rental management computer system to a customer computer or mobile device, with which the customer can reserve a vehicle (such as truck, van or trailer) for a requested pickup location, date and time.
Figure 3:
FIG. 3 shows a portion of an exemplary vehicle selection web page served by the rental management computer system to a customer computer or mobile device, which allows the customer to select a vehicle to rent.
Figure 4:
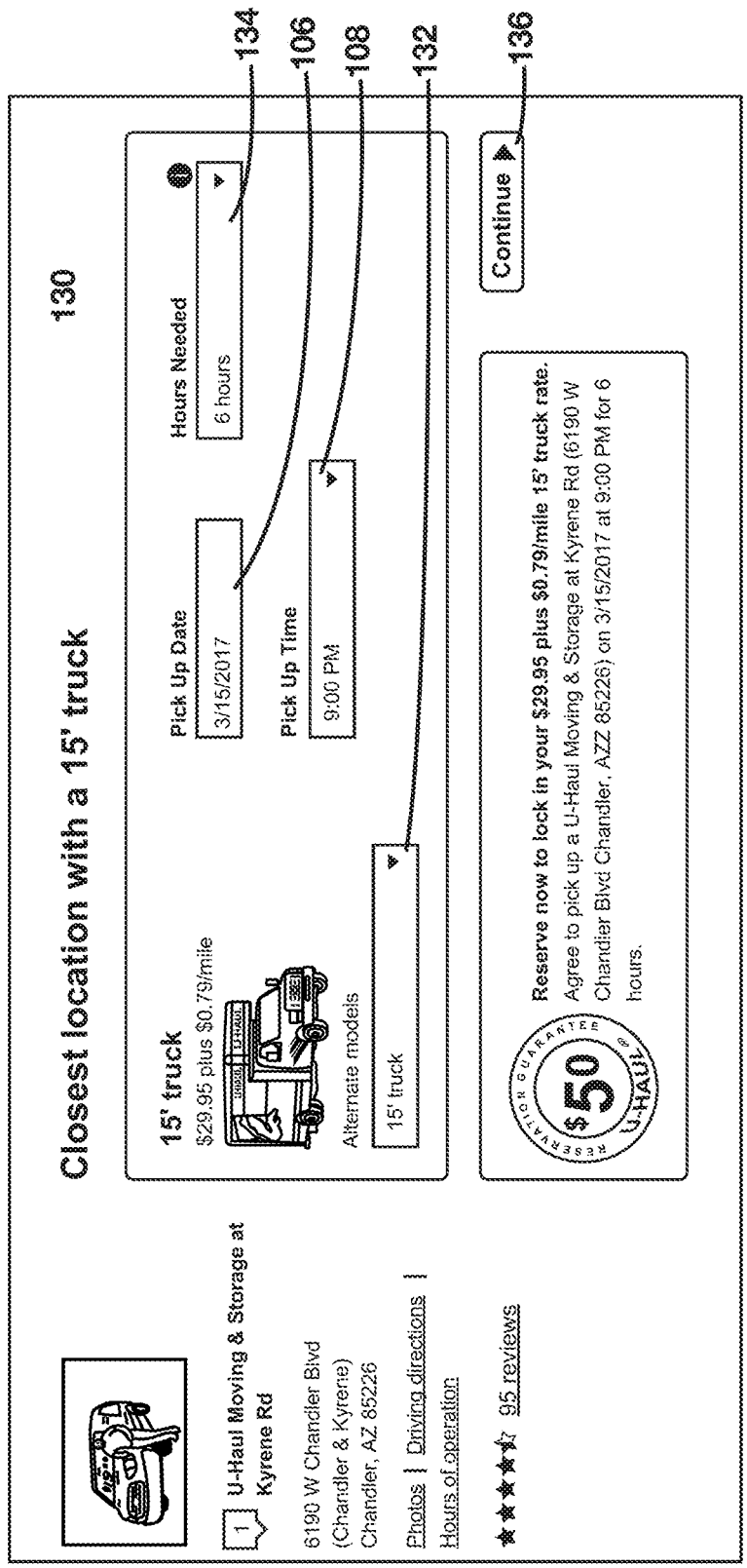
FIG. 4 shows a portion of an exemplary web page served by the rental management computer system to a customer computer or mobile device, that displays a pickup location for the selected vehicle and allows the customer to confirm the requested rental pick up date, time and rental period.

After a customer accesses the web site of the rental management computer system 16 with the customer's computer 15 or mobile device 11, the system 16 displays a web page including a reservation input section 100 from which the customer can select a pickup location, date and time period for the rental. FIG. 2 shows an exemplary reservation input section 100 for this purpose, which includes input fields for a rental pick up location 102, a drop off location 104, a pick up date 106, and a pick up time 108. After the customer enters the required information in these fields, he or she can select a Get Rates button 110 to retrieve information from the rental management computer system 16 about vehicle availability, rates and deals for the requested rental pick up location, date and time. FIG. 3 shows one exemplary embodiment of a vehicle selection page 120 returned by the rental management computer system 16 and displayed on the customer computer 15, with which the customer can select an available type of truck, van or trailer for rental. In a presently preferred embodiment, the rental rate page 120 can be displayed to a potential customer does not have an account with the rental management computer system 16 so that the customer can view vehicle information and select a vehicle of interest without having to create an account. Using the vehicle selection page 120, the user can choose a select button 122 for a displayed vehicle to continue with the rental reservation process. In response, the system 16 can cause the customer's computer 15 or mobile device 11 to display a reservation scheduling page, which can include a pickup location section 130, such as that shown in the example of FIG. 4, showing the address of the closest rental location (or other location selected by the customer) that has the selected vehicle type available for the requested rental pick up date, time and rental period. In the embodiment shown in FIG. 4, the pickup location section 130 also includes the pickup date field 106, pick up time field 108, an alternate vehicle models field 132 and a rental time period field 134, with which the customer can modify his or her reservation request. After completing this information, the customer can submit the requested reservation to the rental management computer system 16 by selecting a Continue button 136.

Figure 5:
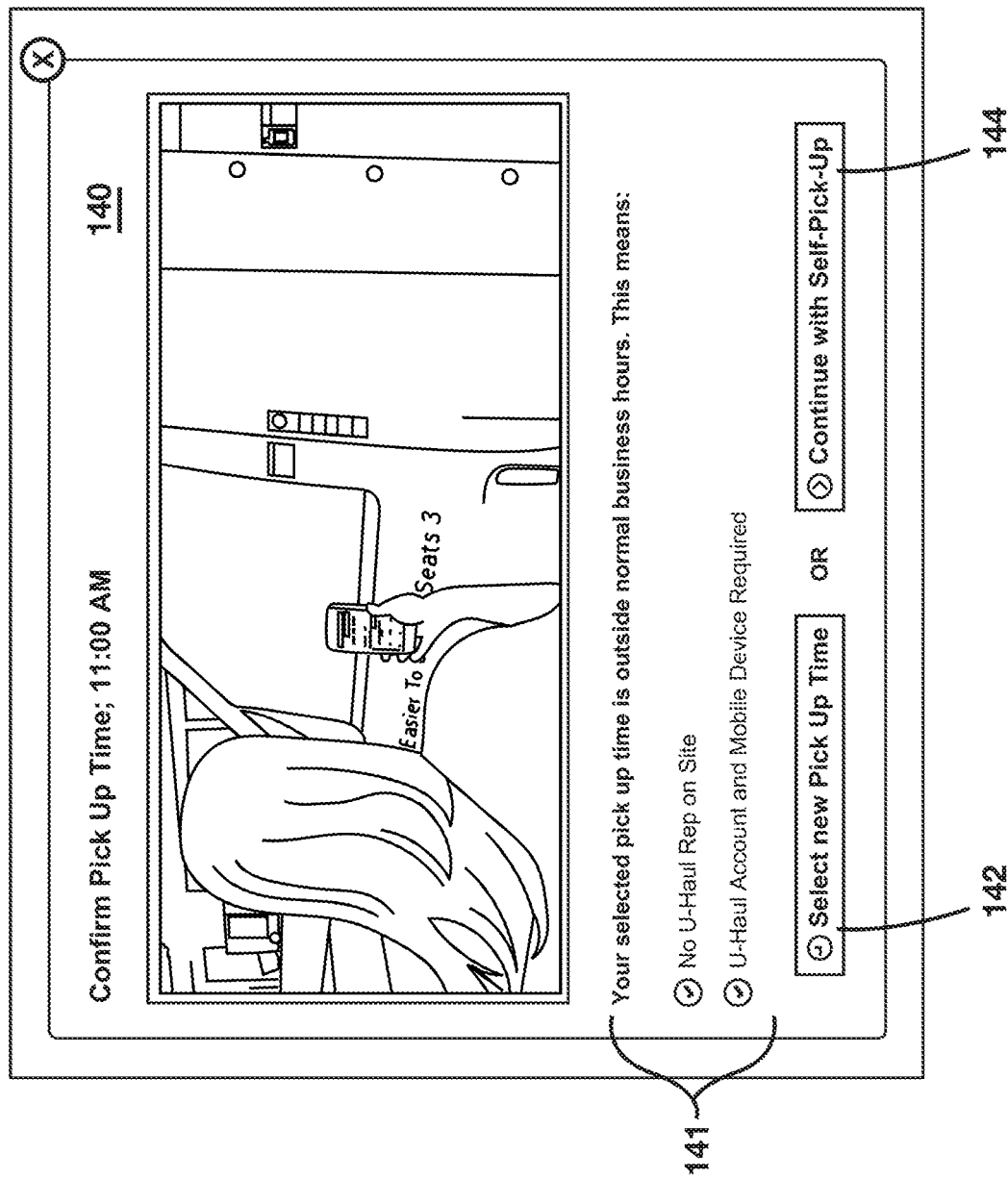
FIG. 5 shows an exemplary pop-up window displayed on the customer's computer or mobile device to notify the customer that the selected pick-up time is outside of normal business hours for the pick-up location.

If the customer has requested a rental pick up time that is outside of normal business hours of the rental pick up location, the system 16 will notify the customer that the selected pickup time is outside of normal business hours. FIG. 5 shows an exemplary pop-up window 140 that the system causes the customer's computer or mobile device 11 to display in order to provide the customer with this notification. The pop-up window 140 includes a message 141 notifying the customer that for such a pickup time, there will not be a rental representative on site at the rental location and the customer will need to have an account with the rental management computer system and a mobile device to complete the reservation process and pick up the rental vehicle. The pop-up window 140 also prompts the customer to select a new pickup time by selecting a New Pickup Time button 142 or to continue with a self-pickup reservation by selecting a Continue with Self-Pickup button 144. If the reservation pickup time is during business hours, the customer can be given an option to use the self-pickup in connection with an express online check-in process as described below.

Figure 6:
Figure 7:
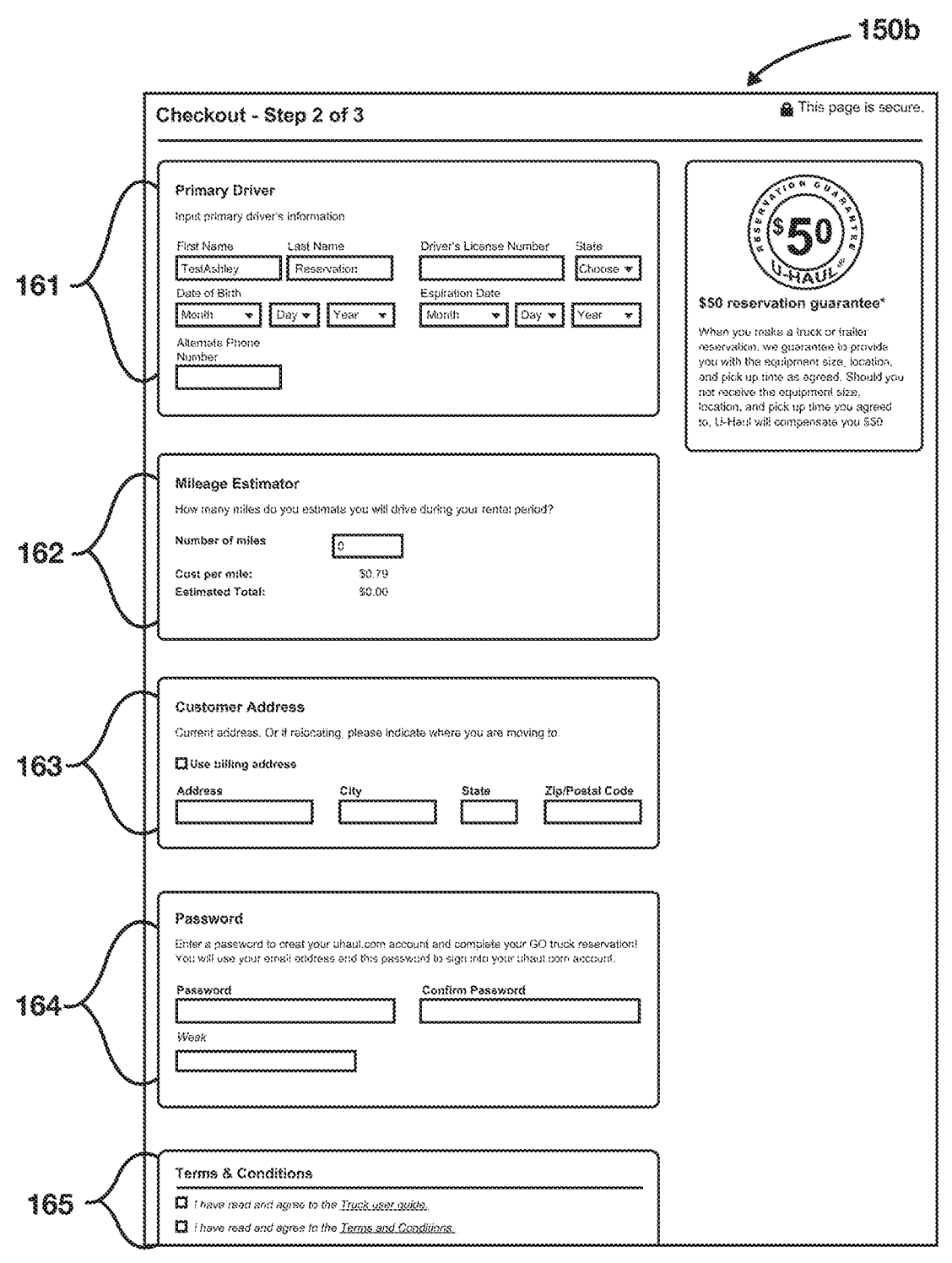
Figure 8:
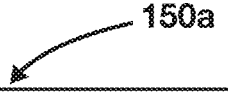

After the customer submits the requested reservation information, the system will walk the customer through a checkout process to complete the rental order. FIGS. 6-8 show exemplary checkout pages 150 served by the system 16 and displayed on the screen of the customer's computer 15 or mobile device 11, which that illustrate one version of this process. Referring to FIG. 6, the checkout page 150a prompts the customer to enter information into input fields of a billing information section 151 and a payment information section 152. After entering the information required by the fields of the billing information section 151 and payment information section 152, the customer can select a Next button 154 to store the entered information and continue to the next step of the checkout process. If the customer already has an account, he or she can sign in to the account using a sign-in section 153 and the system 16 can prepopulate these fields with information previously provided by the customer and stored in the database 30.

Figure 9:
FIG. 9 shows an exemplary embodiment of an account verification web page displayed on a customer's computer or mobile device, with which the customer can verify his or her new account with the rental management computer system.

In the next step, as shown in FIGS. 7 and 8, the system causes the customer's computer 15 or mobile device 11 to display a checkout page 150b, which prompts the customer to enter information into input fields of a primary driver information section 161, a mileage estimator section 162, a customer address section 163 a terms and conditions section 165. If the customer does not have an account, the checkout page 150b will also display a password section 164 with which the customer can create an account using the information entered in the input fields of the checkout pages 150. Referring to FIG. 8, if the customer's requested reservation is for a pickup time during business hours, the checkout page 150b displays a self-pickup section 166 that gives the customer the option of using or not using the pickup process described below for picking up the rental vehicle using a mobile device. If the customer's requested reservation is for a pickup time that is after business hours, the checkout page 150b will only display the option of using the pickup process described below for after-hours pickup. If the customer has created a new account during the checkout process, the rental management computer system 16 can send a verification code to the customer via an email or text and will cause the customer's computer 15 or mobile device 11 to display an account verification page 170 with which the customer can verify their new account. FIG. 9 shows one embodiment of an account verification page for this purpose.

Customer Pickup (Dispatch) of Rental Vehicle

Figure 11:
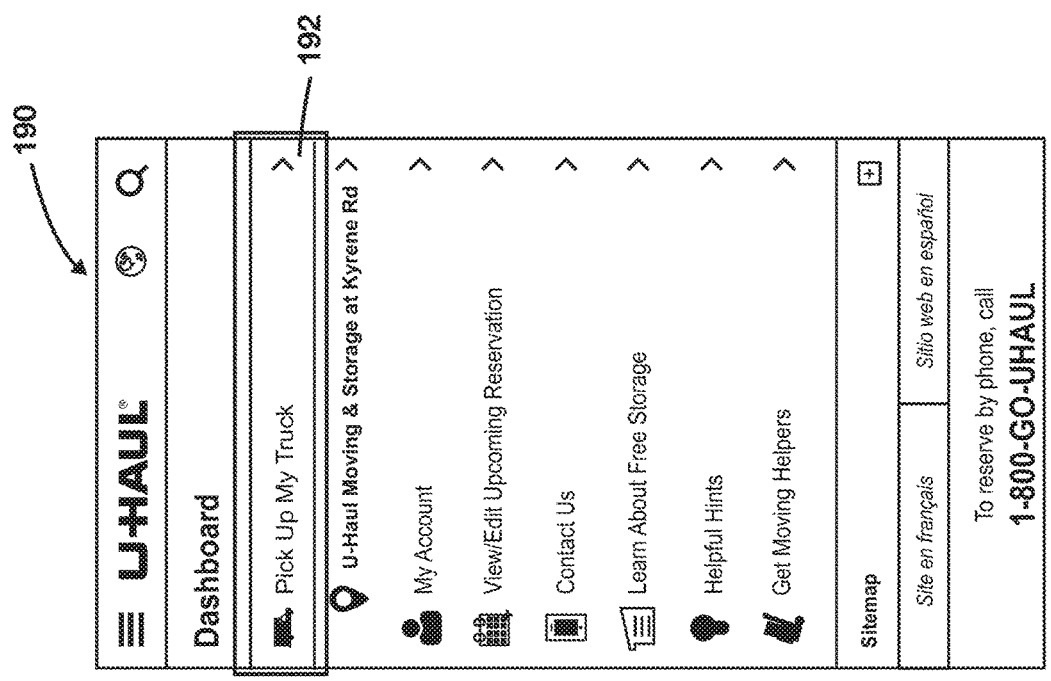
FIG. 11 shows an exemplary embodiment of a dashboard page displayed on the screen of a customer's mobile computer device, from which page the customer can begin the process for dispatching equipment that they have reserved for rental according to the present invention.
Figure 12:
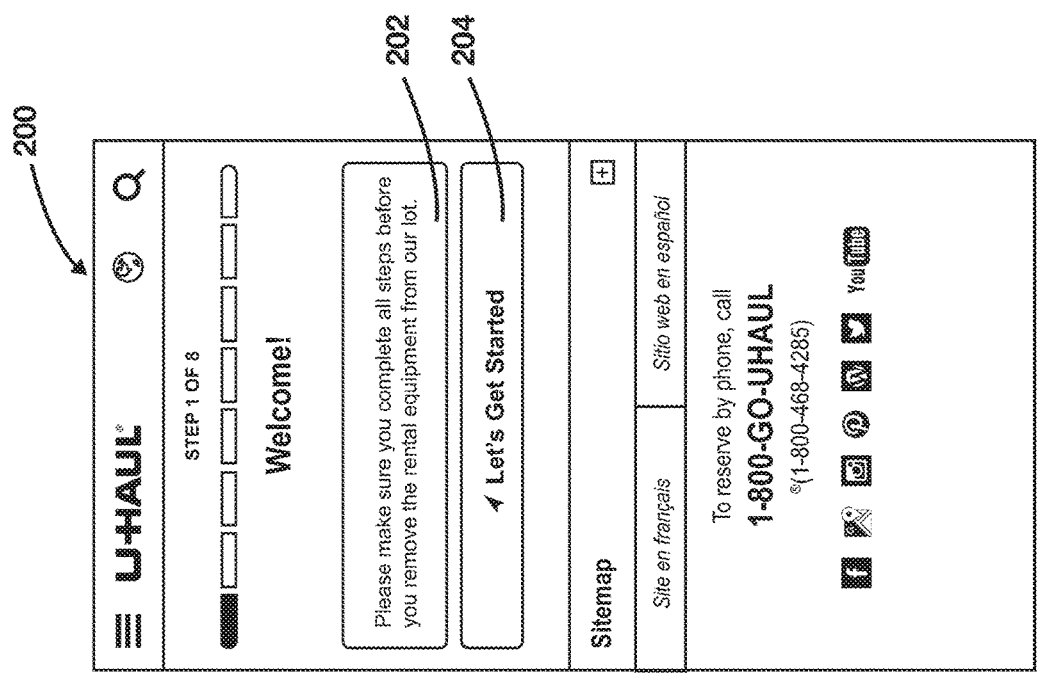
FIG. 12 shows an exemplary welcome web page displayed on the screen of a customer's mobile computer device instructing the customer to complete all of the steps of the dispatch process before removing the rental equipment from the rental lot.
Figure 13:
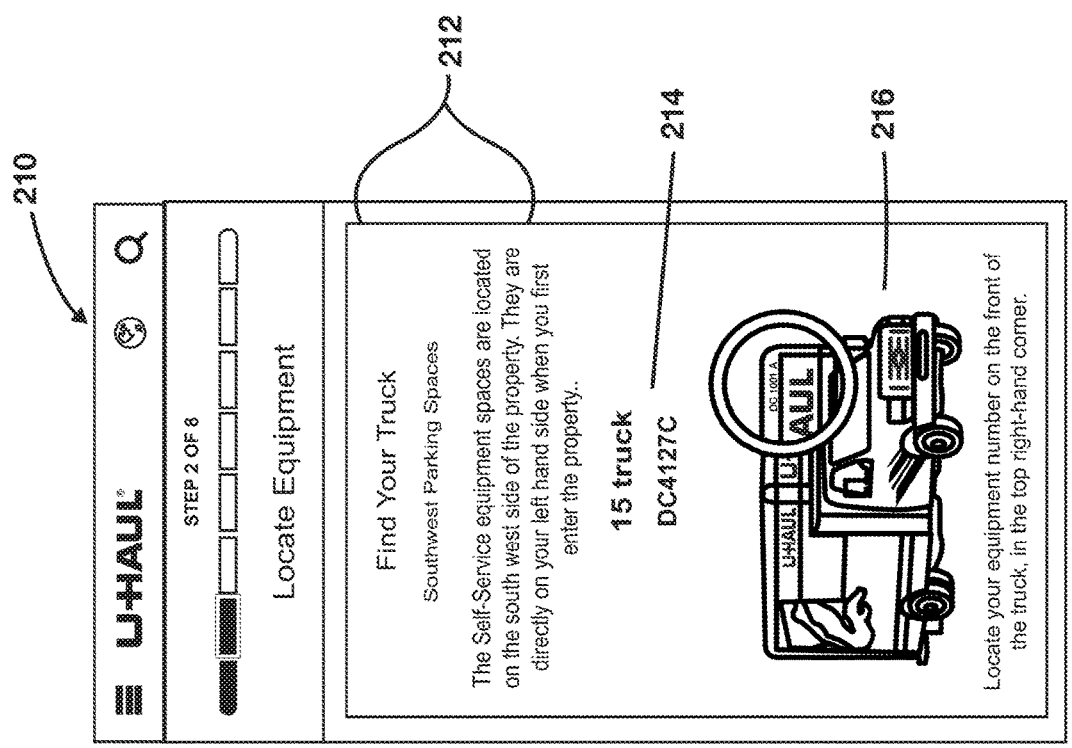
FIGS. 13 and 14 show exemplary web pages displayed on the screen of a mobile computer device for enabling a customer to locate the vehicle being rented during the dispatch process.
Figure 14:
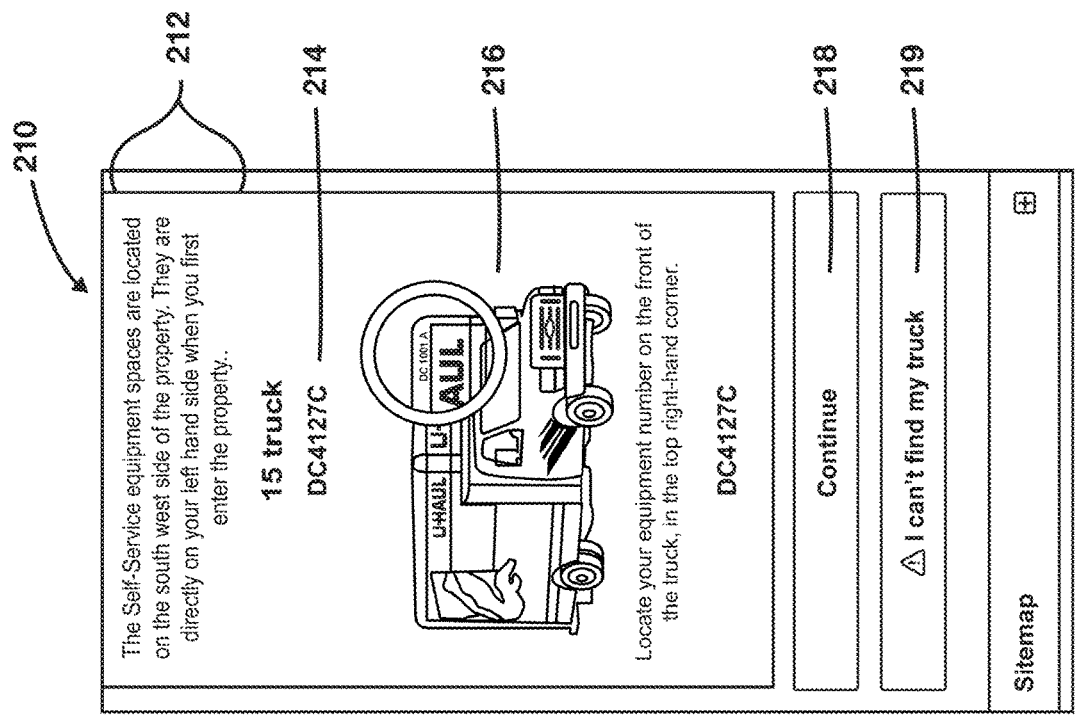

After the customer has made a reservation to rent a vehicle for pickup as described above, he or she can take possession of the rental vehicle using the vehicle pickup process according to the present invention. A mobile device 11 is required to complete the pick-up process according to the present invention. To begin the process, the customer directs their mobile device browser to the rental website, which will display a landing page 180, such as that shown in FIG. 10, with which the customer can sign in to their account. After the user signs in, the system 16 causes the mobile device 15 to display a dashboard page 190, such as that shown in FIG. 11. If the customer has a pending reservation, the dashboard page 190 will display a vehicle pickup menu option 192, which the user can select to begin the process of picking up the rental vehicle. In one preferred embodiment, the customer can access this information up to a pre-defined time (such as one hour) before the scheduled vehicle pick-up time if the vehicle is available. In response, as shown on FIG. 12, the mobile device 11 displays a welcome page 200, which directs the user to complete all of the steps of the pickup process before removing the rental equipment from the rental lot. To begin the vehicle pickup process, the user selects a start button 204, which causes the mobile device 11 to share its GPS location with the rental management computer system 16. As shown in FIGS. 13-14, the system then causes the mobile device 11 to display an equipment location page 210, which displays directions 212 to an equipment pick-up area and an equipment identifier 214 along with a sample picture 216 of where the equipment identifier 214 is located on the equipment. The directions 212 are stored in the system 16 for a particular rental facility location and type of equipment. To confirm that the customer has located the equipment and to proceed to the next step, the customer selects a continue button 218 (see FIG. 14). The equipment location page 210 also includes a help button 219 (shown in FIG. 14 with the label "I Can't Find My Truck") which the customer can select if he or she cannot find the rental vehicle. If the customer selects this button during business hours, the mobile device 15 will instruct the customer to go inside the renter's facility. If the customer selects the help button 219 after business hours, the mobile device 15 can instruct him or her to contact after-hours assistance, such as a general manager of the rental facility.

Figure 16:
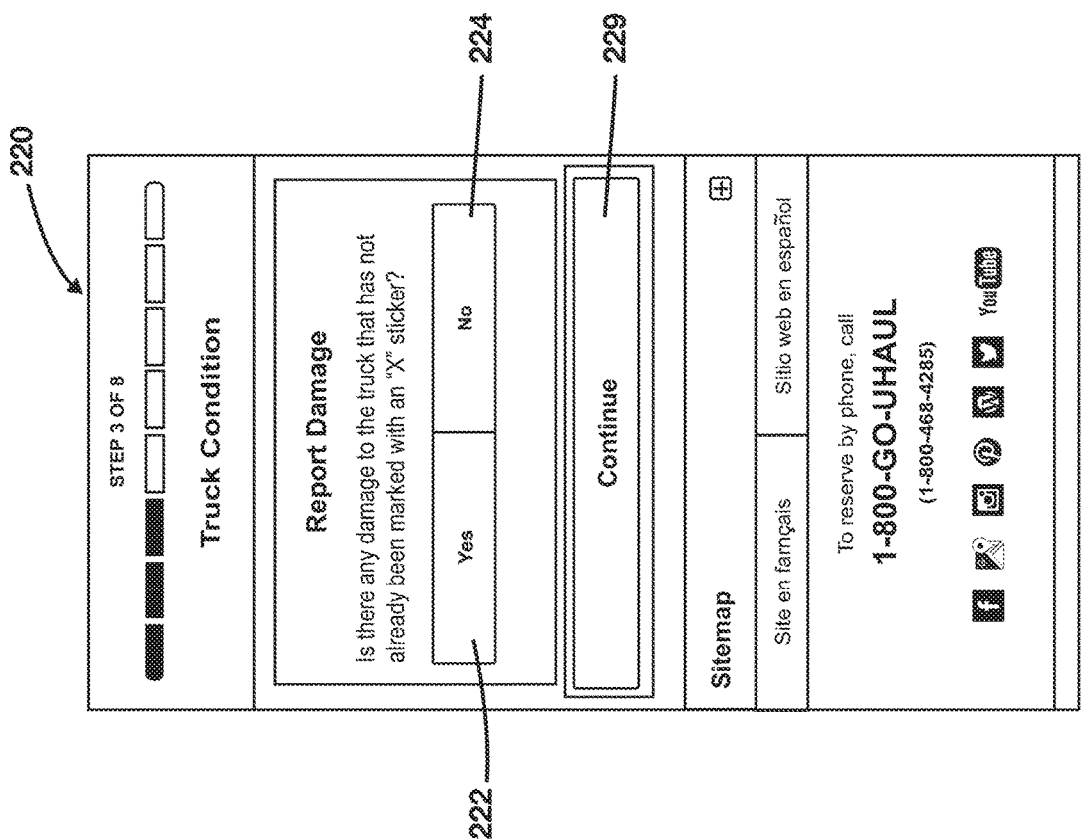

After the customer locates the rental equipment and selects the continue button 218, the system 16 instructs the customer to report any existing damage to the equipment that has not previously been identified and marked. Referring to FIGS. 15-16, in one embodiment the mobile device 16 displays a vehicle condition page 220, which prompts the customer to click a Yes button 222 if he or she finds any such damage, or a No button 224 if no damage is found. If the customer selects the No button 224, the vehicle condition page 220 will display a continue button 229, which the user selects to proceed to the next step of the equipment pick-up process. If the customer selects the Yes button 222, the system 16 will cause the mobile device 15 to prompt the customer to enter a text description of the damage in a text field 226 and to take a photograph of the damage and upload it to the system 16 by selecting an Add Photo button 228. After the customer has reported all of the unmarked existing damage to the equipment, he or she can select the Continue button 229 to proceed to the next step of the pickup process.

Figure 17:
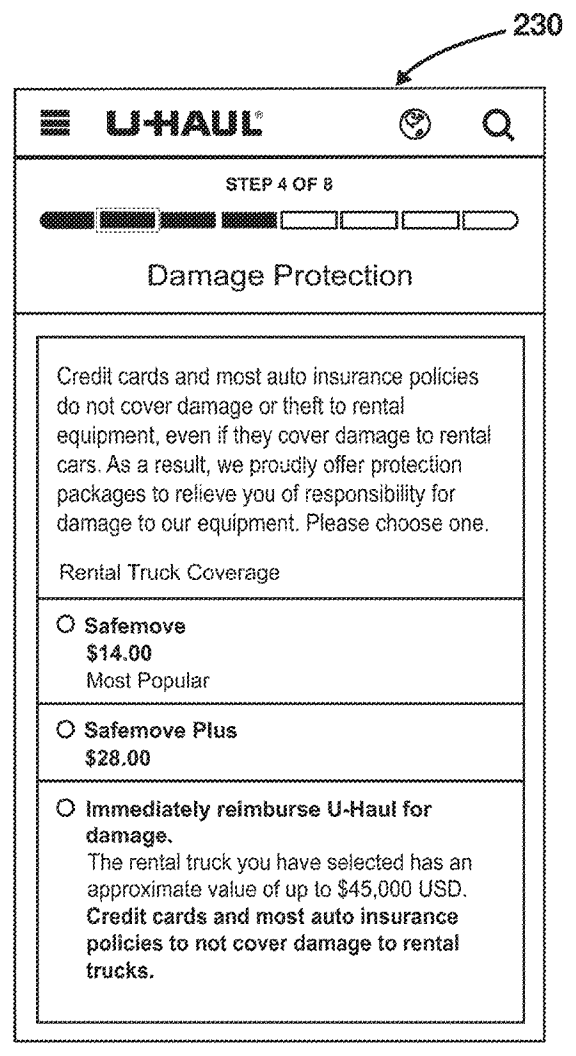

In response, the system 16 causes the mobile device 15 to prompt the customer to either select or decline insurance coverage for the rental equipment. FIGS. 17-18 show an example of a damage protection page 230 displayed on the mobile device 15 for this purpose. After selecting or declining coverage, the customer can proceed to the next step of the equipment pick-up process by selecting a continue button 232 on the damage protection page 230 (see FIG. 18).

Customer Verification

Figure 19:
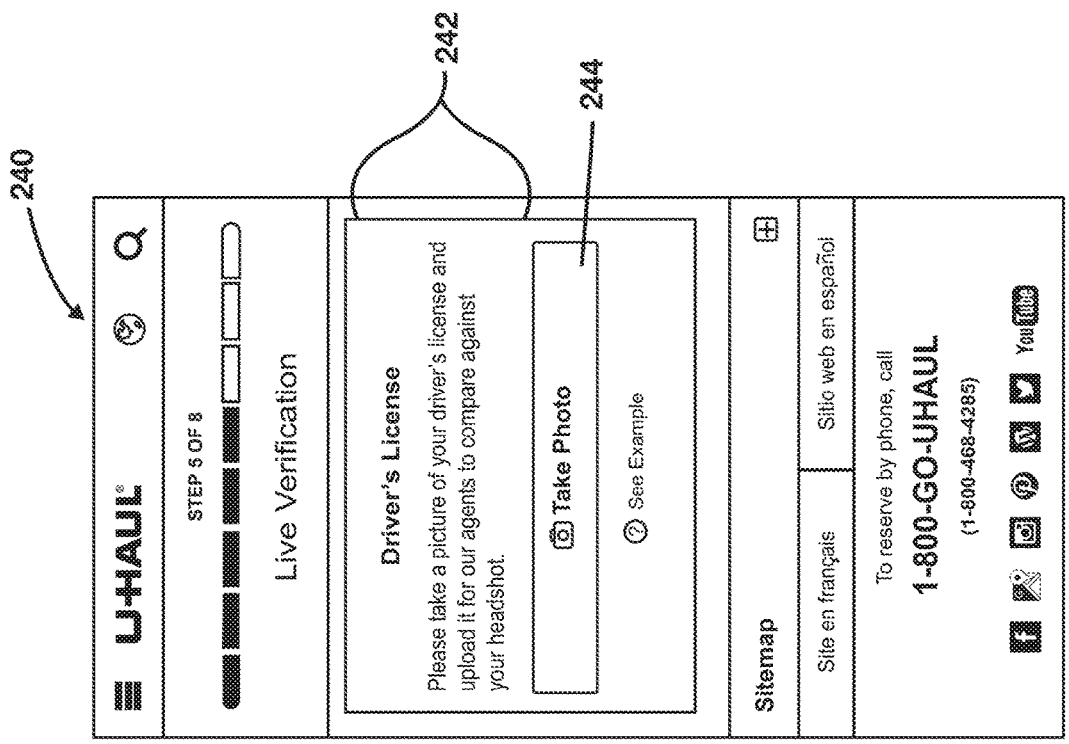
FIG. 19 shows an exemplary web page displayed on the screen of a customer's mobile device for uploading a current image of the customer's driver's license the rental management computer system during the dispatch process.

In the next step of the pickup process, the system 16 causes the mobile device 15 to verify the identification of the rental customer at the time of pickup. To do so, the system 16 requires the customer to upload a current photograph of himself or herself for comparison against a photograph of the customer's driver's license. FIGS. 19-23 show an exemplary customer verification page 240 served by the rental management computer system 16 to the mobile computer device 11 for this purpose. Referring to FIG. 19, the customer verification page 240 includes an instruction 242 to the customer to take a photograph of his or her driver's license and upload it to the system 16. The verification page includes a Take Photo button 244 to prompt the customer to use the camera 46 of their mobile computer device 11 to take this photograph. When the customer selects the Take Photo button 244, the mobile computer device 11 activates the camera 46 so that the customer can take the photograph, which is then displayed on the verification page 240 in a manner similar to that shown in FIG. 49. The mobile computer device 11 prompts the customer to upload the driver's license image file to the system 16, which stores the file. When the image file is uploaded, the system 16 stores date and timestamp information for the upload.

In some embodiments, the customer verification page 240 also includes an instruction 242 to the customer to capture an image of a barcode on his or her driver's license and upload the barcode image to the system 16. Such driver's license barcodes include information about the license, such as the licensed driver's full name, driver's license number, date of birth, and driver's license expiration date. The system 16 can include barcode reader software for decoding this information from the barcode image, which decoded information can then be stored in the database 30.

Figure 20:
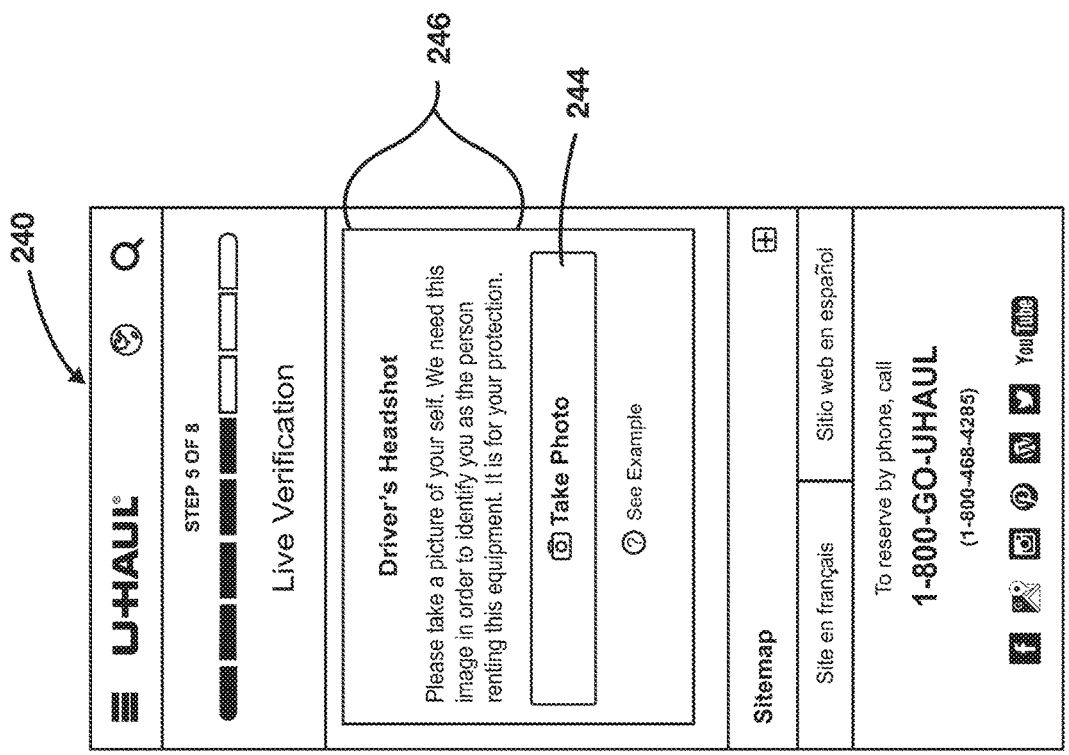
FIG. 20 shows an exemplary web page displayed on the screen of a customer's mobile device for uploading a current photograph of the customer's face to the rental management computer system during the dispatch process.
Figure 21:
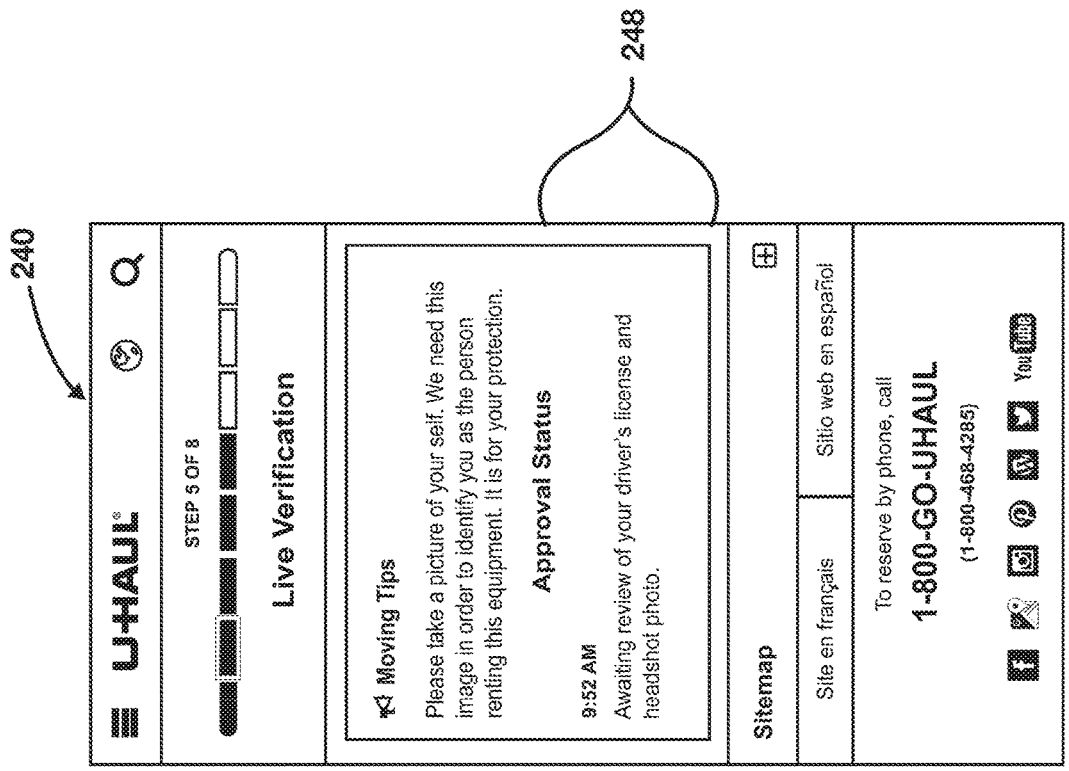
FIGS. 21-23 show a series of exemplary web pages displayed on the screen of a customer's mobile device providing updates on the process of verifying the customer's identity during the dispatch process.
Figure 22:
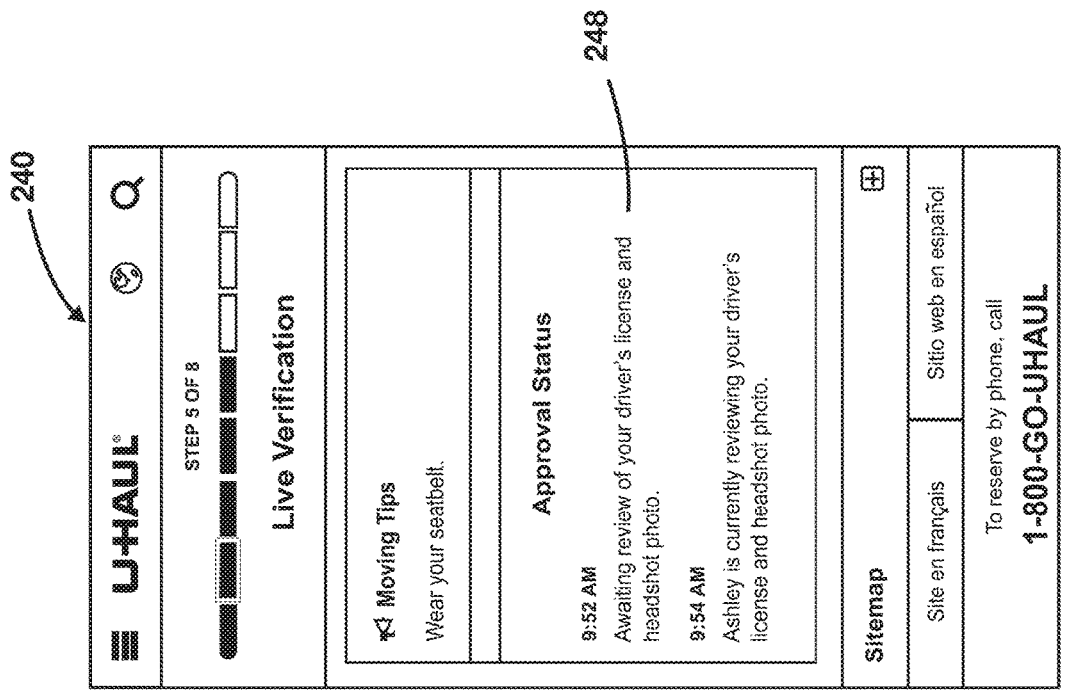
Figure 23:
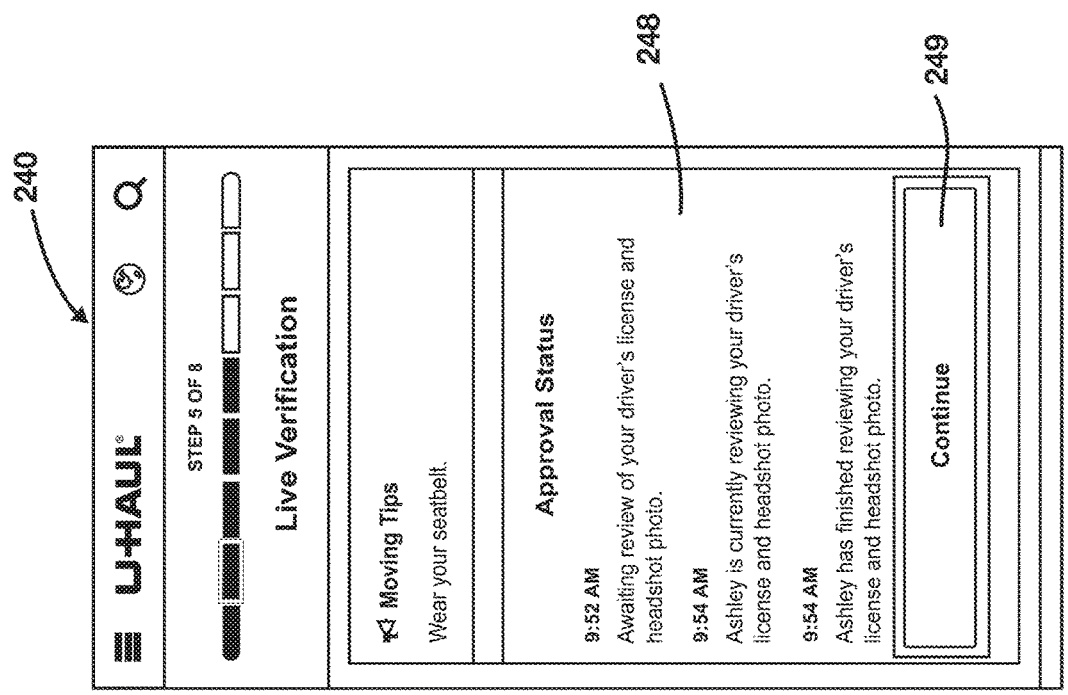
Figure 24:
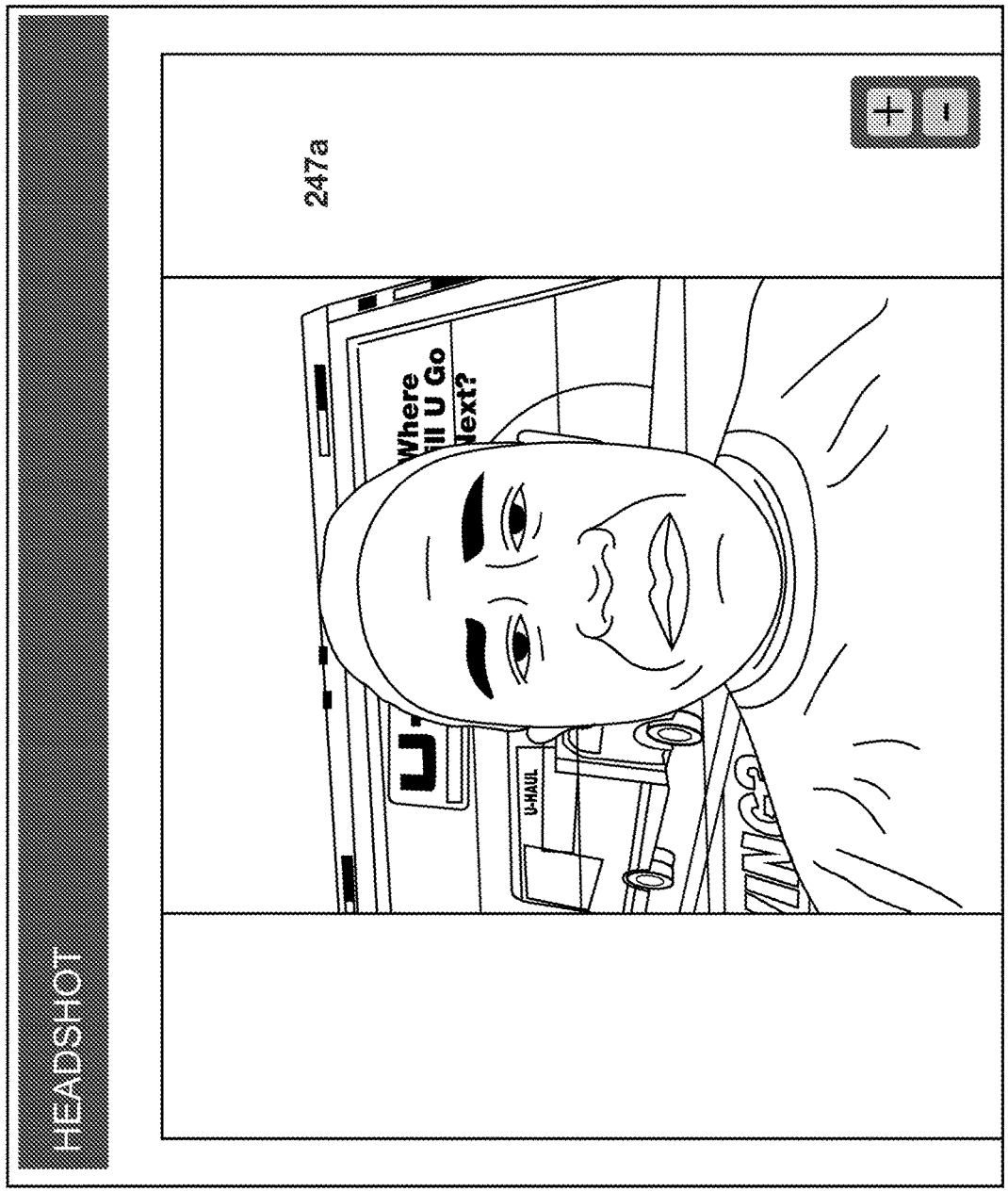
FIGS. 24-25 show examples of photographs taken by customers of themselves and uploaded to the rental management computer system during the dispatch process.
Figure 25:
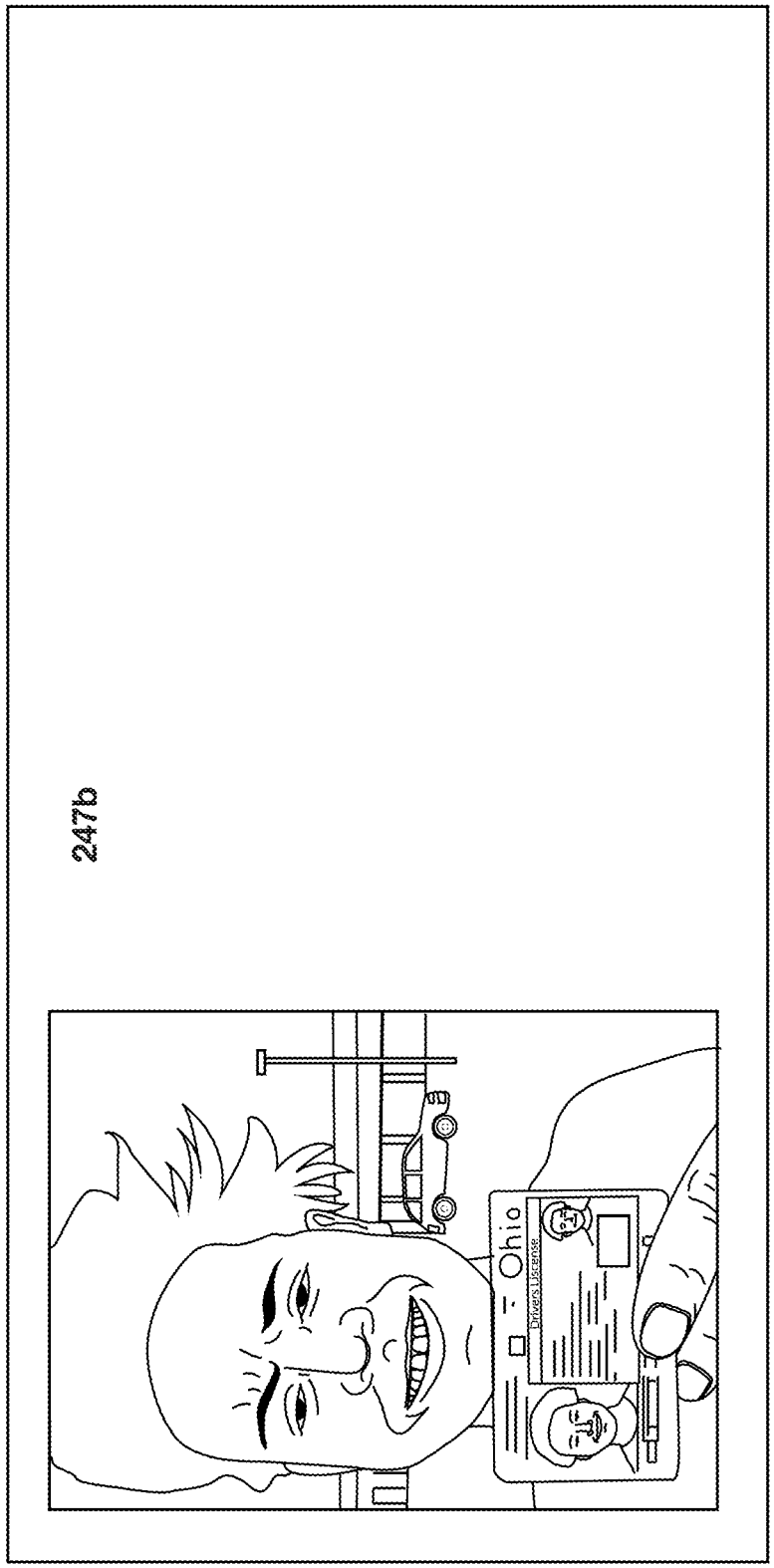

Referring to FIG. 20, after the user has uploaded an image of his or her driver's license, the customer verification page 240 displays an instruction 246 to the customer to take a photograph of his or her face and upload it to the system 16 for comparison against the uploaded photograph of the customer's driver's license. When the customer selects the Take Photo button 244, the mobile computer device 11 activates the camera 46 so that the customer can capture an image of himself or herself for uploading. After the image is captured, the mobile computer device 11 prompts the user to upload the image file to the system 16, which stores the file for comparison with the uploaded image of the customer's driver's license image by rental verification personnel. When the image file is uploaded, the system 16 stores date and timestamp information or other meta data for the upload. FIGS. 24-25 show two examples of photographs taken by customers of themselves and uploaded to the rental management computer system 16 during the dispatch process. After the customer's photograph is uploaded, the customer verification page 240 displays an approval status message 248, which includes the status of the review of the uploaded photographs of the customer and the driver's license, and the time of the status. As shown in FIGS. 21-23, as the customer's information and photographs are reviewed, the system 16 can cause the mobile device 15 to display to the customer updates on the approval status.

The purpose of the customer verification process is to confirm that the person picking up the reserved equipment is the same as the customer who made the rental reservation. According to one preferred process for customer verification, the review of the customer's information can include one or more of the following steps:

- Confirming that the location where the equipment is being dispatched is in the state from which the customer's license was issued.
- Confirming that the information entered by the customer in the primary driver information section 161 of the checkout page 150*b* (see FIG. 7) matches the corresponding information on the uploaded photograph of the customer's driver' license. This can include, for example, the customer's full name, driver's license number, date of birth, and driver's license expiration date.
- Confirming that the uploaded driver's license photograph matches the uploaded customer photograph.
- Confirming that the uploaded customer photograph was taken at the time of the rental.
- Confirming that the uploaded customer photograph was taken at the rental location or next to the vehicle being rented.
- Confirming from the uploaded customer photograph that the customer appears to be alert and unimpaired.

Some illustrative examples of situations that may arise during the review process, and the presently preferred business rules for responding to these situations are set forth below.

Example One

Temporary Licenses

If a customer uploads a photograph of a temporary license printed on paper, he or she will be required to photograph and upload a secondary form of identification that includes a photograph associated with a name identification so as to provide meaningful assurance of the customer's identity. This can be, for example, a passport, a military identification card, a student identification card, or a state issued identification card.

Example Two

International Licenses

If the customer has a license issued from another country, the identifying information on the license (e.g., name, date of birth, and expiration date) must be readable, and the customer must provide a secondary form of photo identification.

Example Three

Mismatching Information

If the reservation information entered by the customer (e.g., the customer's full name, driver's license number, date of birth, and driver's license expiration date) does not match the corresponding information on the uploaded photograph of the customer's driver' license, a rental representative can use the system to send the customer a message requesting that he or she correct the reservation details so that all information matches or requesting that he or she proceed inside the rental office for assistance.

Example Four

Licensing State Different from State of Reservation Location

If the customer has a license from one state, and the reserved vehicle will be picked up in a different state, the rental representative can request that the customer provide additional meaningful assurance that he or she resides in the dispatch state (e.g., an apartment rental agreement, utility bill, work badge, etc.), which the customer can photograph and upload to the system using his or her mobile device 11. After such evidence is provided, the representative can confirm that the information entered by the customer in the driver information section 161 of the checkout page 150*b* matches the corresponding information on the uploaded photograph of the customer's driver' license, as described above, and that the uploaded driver's license photograph matches the uploaded customer photograph.

Example Five

Driver Information Does Not Match Driver's License

If the information entered by the customer in the driver information section 161 of the checkout page 150*b* (e.g., the DOB, expiration date, and Driver's License number) does not match the information from the driver's license, the customer can be directed to proceed inside the rental office for assistance. For example, the system can be used to send a message to the customer's mobile device such as: "Your account details are incomplete and cannot be completed with the self pick-up process—please proceed inside." A similar message can be sent to the customer if the information entered in the driver information section 161 is incomplete.

Example Six

Customer Photograph Does Not Match Driver's License Photograph

If the customer's uploaded photograph does not match the picture of the driver in the uploaded driver's license photograph, the rental representative can send a new photograph request to the customer asking him or her to send in a photograph of the account holder. Likewise, if the uploaded photograph does not match any previously uploaded photos or videos of the customer that are stored in the system, the rental representative can send a similar request to the customer. According to some embodiments of the invention, comparing the photographs can involve determining how old the driver's license photograph is based on the issue date of the license and looking for similarities or differences in the following facial features:

- Jaw bone or jaw line. These are dramatic features on a face that can be easily identified.
- Hair line or other hair features. Whether there is a receding hairline or not, the way the hair line grows in can be recognizable (widow's peaks, mustaches, sideburns or other distinguishable hair features.)
- Eye shape and eye brows.
- Nose shape, or shape and size of the nostrils.
- Mouth shape, and size of the lips.
- Ear shape and features.
- Distinctive wrinkles or lines on the face. According to one aspect of the invention, the customer also can be required to take a photograph of himself/herself while holding up their license, as shown in FIG. 25, to confirm that the customer has the license in their possession Example Seven Customer Photograph Must Be Taken at Time of Rental According to one important aspect of the invention, the customer photograph must be taken during the rental pickup process. To satisfy this requirement, the photograph can be taken at the rental location or in front of the equipment being rented in order to be approved, as shown in FIG. 24.

Example 8

Reaction Tests

If the customer's photograph shows signs of impairment, such as eyes closed, eyes droopy, eyes barely open or red eyes, the customer can be required to take a reaction test that can be performed by the customer using the mobile device.

The customer verification process also can involve a review of additional qualifying factors, including for example:

- Whether the customer has previously rented a vehicle using the rental management computer system 16;
- Whether the customer has previously purchased any other good or service from the entity that is operating the rental management computer system 16;
- The time of the rental;
- The location of the rental;
- Comparison of the meta data associated with the customer's uploaded photo or video to the location and timing of the rental;
- A comparison of the customer's uploaded photo or video with previously uploaded photos or videos;
- A comparison of the location of the rental with the geographic information on the customer's driver's license, such as the state of issuance; and
- The results of a reaction test that can be performed by the customer using the mobile device.

If the reviewing rental representative needs additional information, such as a better photograph of the customer, the representative can communicate a request directly to the customer for the additional information via the customer's mobile device 11, such as via a pop-up box displayed on the mobile computer device 11 for sending a text message or email.

Figure 26:
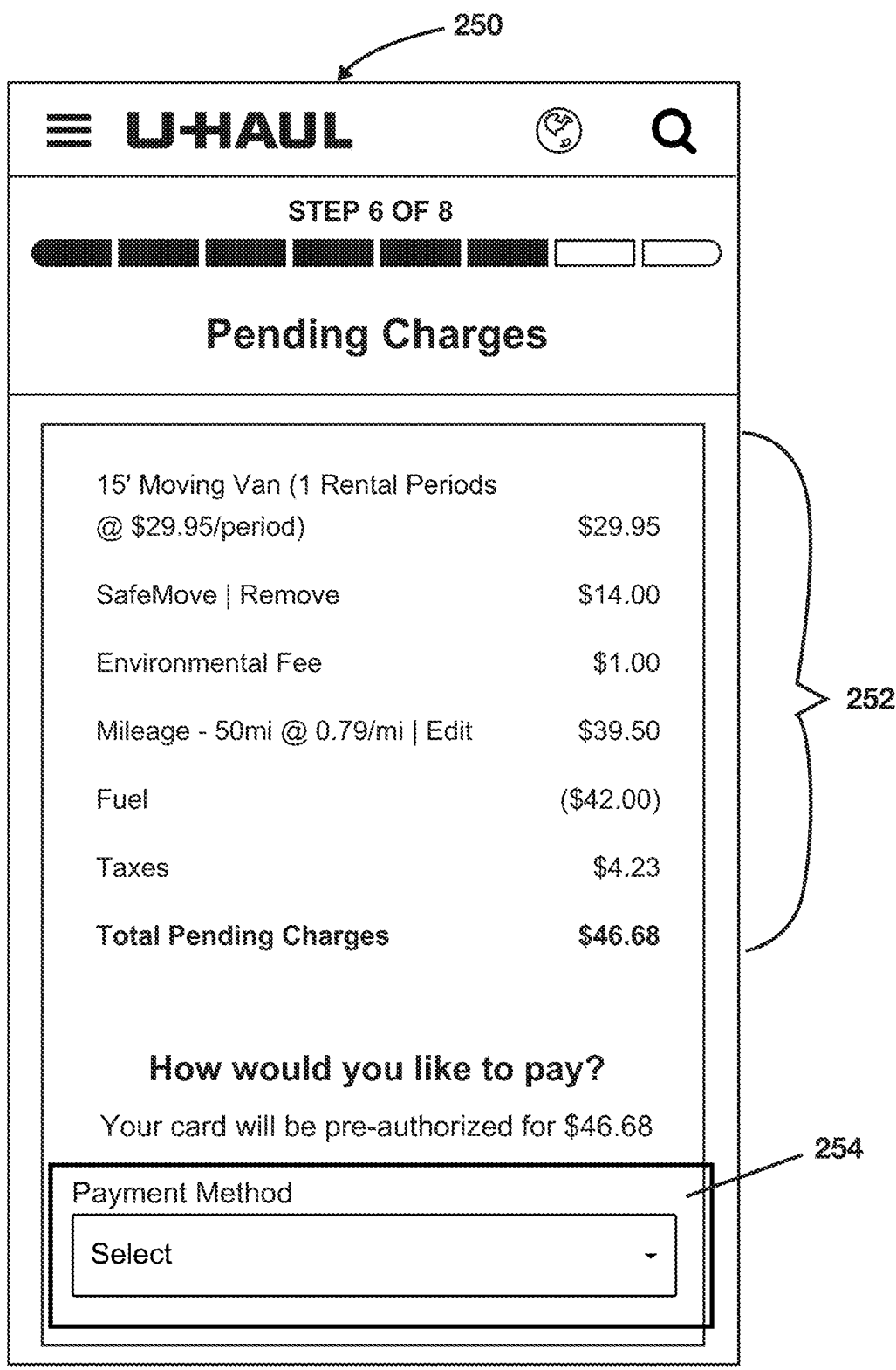
FIGS. 26-27 show an exemplary web page displayed on the screen of a customer's mobile device for enabling a customer to pre-authorize the charges for the rental and select the method for paying the charges.
Figure 27:
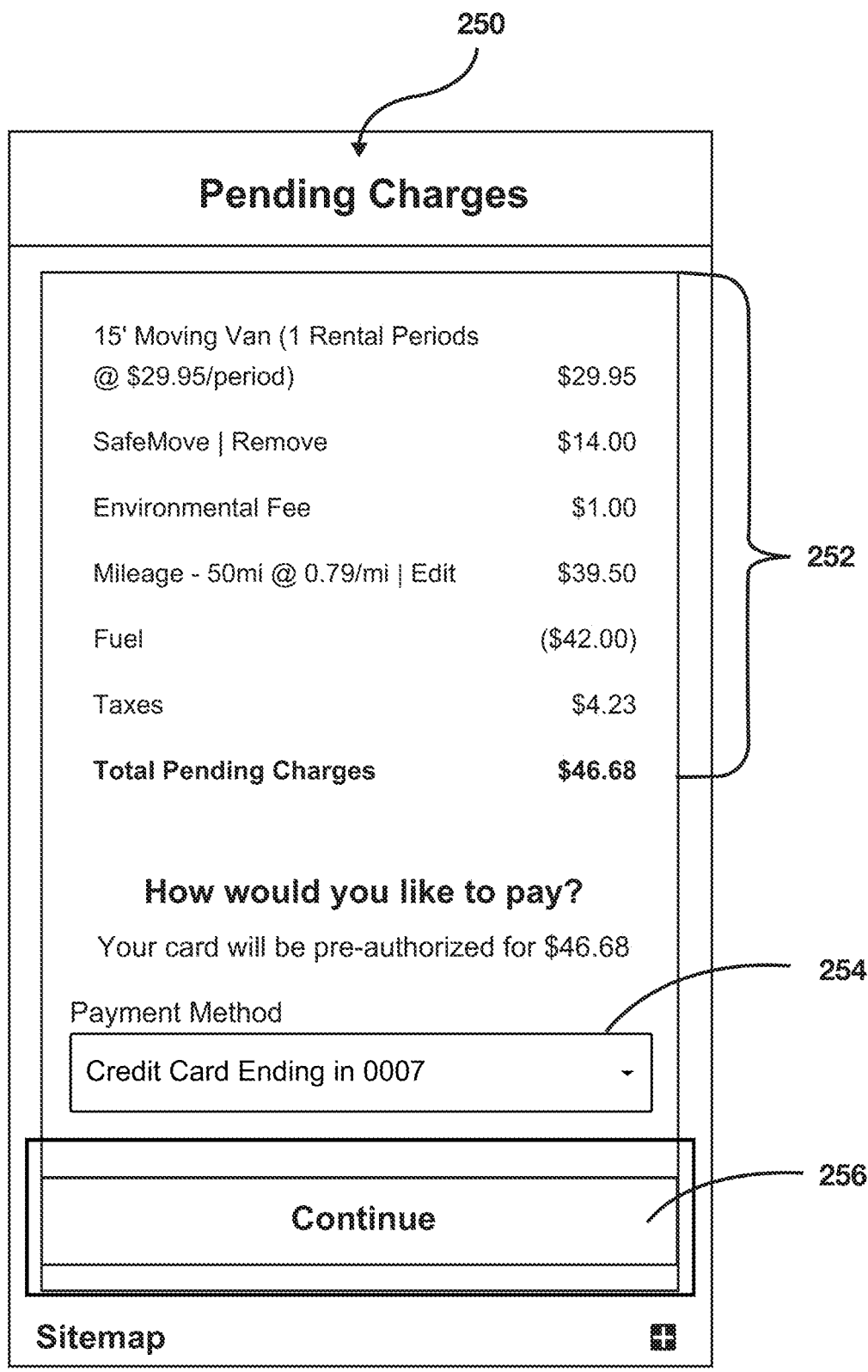
Figure 28:
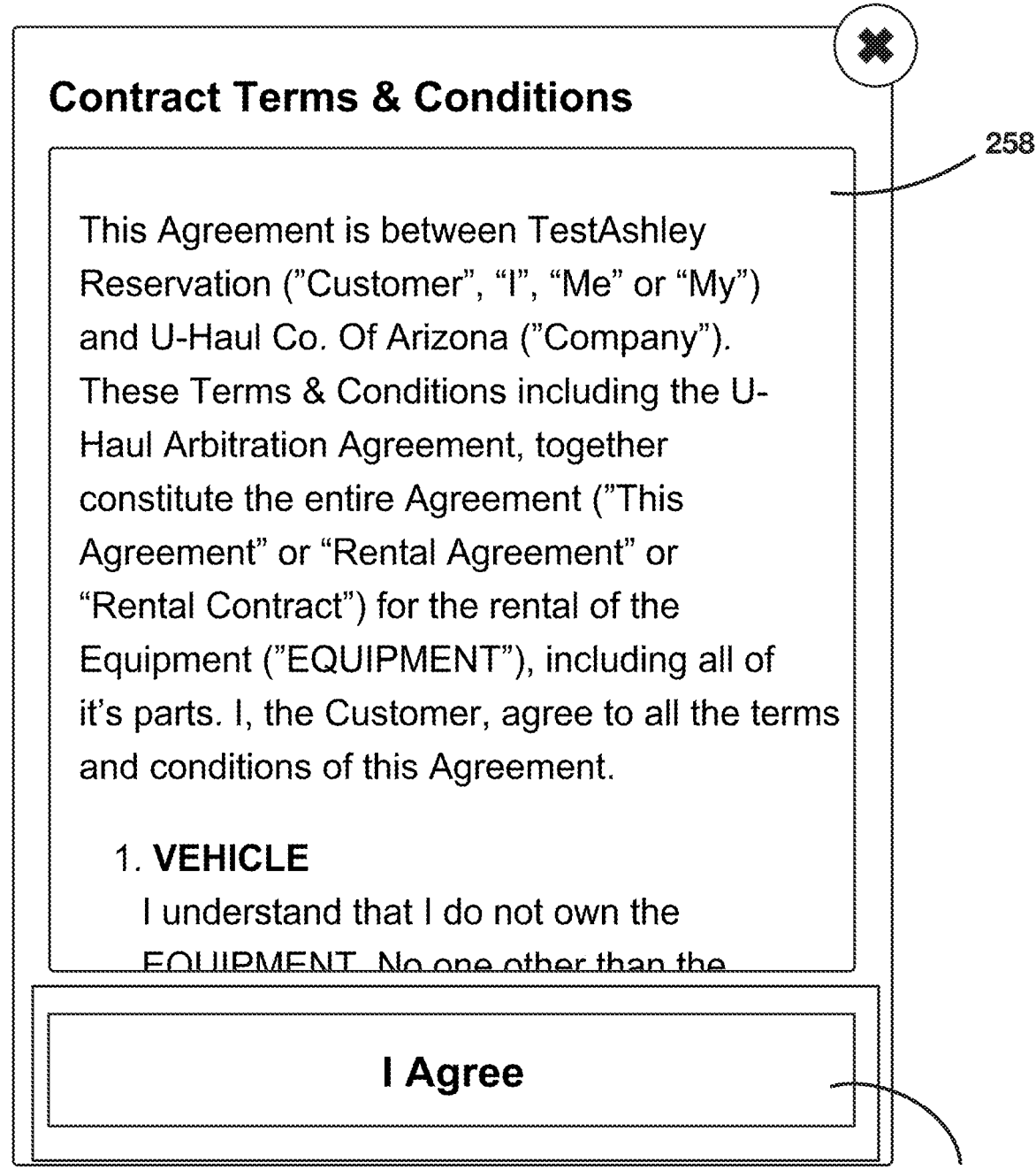
FIG. 28 shows an exemplary pop-up window displayed on the screen of a customer's mobile device for presenting the terms and conditions of the rental agreement to the customer during the dispatch process.

Referring again to FIG. 23, after the customer has been approved, the customer can select a continue button 249 on the customer verification page 240 to proceed with the dispatch process. In response, the system 16 can display on the mobile device 15 the charges for the rental and obtain pre-authorization from the user for payment and the customer's acceptance of the rental contract terms and conditions. FIGS. 26-28 show an exemplary charge pre-authorization page 250 contract acceptance window 258 served by the rental management computer system 16 to the mobile device 11 for this purpose. The charge pre-authorization page 250 displays the pending rental charges 252 as well as a payment method menu 254 by which the customer can select the method for paying the charges. As shown in FIG. 27, after the user selects a payment method, the charge pre-authorization page 250 displays a continue button 256, which the customer can select to pre-authorize payment of the displayed charges. In response, as shown in the exemplary embodiment of FIG. 28, the system 16 displays a rental terms and conditions pop-up window 258 along with a contract acceptance button 259, which the customer can select to agree to the contract terms and conditions and proceed with the dispatch process.

Figure 29:
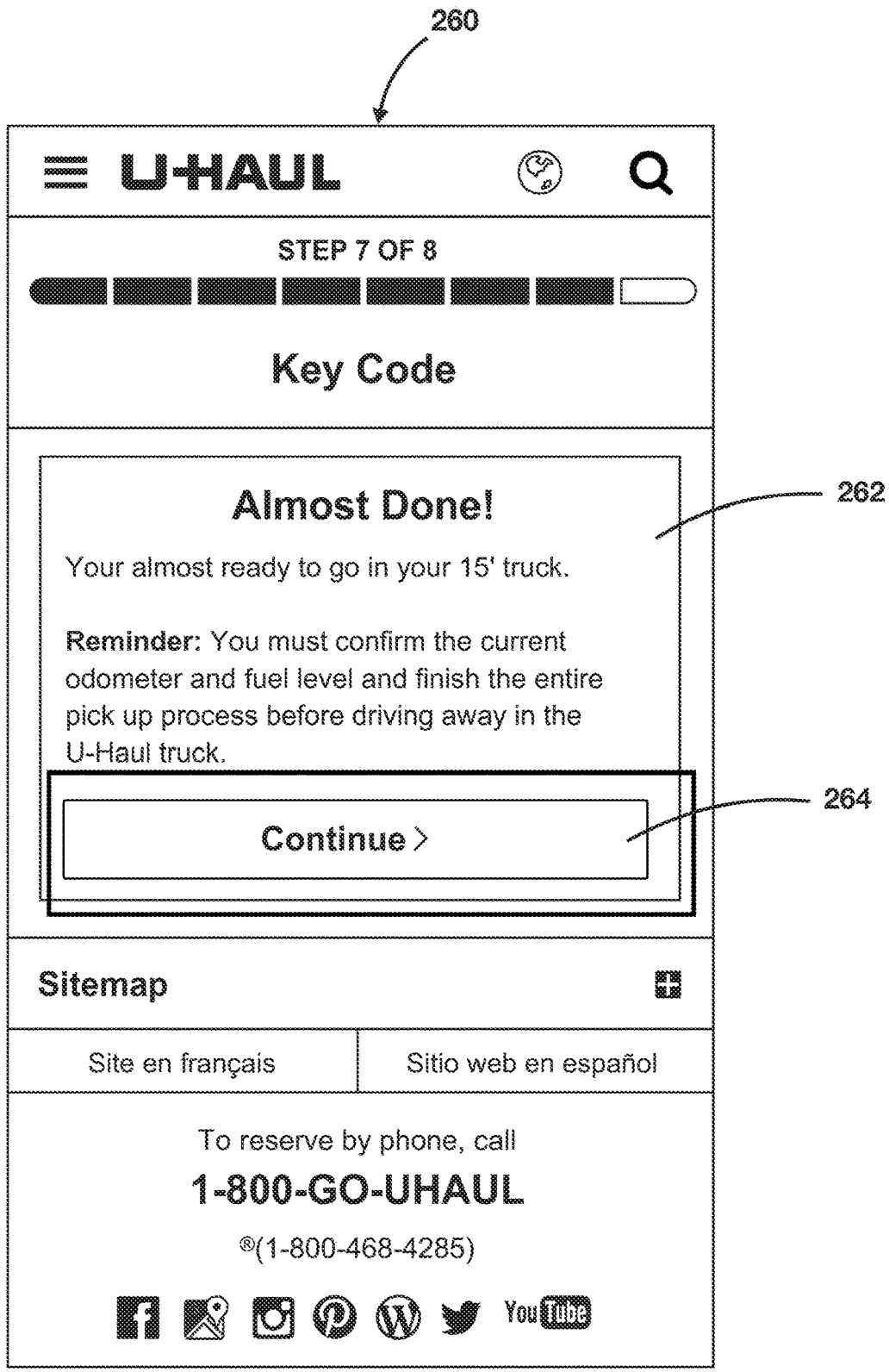
FIG. 29-30 show an exemplary web pages displayed on the screen of a customer's mobile device for providing a key code to the customer during the dispatch process to enable him or her to obtain the key to the rental vehicle.
Figure 30:
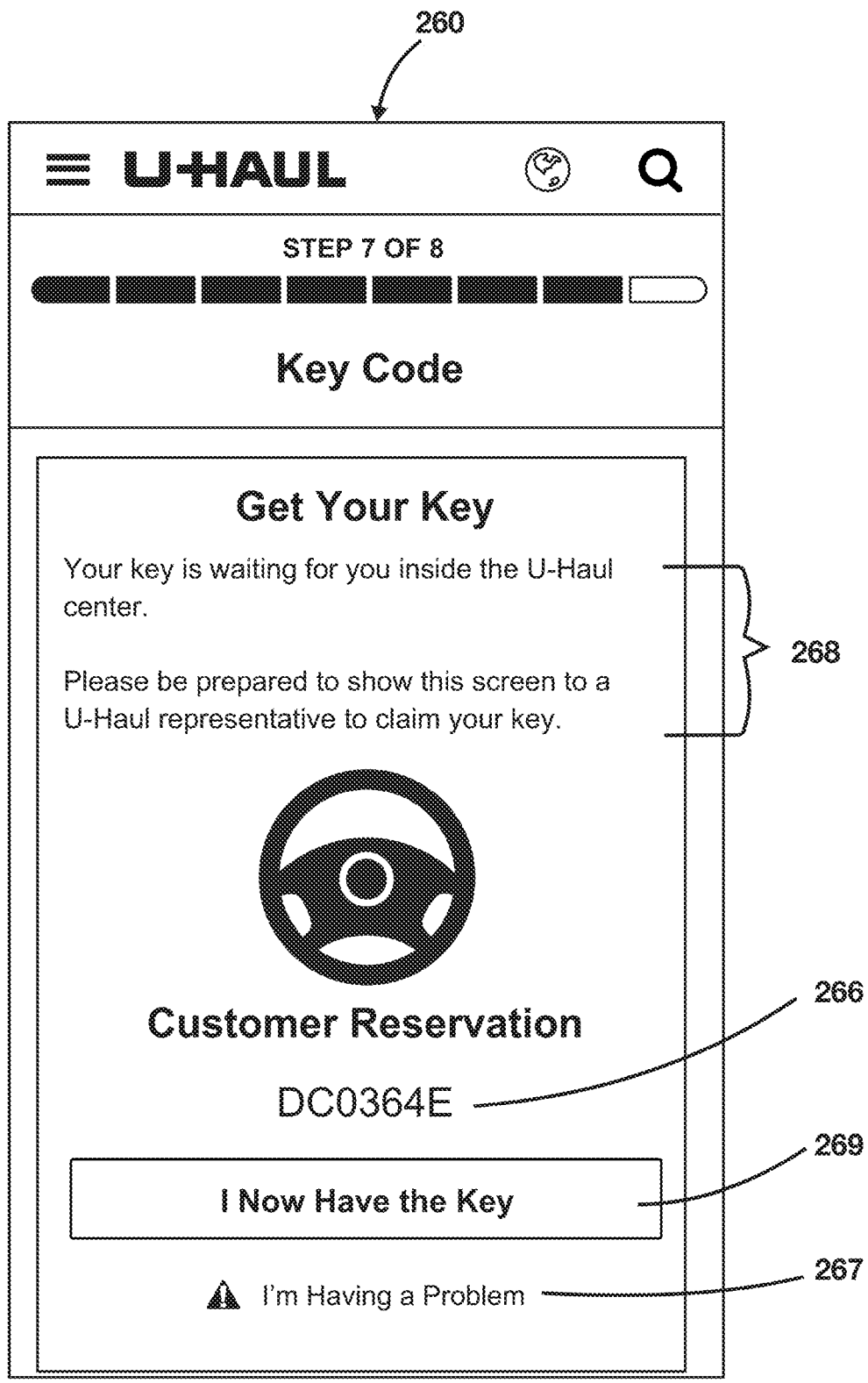

After the customer agrees to the rental terms and conditions, the system sends a key code to the customer via the mobile device. FIGS. 29-30 show an exemplary key code page 240 served by the rental management computer system 16 to the mobile computer device 11 for this purpose. As shown in FIG. 29, the key code page 240 displays instructions to the customer to confirm the current odometer reading and fuel level of the rental vehicle before driving the vehicle. To obtain the key to the rental vehicle, the customer selects a continue button 264 displayed on the key code page 260. In response, as shown in FIG. 30, the key code page 240 displays a code 266, such as an alphanumeric code, along with instructions 268 on how to use the code 266 to obtain the vehicle key. This can include obtaining the vehicle key from a rental representative at the facility location via hand delivery or from a lock box. The instructions 268 are stored in the system 16 and are associated with a specific rental facility location and with specific business hours for that facility. After the customer receives the vehicle key, he or she can confirm that they have the key and proceed to the next step of the process by clicking a key receipt button 269. If the customer cannot access the vehicle key, he or she can click a problem button 267. If the customer does so during business hours, he or she can be instructed via the mobile device 11 to go inside the rental facility location. If the customer selects the problem button 267 after business hours, the mobile device can instruct him or her to contact an after-hours rental representative, such as a general manager of the rental facility, to request assistance.

Figure 31:
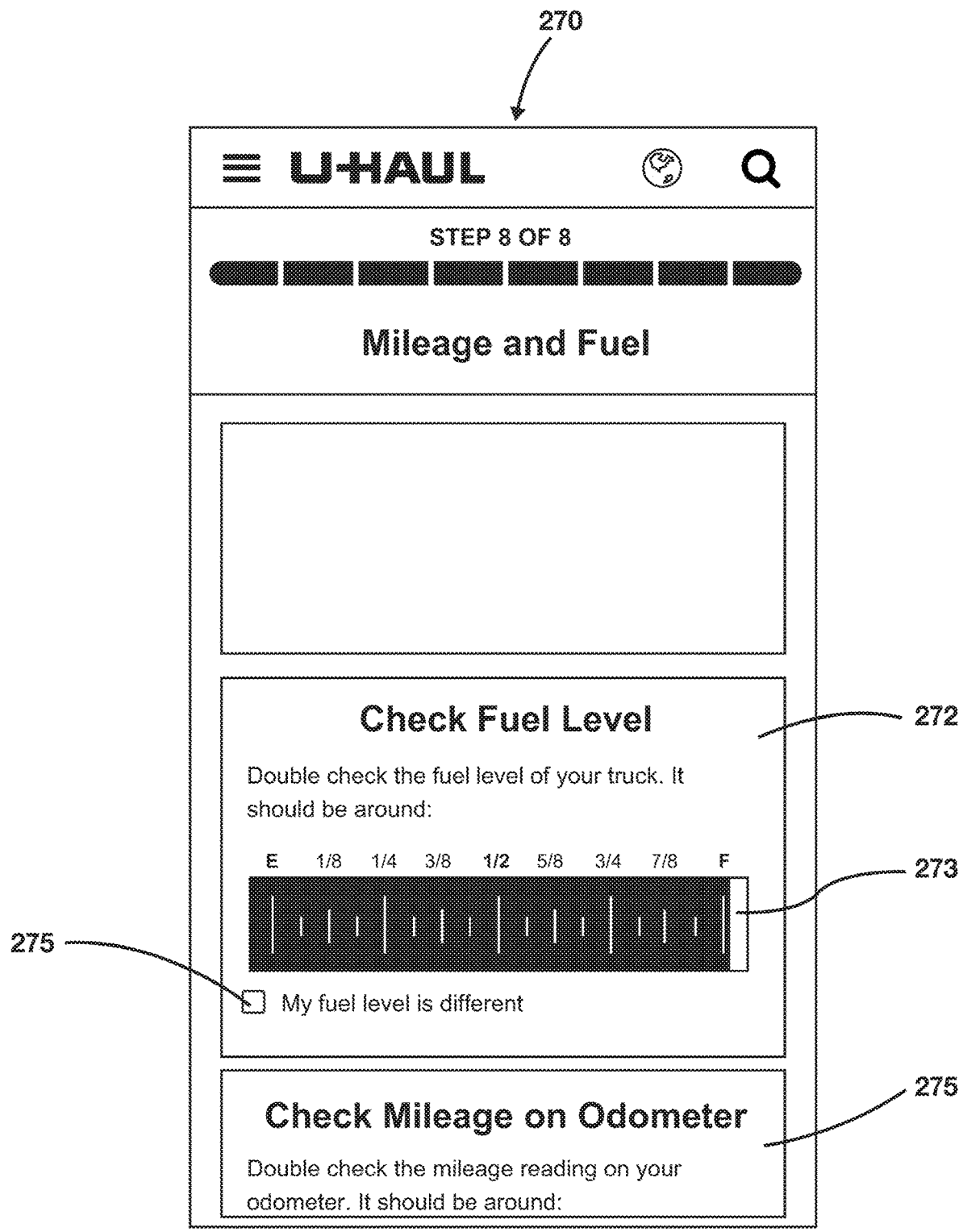
FIGS. 31-33 show exemplary embodiments of web pages displayed on the screen of a customer's mobile device entering mileage and fuel level information for the rental vehicle during the dispatch process.
Figure 32:
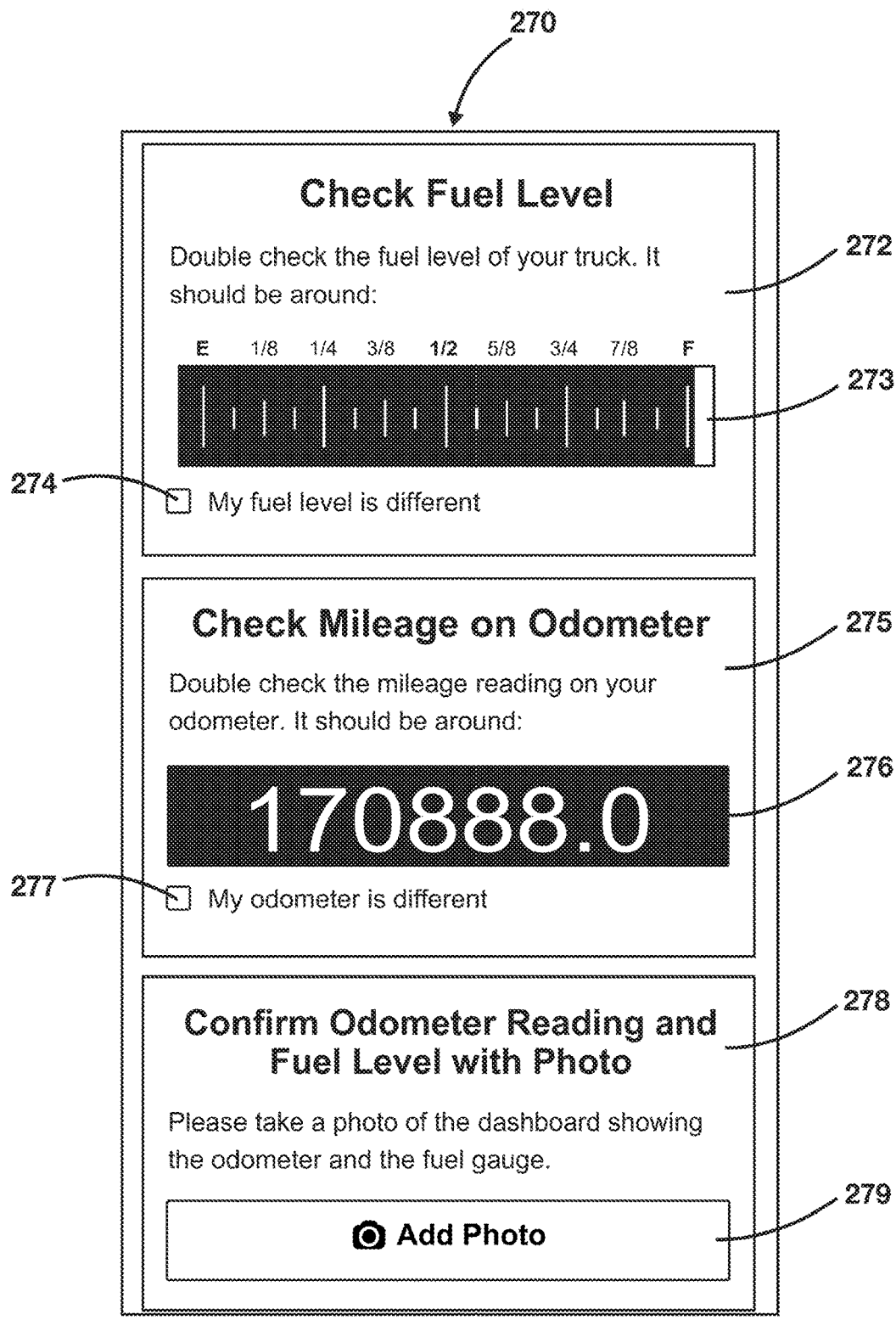
Figure 33:
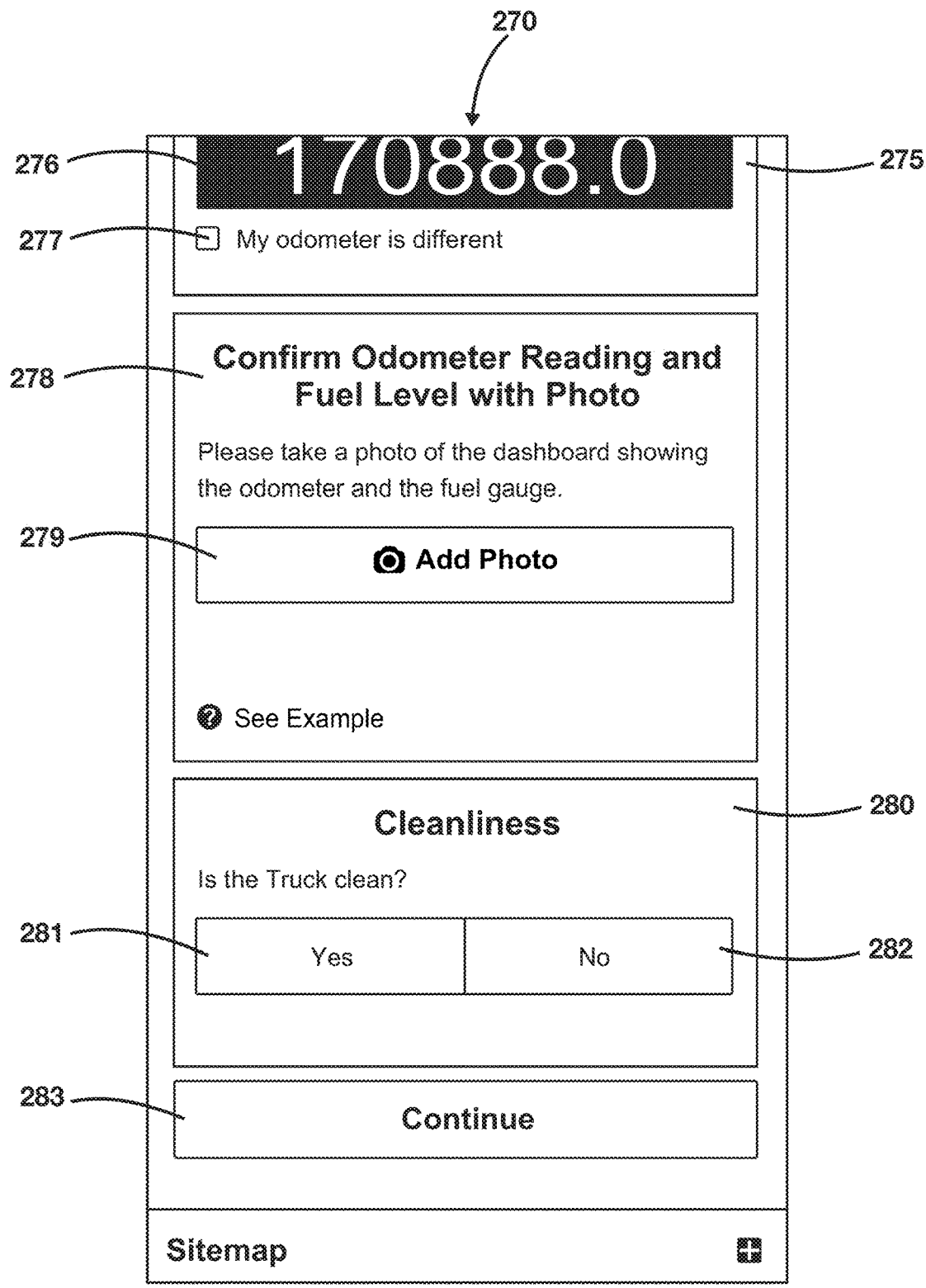

After the customer selects the key received button 269, the system will prompt him or her to confirm the vehicle's fuel level and mileage before driving the vehicle. FIGS. 31-33 show an exemplary mileage and fuel page 270 served by the rental management computer system 16 to the mobile computer device 11 for this purpose, which page includes a check fuel level section 272, a check mileage section 275, a confirm odometer reading and fuel level section 278, and a cleanliness section 280. The check fuel level section 272 displays a fuel level reading 273 for the vehicle and instructs the customer to confirm that the reading accurately reflects the actual fuel level reading on the vehicle fuel gauge. The displayed fuel level reading 272 is stored by the system 16 for the vehicle from the previous rental contract, as discussed below (see FIG. 38). If the displayed fuel level reading 273 does not match the vehicle's actual fuel level reading, the customer can select a different fuel level check box 274, which will allow the customer to input corrected fuel level information. The Check Mileage section 275 displays a mileage reading 276 for the vehicle and instructs the customer to confirm that the reading accurately reflects the actual mileage reading on the vehicle odometer. The displayed mileage reading 276 is stored by the system 16 for the vehicle from the previous rental contract, as discussed below (see FIG. 38). If the displayed mileage reading 276 does not match the vehicle's odometer mileage reading, the customer can select a different odometer reading check box 27, which will allow the customer to input corrected mileage information from the vehicle's actual odometer reading.

Still referring to FIGS. 32 and 33, in a presently preferred embodiment of the invention, the confirm odometer reading and fuel level section 278 instructs the customer to take and upload a photograph of the vehicle dashboard with the mobile device 11. This photograph can be used to confirm the mileage and fuel level information confirmed or entered by the customer. The Confirm Odometer Reading and Fuel Level section 278 includes an Add Photo 279 for this purpose. When the customer selects the Add Photo button 279, the mobile computer device 11 activates the camera 46 so that the customer can capture an image of the vehicle odometer and fuel gauge readings. After the image is captured, the mobile computer device 11 can prompt the user to upload the image file to the system 16, which stores the file for comparison with the mileage and fuel level information input by the customer.

As shown in FIG. 33, the cleanliness section 280 asks the customer to respond whether the equipment is clean by selecting a Yes button 281 or No button 282. If the customer selects the Yes button 281, the mileage and fuel page 270 will display a continue button 283, which the customer can select to complete with the dispatching process. If the customer selects the No button 282, the system can prompt the customer to use the mobile device 11 to take one or more photographs of the dirty area and upload the photograph(s) to the system 16 before selecting the continue button 283 to complete the dispatching process.

Figure 34:
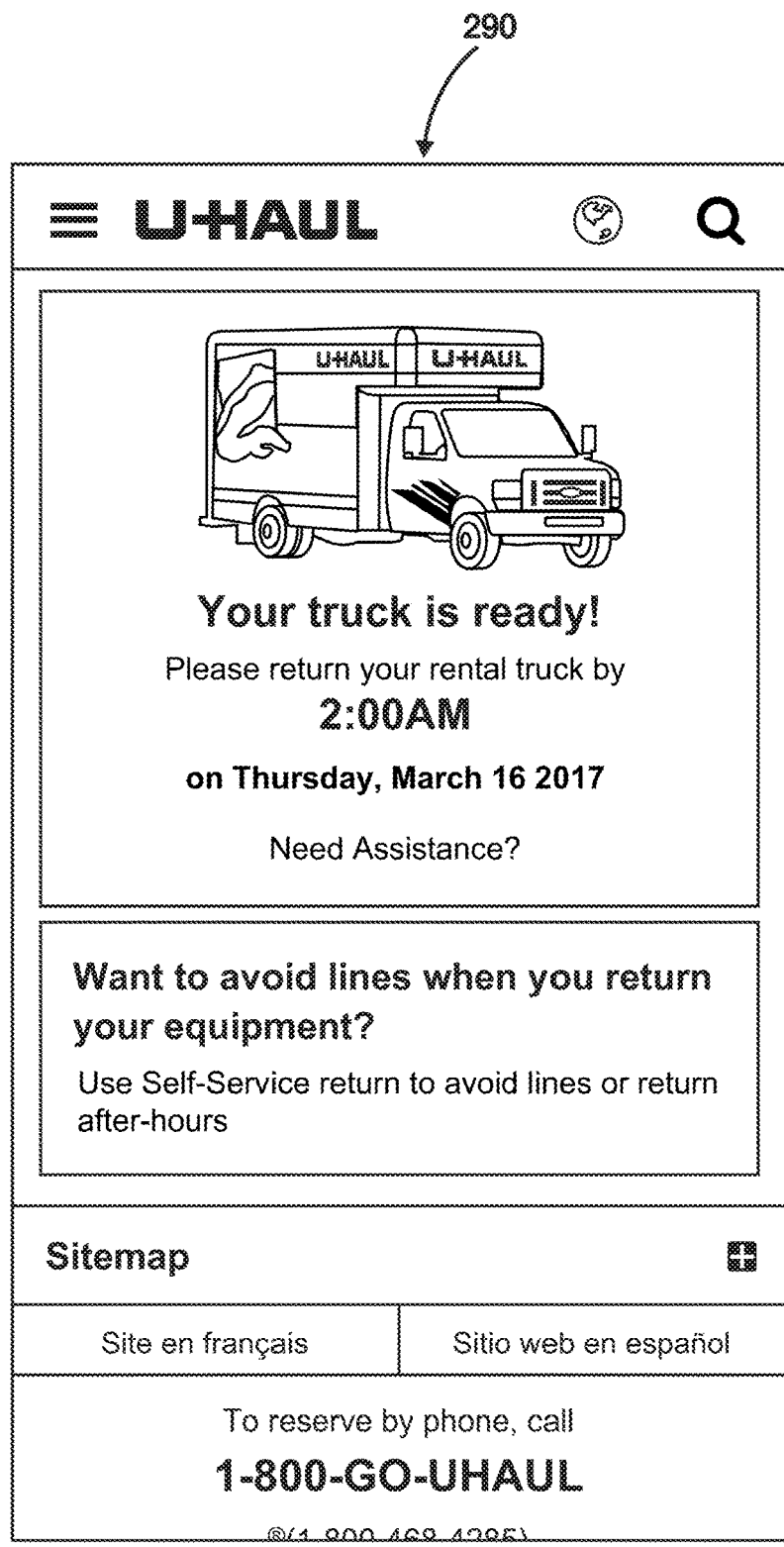
FIG. 34 shows an exemplary web page displayed on the screen of a customer's mobile device confirming the customer's completion of the dispatch process.

After the dispatching process is completed, the system 16 will cause the mobile device 11 to confirm the completion of the dispatching process. FIG. 34 shows an exemplary vehicle ready page 290 served by the rental management computer system 16 to the mobile computer device 11 for this purpose, which advises the customer that the rental vehicle is ready and displays the return date and time for the rental.

Customer Return of Rental Vehicle

Figure 10:
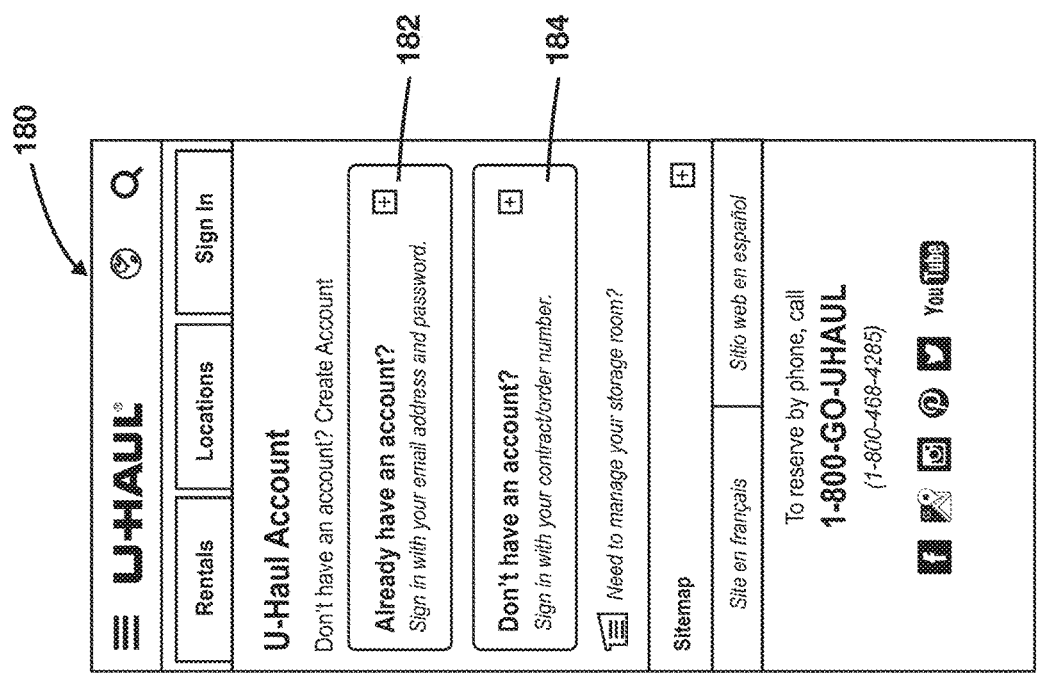
FIG. 10 shows an exemplary embodiment of a website landing page displayed on a customer's mobile device, from which the customer can sign in to their rental account.

The return process according to the present invention allows a customer with a verified account to return the rented equipment and close the rental contract verified account using his or her mobile device 11. After a reservation has been activated by the system 16, the customer can initiate the return process by directing the browser of the mobile device 11 to the rental website landing page 180 (see FIG. 10). Referring to FIG. 10, if the customer selects the "don't have account" button 184 of the landing page 180, the system 16 will cause the mobile device 11 to prompt the customer to sign in with the customer's reservation contract or order number to access their reservation information. To do so, the customer will again be prompted to login to their account or to create a new account. If the customer selects the "have account" button 182 on the landing page 180, he system will prompt the customer to login to their account and initiate the return process via their account dashboard page 190 (see FIG. 11). In response, the system 16 can cause the mobile device 11 to display information and instructions about the return process and prompt the customer to begin that process by selecting a menu option for after hours or self-return (not shown) to initiate the return process.

Figure 35:
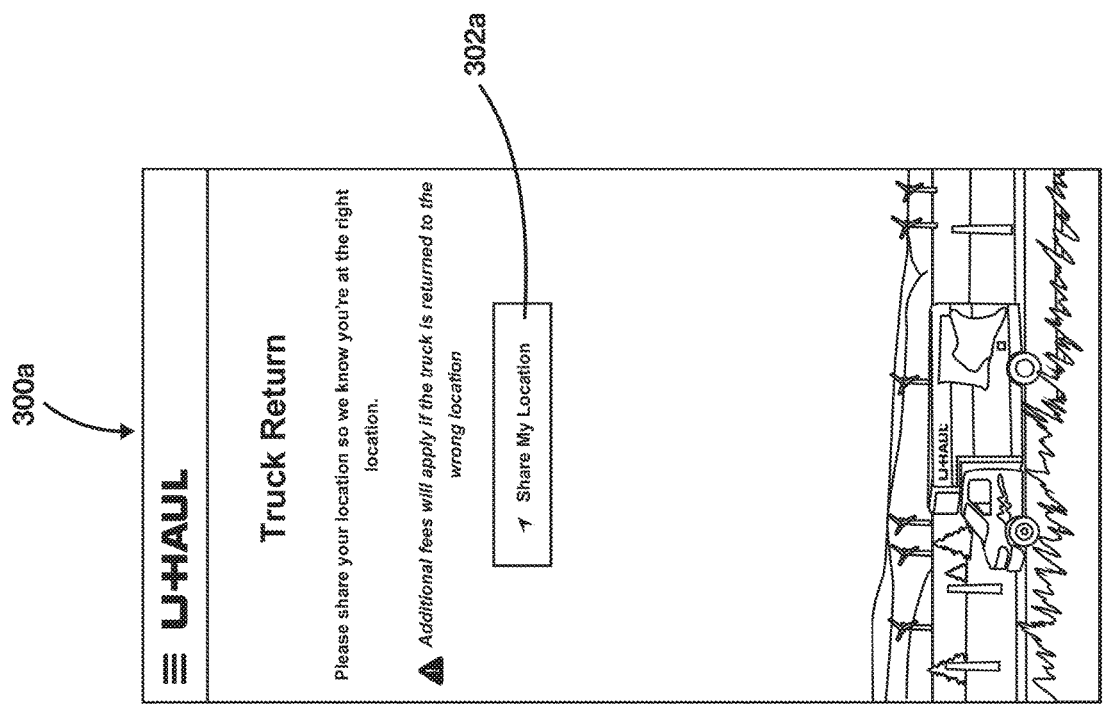
FIG. 35 shows an exemplary web page displayed on the screen of a customer's mobile device for initiating a return of a rental truck in accordance with the present invention.
Figure 36:
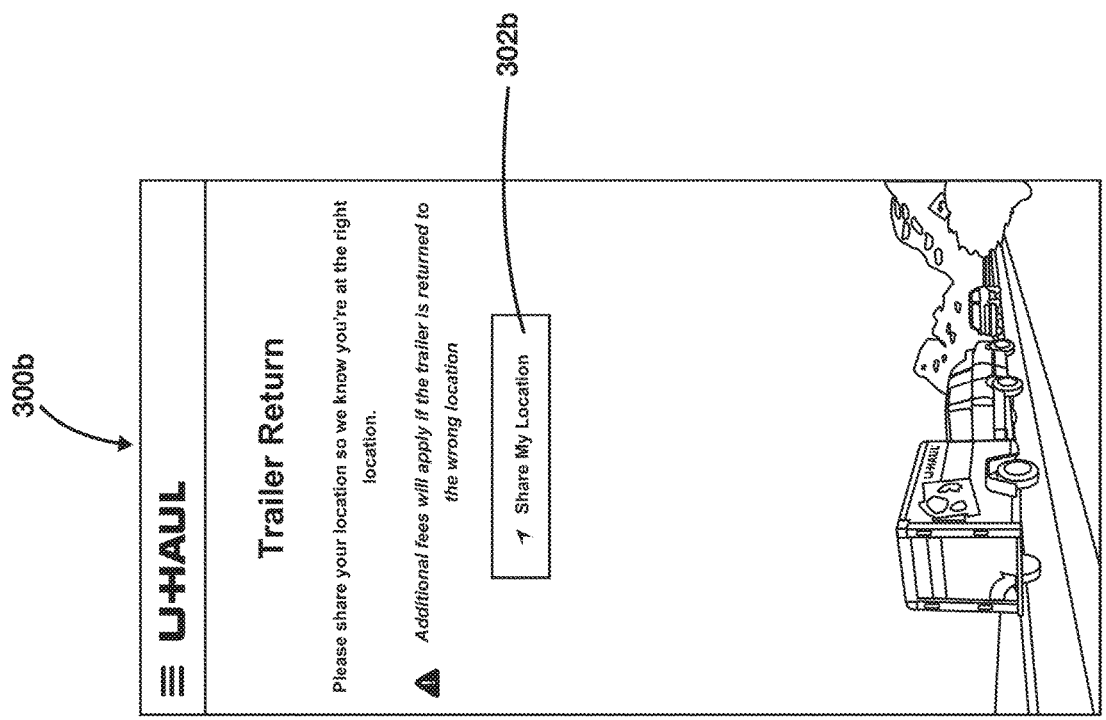
FIG. 36 shows an exemplary web page displayed on the screen of a customer's mobile device for initiating a return of a rental trailer in accordance with the present invention.

After the return process is initiated, the system 16 causes the customer's mobile device 11 to prompt the customer to share his or her location. FIGS. 35-36 show exemplary embodiments of a vehicle return page 300 displayed on the screen of a mobile computer device 11 for this purpose. FIG. 35 shows a return page 300a for the return of a rented truck, and FIG. 36 shows a return page 300b for the return of a rented trailer. In the embodiments of FIGS. 35 and 36, the vehicle return page 300 prompts the customer to select a share location button 302, which causes the mobile device 11 to share its GPS location with the system 16. To continue with the after-hours return/self-return process using the mobile device 11 (which is sometimes referred to herein as the "mobile return process"), the customer must share the mobile device location. If the customer does so, the system 16 will compare the mobile device location with the stored location information associated with the rental return (i.e., the "contract return location" where the rental vehicle was supposed to be returned according to the rental contract) and will proceed with the process as described below. If the customer does not share the mobile device location, the system 16 will cause the mobile device 11 to: (i) display a message informing the customer that he or she is at the wrong location and may be charged additional fees when the contract is closed the next day; and (ii) direct the customer to return the rental vehicle using a document drop box as described below. The system 16 will then end the mobile return process and will hold the rental contract open until the vehicle return is processed later according to a traditional return procedure.

Figure 37:
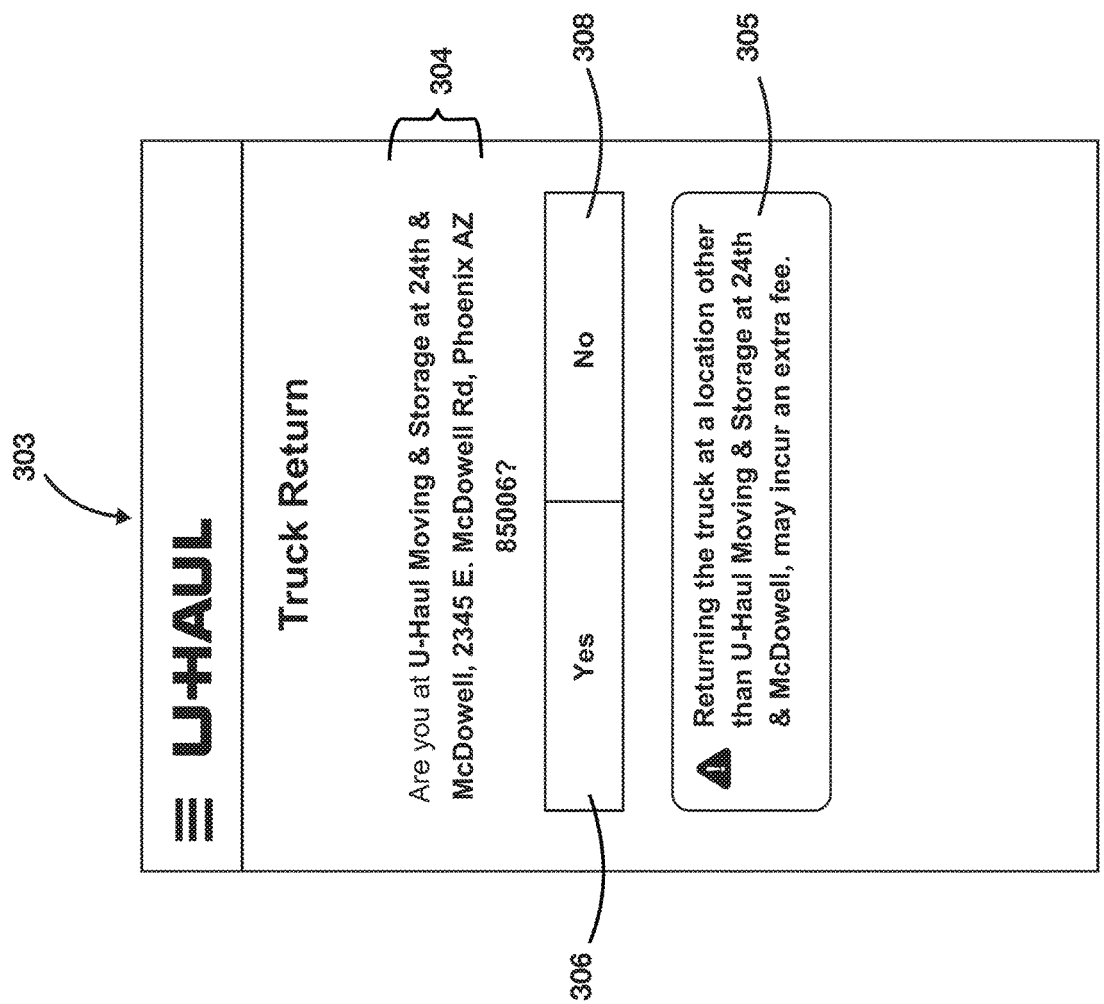
FIG. 37 shows an exemplary web page displayed on the screen of a customer's mobile device for prompting the customer to confirm that he or she is in the correct return location for a rental vehicle.

Still referring to FIGS. 35-36, when the customer selects the share location button 302, the rental management computer system 16 will access GPS information on the mobile computer device 11 for comparison with the contracted return location. According to some embodiments of the invention, if the mobile device location is within a pre-defined minimum distance from the contracted return location (such as 0.5 mile) the system 16 will cause the mobile device 12 to display instructions on how to proceed with the mobile return process. If the mobile device location is greater than a pre-defined maximum distance from the contracted return location (such as 1.0 mile), the system 16 will cause the mobile device 12 to: (i) display a message informing the customer that he or she is at the wrong location and may be charged additional fees when the contract is closed the next day; and (ii) direct the customer to return the rental vehicle using a document drop as described below. The system 16 then will end the mobile return process and will hold the rental contract open until the vehicle return is processed later according to a traditional return procedure. If the customer's mobile GPS reading is within a range between the pre-defined maximum distance and the pre-defined minimum distance from the contracted return location (such as between 0.5 and 1.0 mile), the system 16 will cause the mobile device 12 to display the contracted return location and prompt the customer to confirm that he or she is at the correct return location. In situations where there may be more than one return location within the vicinity of the contracted return location, this feature helps to ensure that the customer is returning the rental vehicle to the correct return location. FIG. 37 shows an exemplary embodiment of a return location confirmation page 303 requesting such a confirmation, which includes a message 304 asking the customer if he or she is at the location where the vehicle must be returned and a notice 305 advising that the returning the vehicle to a different location may result in an additional fee. By selecting a Yes button 306 or a No button 308, the customer can confirm whether or not they are at the contracted return location.

In some embodiments, under certain circumstances the system 16 will cause the mobile device 11 to display a document drop page 310 (such as those described below in connection with FIGS. 51 and 56) directing the customer to verify the vehicle fuel level and to leave the rental contract and/or and keys in a drop box. In these circumstances, the system 16 will not close the rental contract but will instead hold it open until the vehicle return is processed later according to a traditional return procedure. These circumstances can include the following:

The customer's rental equipment does not qualify for return;
The type of equipment the customer has rented does not qualify for return;
The customer does not share the location of the mobile device;
The customer attempts to return the equipment to the wrong return location; or
The customer responds that there is new damage to the equipment (discussed below).

Figure 38:
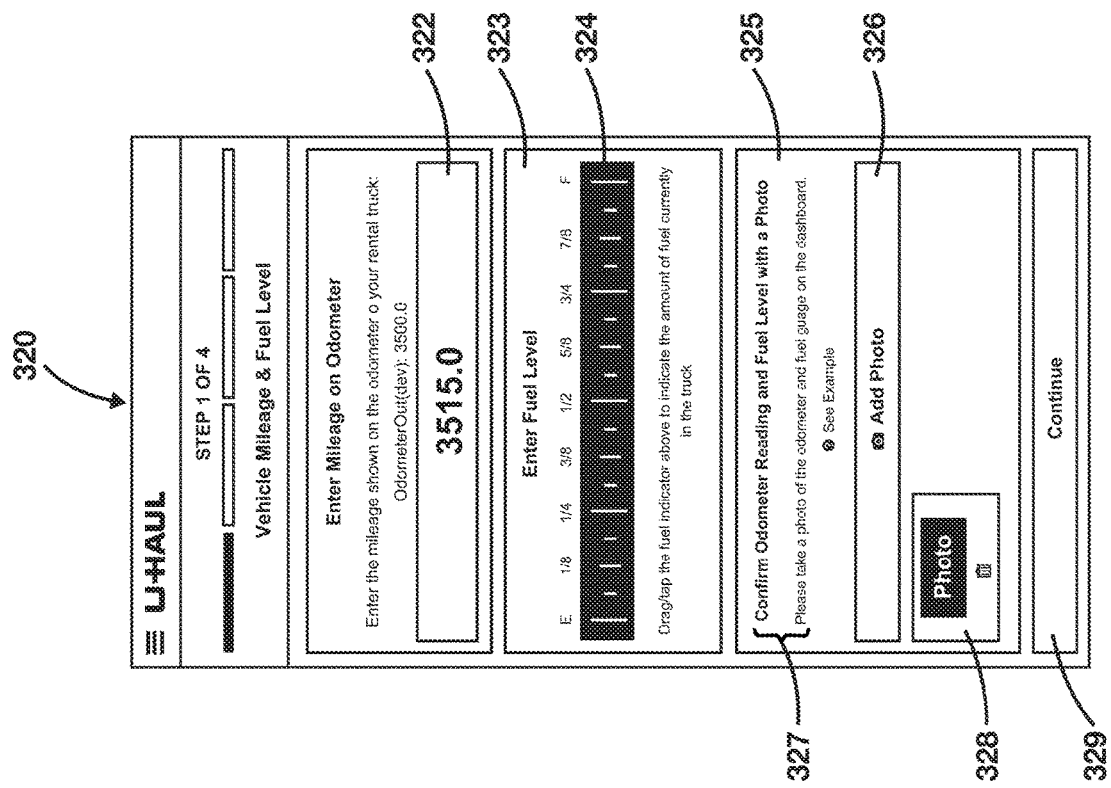
Figure 39:
Figure 40:

Referring again to FIG. 37, after the customer confirms that he or she is in the correct return location, the customer is required to input information about the mileage and fuel usage for the rental vehicle being returned. FIGS. 38-40 show an exemplary Mileage and Fuel Level web page 320 served by the rental management computer system 16 to the mobile computer device 11 for this purpose for returning a truck. The web page 320 includes a mileage entry field 322, and a fuel level input section 323 that includes a fuel indicator bar 324, a mileage and fuel confirmation section 325. In the embodiment shown in FIG. 38, by tapping the mileage entry field 322, the customer can use the mobile device to enter the mileage shown on the vehicle odometer. This mileage must be greater than the mileage reading 276 that the customer confirmed during the vehicle dispatch process (see FIG. 32). The customer enters the current fuel level of the vehicle, by sliding or tapping a fuel indicator bar 324 to set it at the fuel level shown on the vehicle fuel gauge. In one embodiment, to assist the customer in recognizing when refueling may be required, the fuel indicator bar 324 remains red if it is set to a level that is less than the beginning fuel level reading 273 that the customer confirmed during the vehicle dispatch process (see FIG. 32) and turns green when the fuel level when it is equal to or greater than the beginning fuel level reading.

Still referring to FIG. 38, the customer is required to confirm mileage and fuel level information that has been entered by uploading to the system 16 a photograph of the vehicle dashboard showing odometer and fuel gauge readings. For this purpose, the mileage and fuel confirmation section 325 includes an Add Photo button 326 and instructions 327 to the customer to take picture of the dashboard with the mobile computer device 11. When the customer selects the Add Photo button 326, the mobile computer device 11 activates the camera 46 so that the customer can capture an image of the vehicle odometer and fuel gauge readings. As shown in FIG. 38, the image is displayed on in the confirmation section 325 for the customer to review. After the digital image of the vehicle dashboard is captured, the customer can select a Continue button 329 to submit the mileage and fuel usage information to the rental management computer system 16. In addition to this confirmation process, in some embodiments the system 16 can send error messages to the mobile device 11 if the entered mileage and fuel level information is outside of pre-defined parameters. For example, as shown in the exemplary error or warning messages of FIGS. 39-41, the system can display an error or warning message 330 on the mobile device 11 if the entered mileage results in mileage incurred during the rental that is greater than a pre-defined number (such as 5000 miles) (see FIG. 39), if the entered mileage results in mileage incurred during the rental that is greater a pre-defined amount (such as 5 miles) (see FIG. 40), or if the entered fuel level does not match the fuel level confirmed during the dispatch process described above in connection with FIG. 38 (see FIG. 41).

Figure 42:
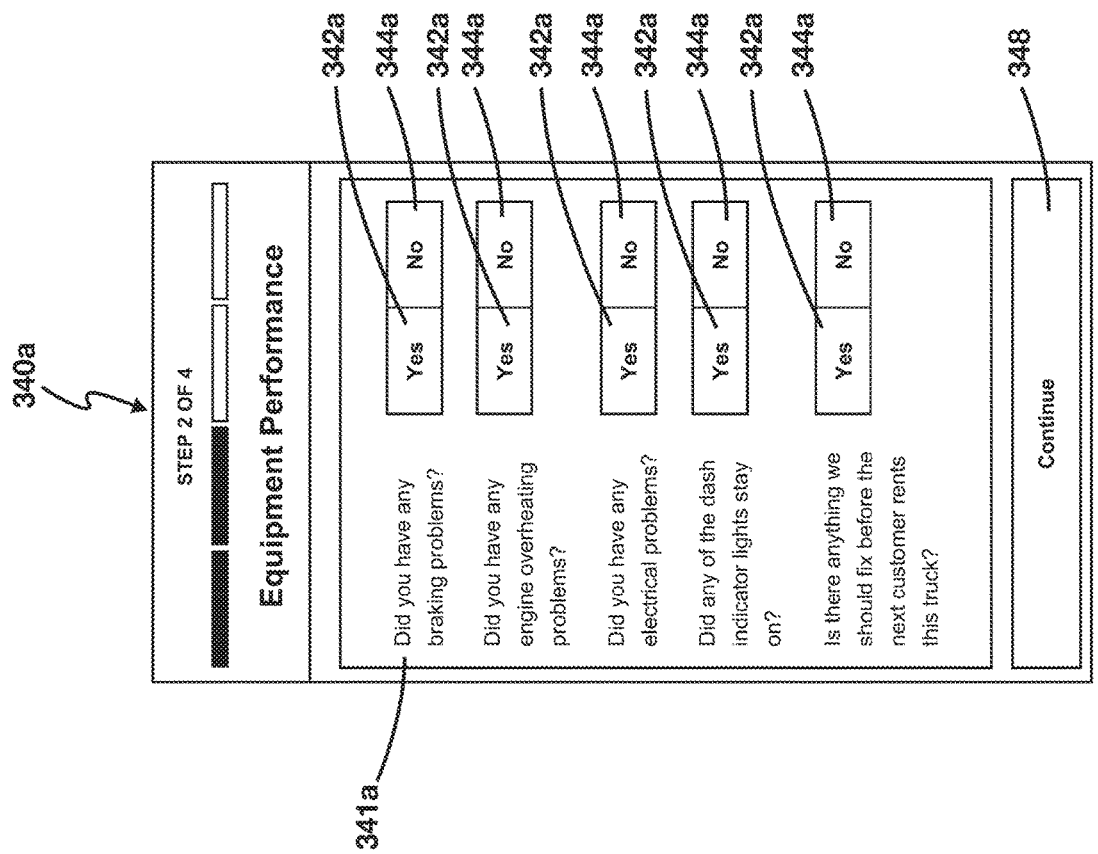
FIGS. 42-43 show exemplary vehicle questionnaire web pages displayed on the screen of a customer's mobile device for prompting the customer to answer questions during the return process regarding the performance of a rental truck.
Figure 43:
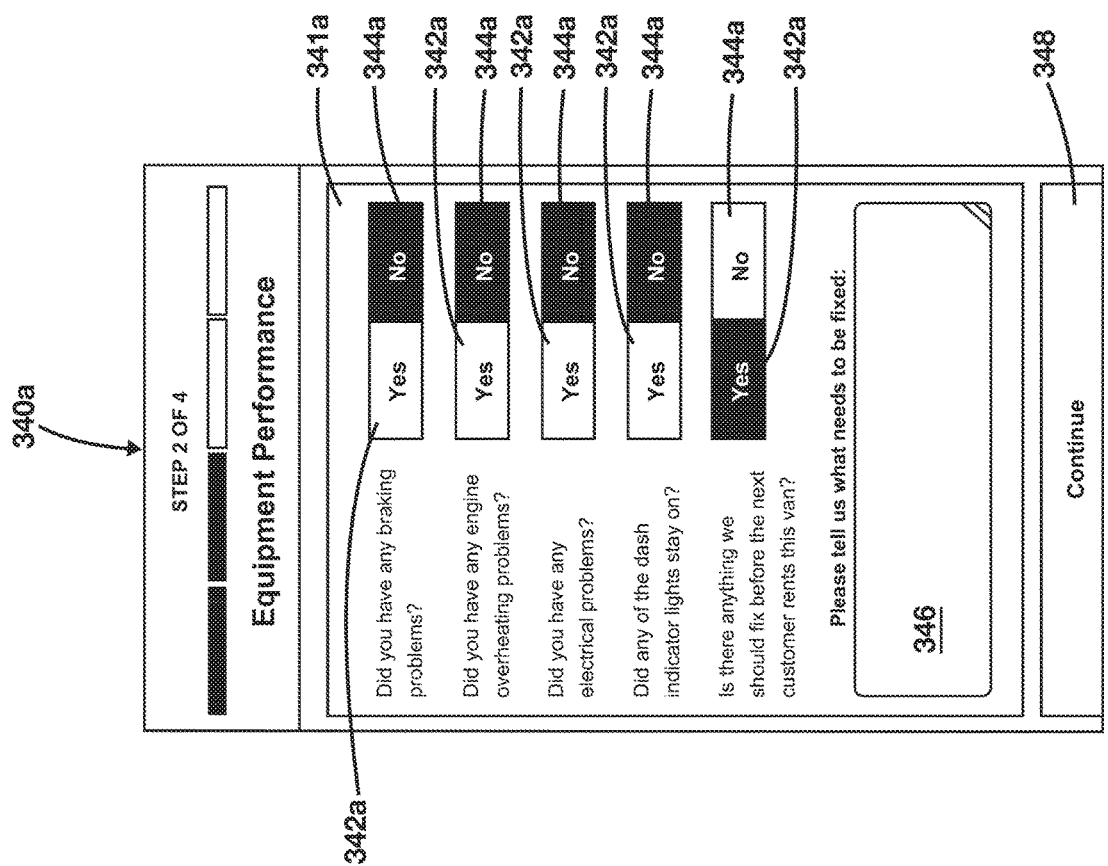
Figure 44:
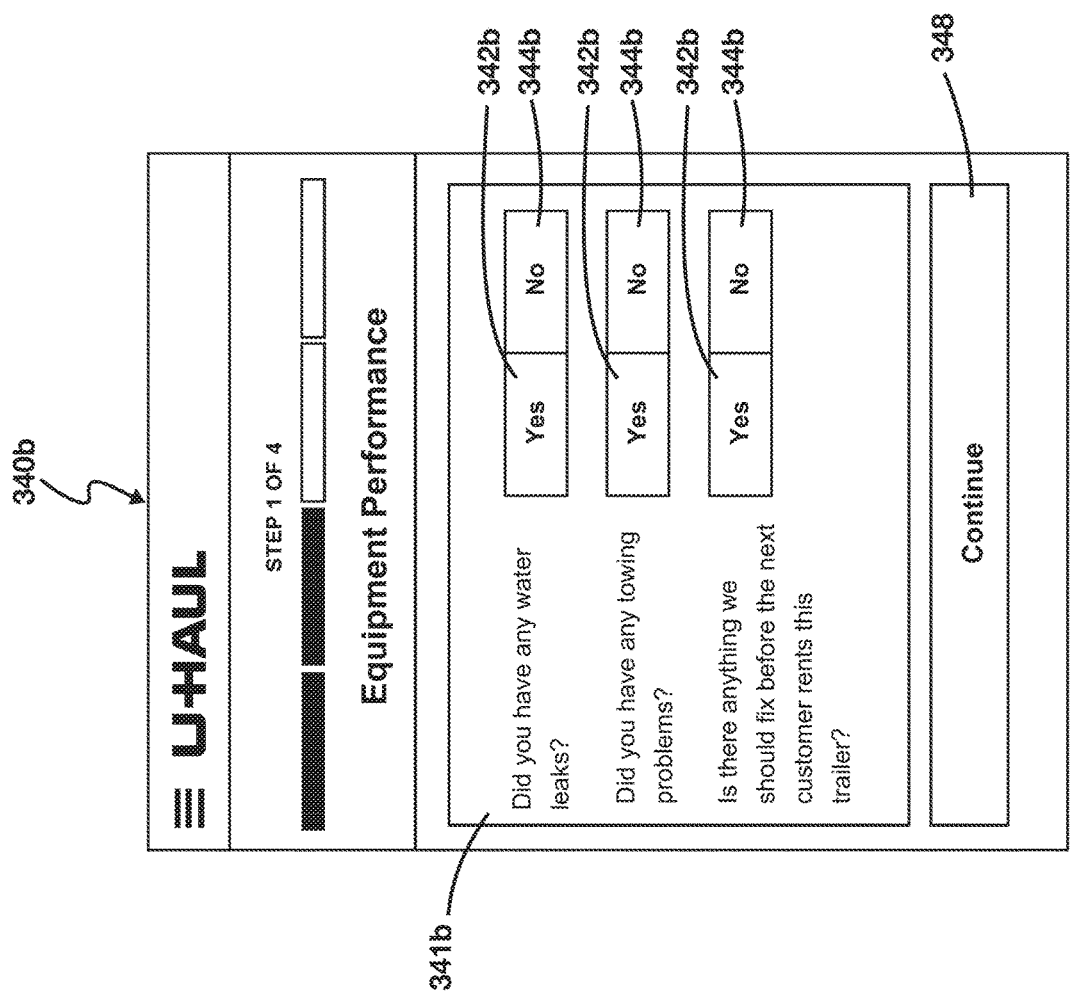
FIGS. 44-45 show exemplary vehicle questionnaire web pages displayed on the screen of a customer's mobile device for prompting the customer to answer questions during the return process regarding the performance of a rental trailer.
Figure 45:
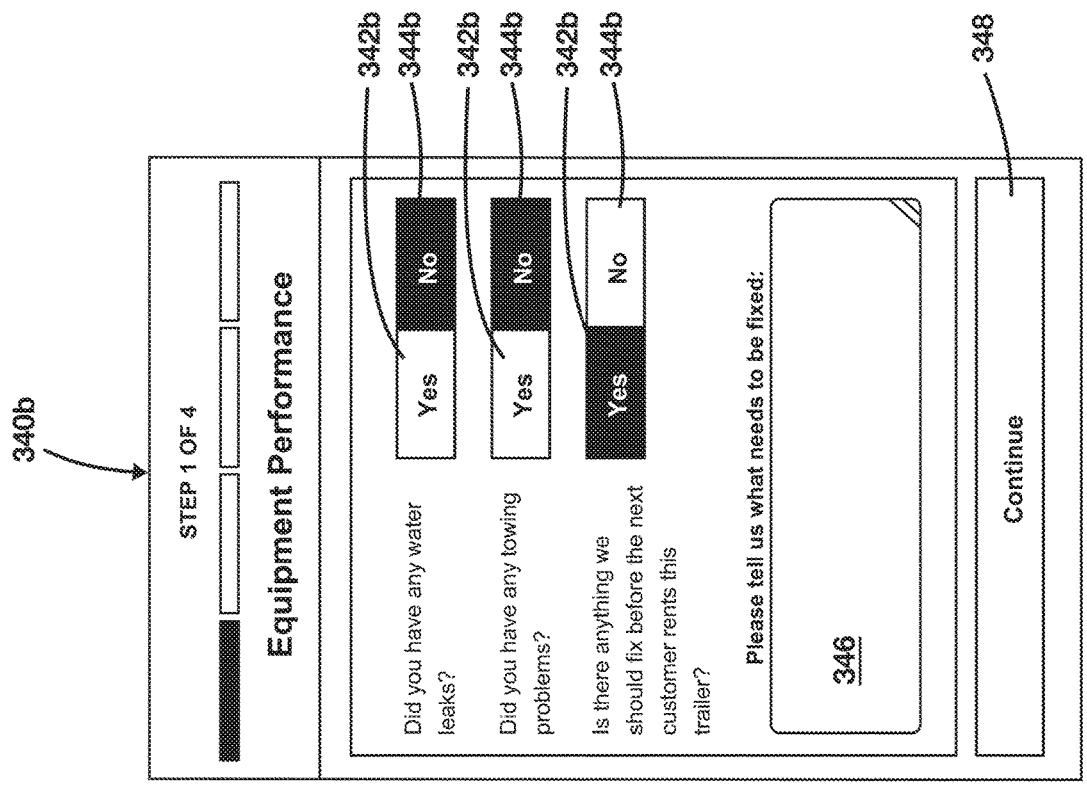
Figure 46:
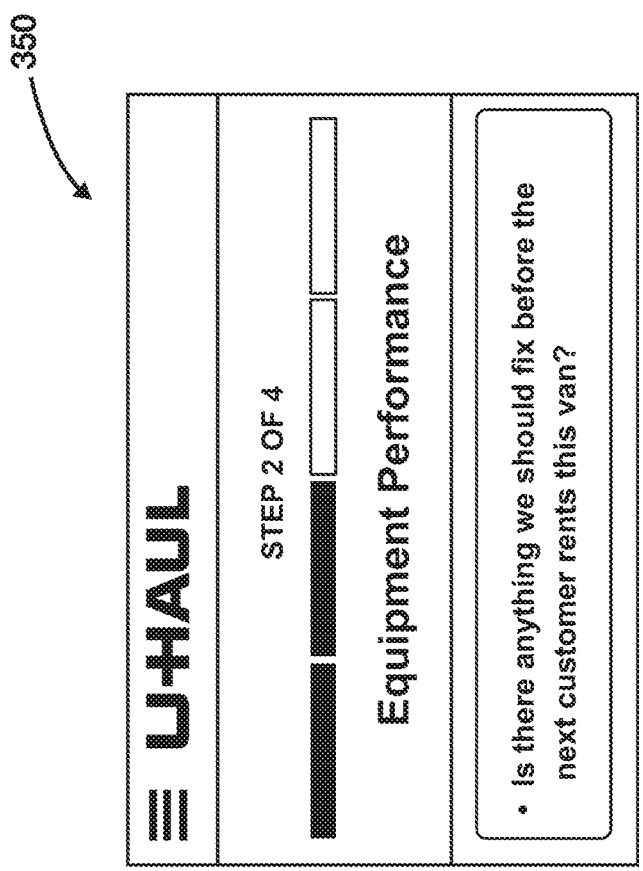
FIG. 46 shows an exemplary web page displayed on the screen of a customer's mobile device prompting the customer to complete any questions that the customer missed in responding to the in the vehicle questionnaires of FIG. 42-44.

Also during the return process, the customer can be required to answer questions regarding the rental vehicle being returned and the customer's experience. FIGS. 42-46 show exemplary vehicle questionnaire web pages 340 displayed on the screen of the mobile computer device 11 for this purpose. The web pages 340 include a questionnaire section 341 with a series of yes/no questions for the customer to answer and a continue button 348, which the customer can select to submit his or her responses. FIGS. 42 and 43 show an exemplary performance questionnaire web page 340a displayed on the mobile device 11 with such questions for a truck or van rental, and FIGS. 43 and 44 show such a web page 340b for a trailer rental. As shown in FIGS. 42 and 44, to prompt the customer to answer the questions, the equipment questionnaire section 341 can include a Yes button 342 and a No button 344 for each question. As shown in FIGS. 43 and 45, if the customer selects the Yes button 342 associated with an open ended question (such as "Is there anything we should fix before the next customer rents this vehicle?"), the mobile device 11 can open a text box 346 for the customer to enter a description of the problem that needs to be addressed. Also as shown in FIGS. 43 and 45, when the customer selects either a Yes button 342 or a No button 344 for a given question, the button 342, 344 will change in appearance, such as by turning green. After the customer has answered all of the questions, he or she can select the continue button 348 to store the responses for uploading to the rental management computer system 16 and to proceed with the return process. If the customer misses any of the questions, the system 16 can respond by sending an error message, such as the exemplary message shown in FIG. 46, prompting the customer to complete the missed question(s).

Figure 47:
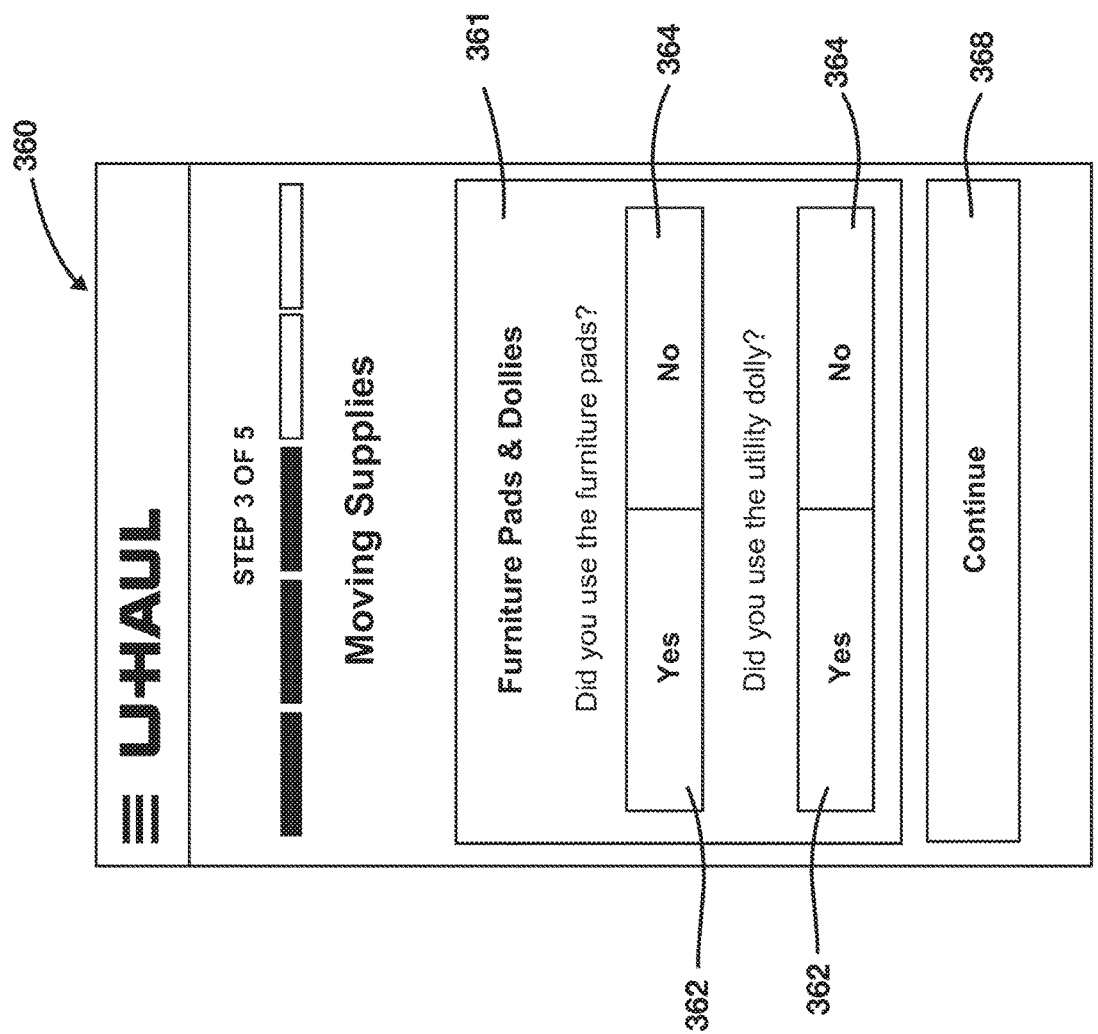
FIG. 47 shows an exemplary moving supplies web page displayed on the screen of a customer's mobile device requiring the customer to answer questions about moving supplies and equipment rented by the customer in connection with the rental of a truck.

During the return process, the system also can require the customer to answer questions about whether they used certain moving supplies and equipment during the rental of a vehicle. FIG. 47 shows an exemplary moving supplies questionnaire page 360 displayed on the screen of the mobile computer device 11 for this purpose for a truck rental. The questionnaire page 360 includes a questionnaire section 361, as well as a Yes button 362 and a No button 364 for each question, which operate similarly to the Yes and No buttons 343, 344 described above in connection with FIGS. 43 and 45. After the customer has answered all of the moving supplies questions, he or she can select a continue button 368 to store the responses for uploading to the rental management computer system 16 and to proceed with the return process. The system 16 can use these responses to determine any charges for the customer's use of the moving supplies and equipment.

Figure 48:
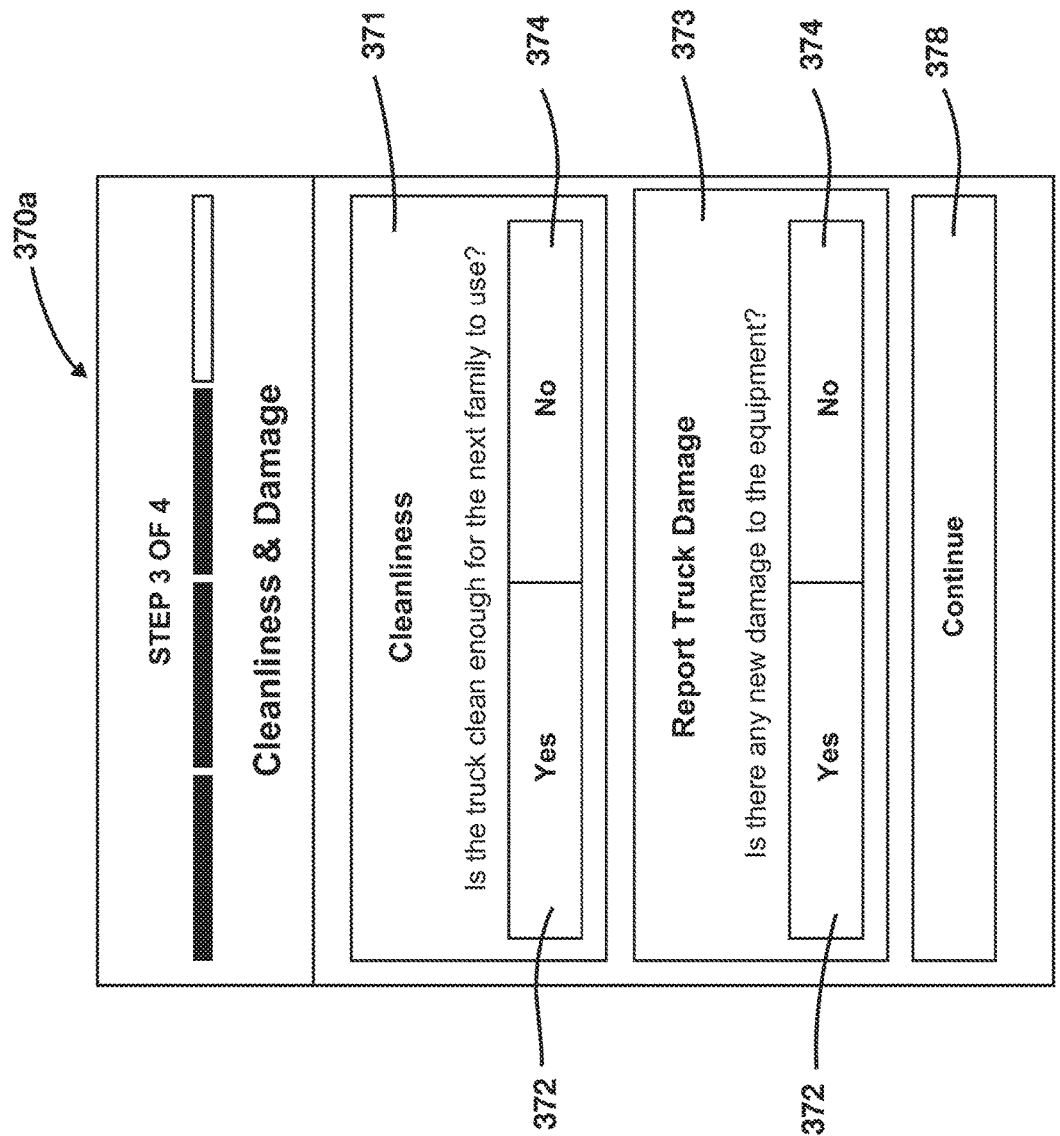
FIG. 48-52 show a series of exemplary damage report web pages displayed on the screen of a customer's mobile device for entering information during the return process regarding the cleanliness of and any new damage to a rental truck.
Figure 49:
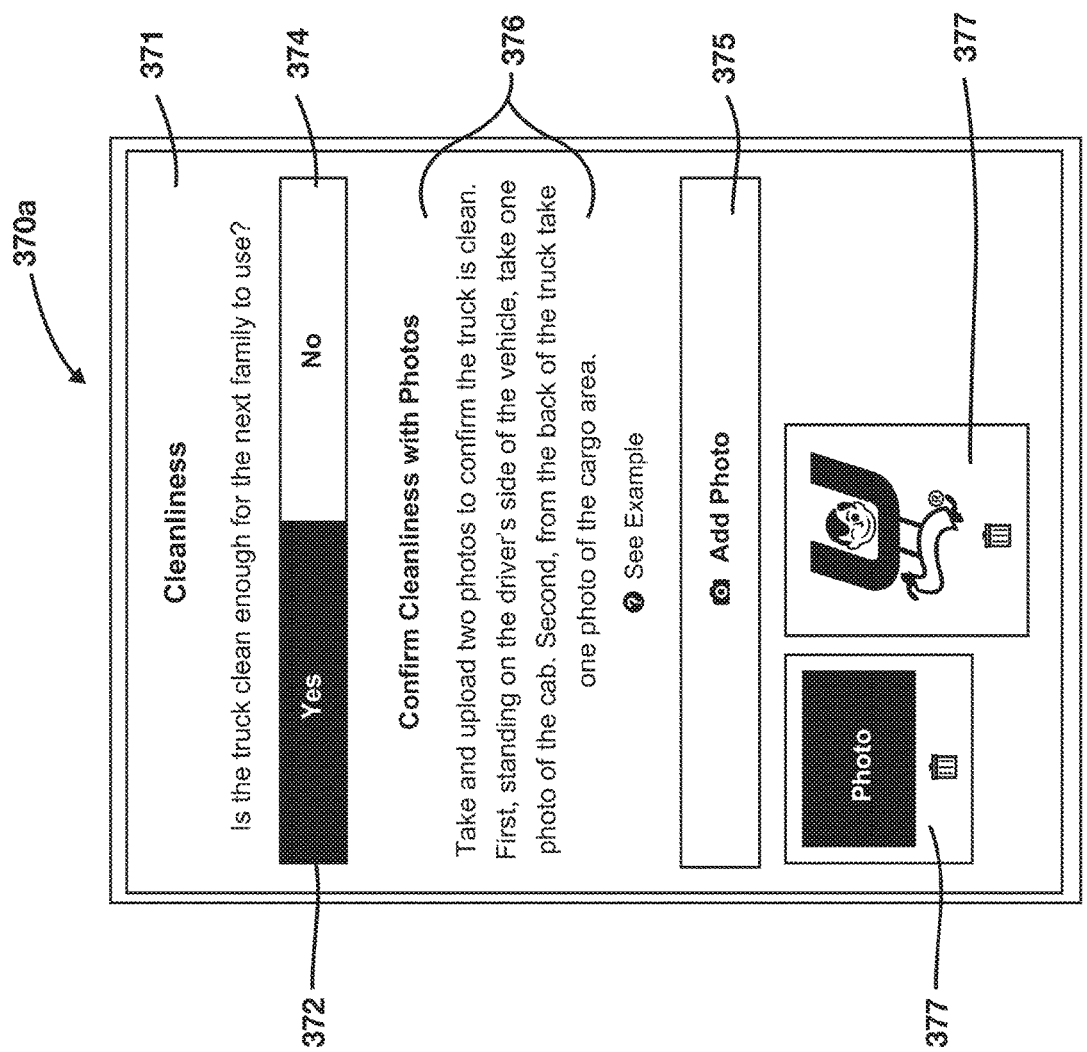
Figure 51:
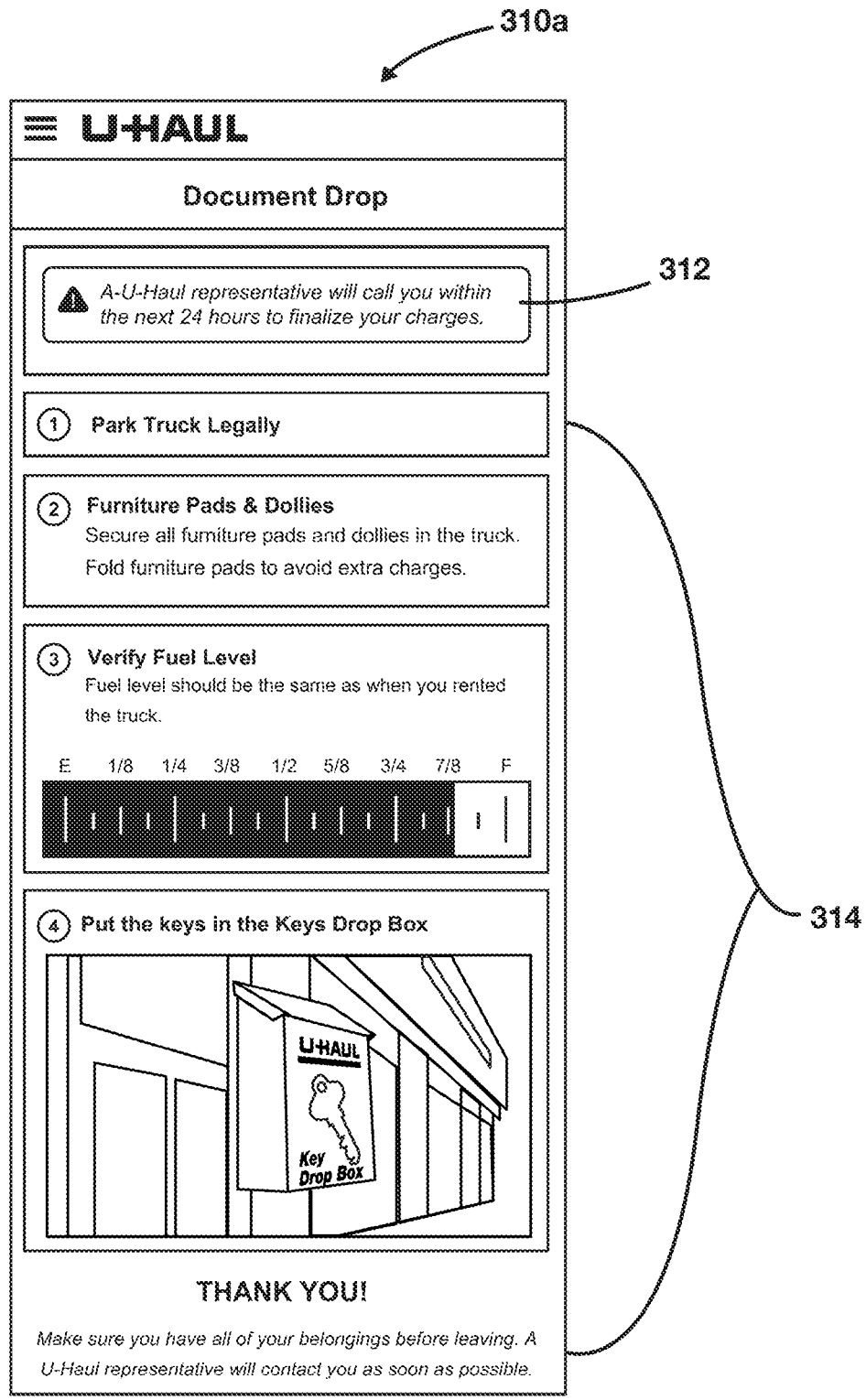
Figure 52:
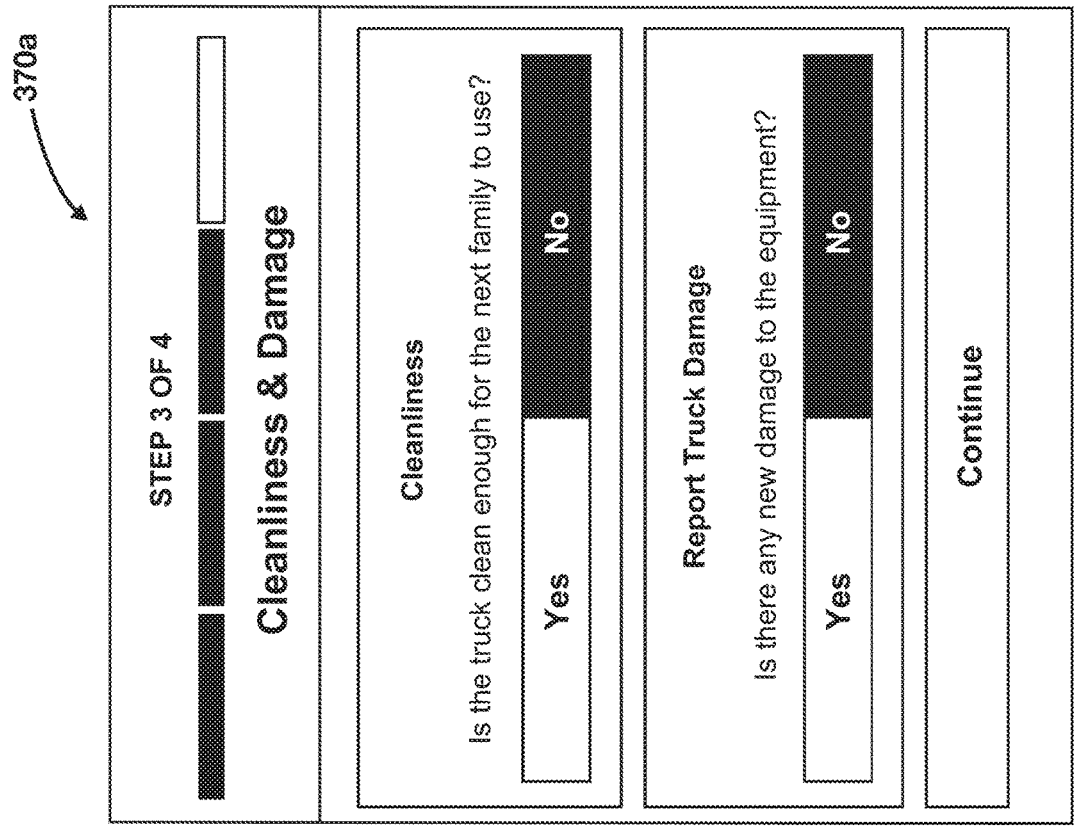
Figure 53:
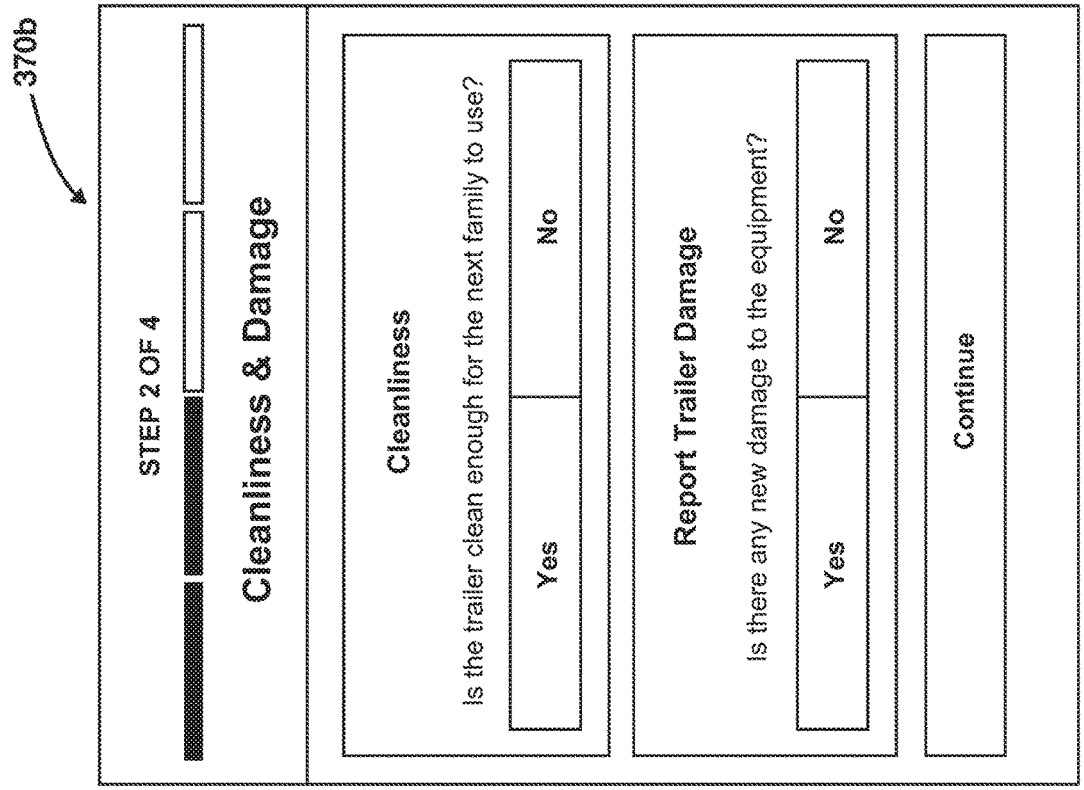

Also during the return process, the system can require the customer to use the mobile device 11 to enter information regarding the cleanliness of the rented vehicle and any new damage to the vehicle that occurred during the rental period. FIGS. 48-52 show the operation of exemplary cleanliness and damage questionnaire web pages 370a displayed on the screen of the mobile computer device 11 for this purpose for a truck or van rental. FIGS. 53-57 show the operation of such a web page 370b for a trailer rental. Referring to FIG. 48, the truck/van cleanliness and damage questionnaire web page 370a includes a cleanliness questionnaire section 371a that includes a question asking if the vehicle is clean and a damage report section 373a that includes a question whether there is any new damage to the vehicle. Each question includes associated Yes and No buttons 372, 374, which operate like those described above in connection with FIGS. 43 and 45. If the customer selects the Yes button 372 in response to the cleanliness question, the system 16 causes the mobile device 11 to prompt the customer to confirm that the vehicle is clean by uploading photographs of the vehicle cab and cargo area. After the customer has selected the Yes button 372, as shown in FIG. 49, the cleanliness questionnaire section 371a displays an Add Photo button 375 and instructions 376 to the customer to take pictures of the vehicle cab and the cargo area with the mobile computer device 11. For a trailer rental, the instructions 376 can direct the customer to take a picture of only the trailer bed. When the customer selects the Add Photo button 375, the mobile computer device 11 activates the camera 46 so that the customer can capture the requested images 377, which are also displayed in the cleanliness questionnaire section 371a for the customer to view. Referring again to FIG. 48, if the customer selects the No button 374 in response to the cleanliness question, as shown in FIG. 52, the system 16 will not prompt him or her to upload a photograph but will include a cleaning fee in the charges calculated at the end of the rental.

Figure 50:
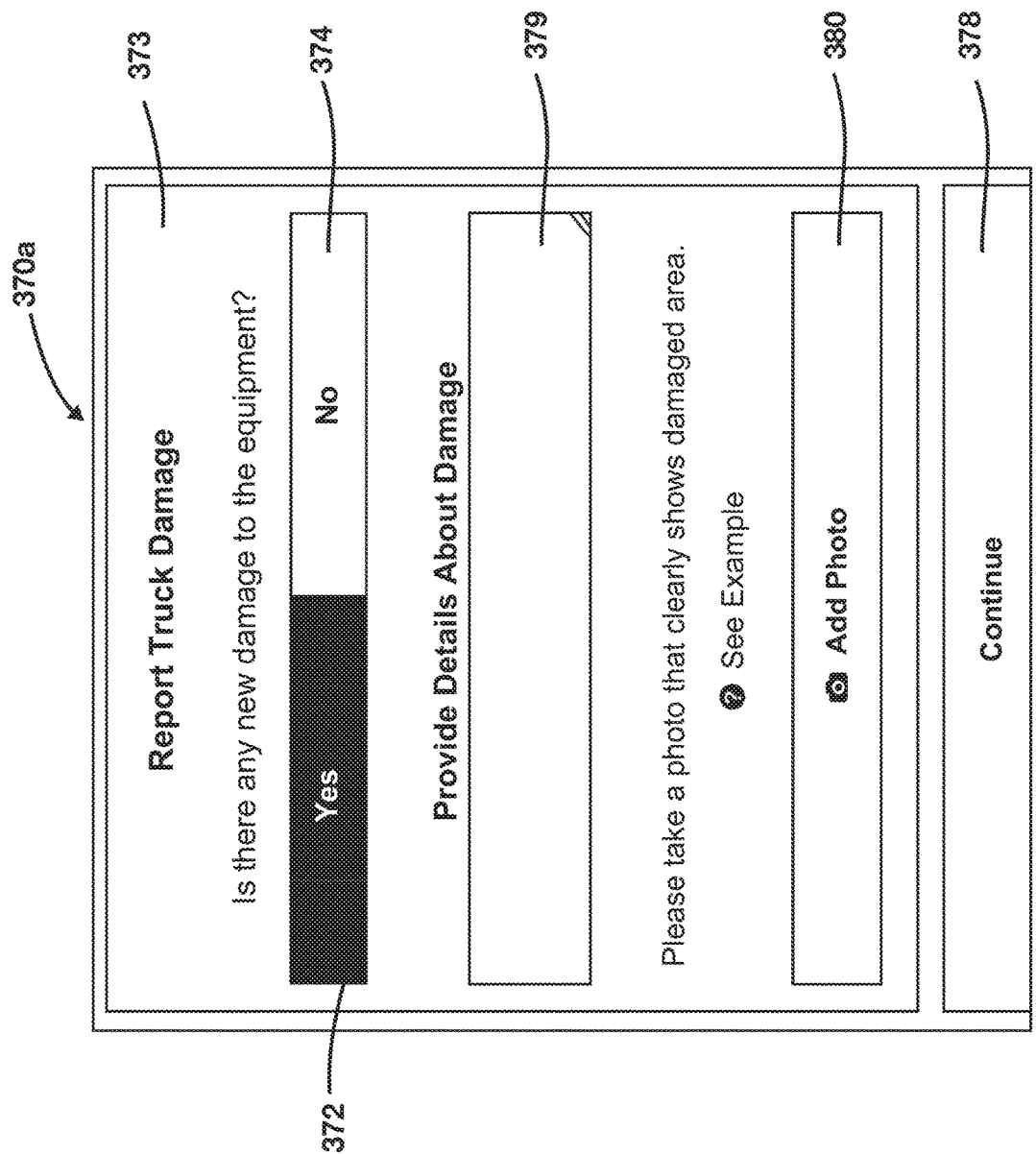

Again referring to FIG. 48, if the customer selects the Yes button 372 in response to the new damage question, as shown in FIG. 50, the mobile device 11 prompts the customer to describe the damage in a text field 379 and to display an Add Photo button 380 with instructions to take pictures of the damaged area with the mobile device 11 for uploading to the system 16 in the same manner as previously described. If there has been no new damage to the vehicle during the rental period, the customer can select the No button 374 as shown in FIG. 52, to report to the rental management computer system 16 that there has been no new damage. If the customer selects the No button 374, the system 16 will not prompt him or her describe any damage or to upload a photograph.

Figure 56:
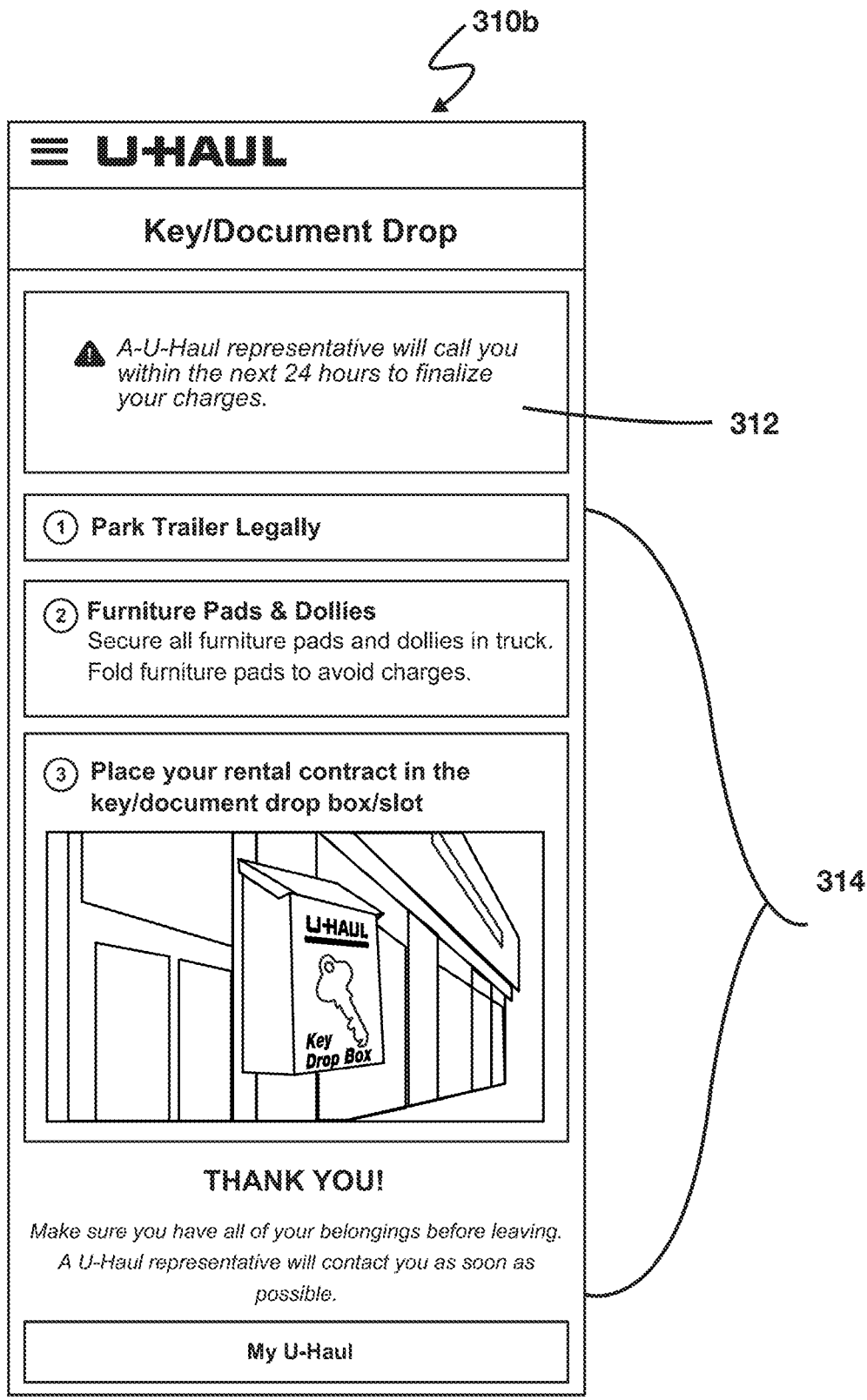
Figure 57:
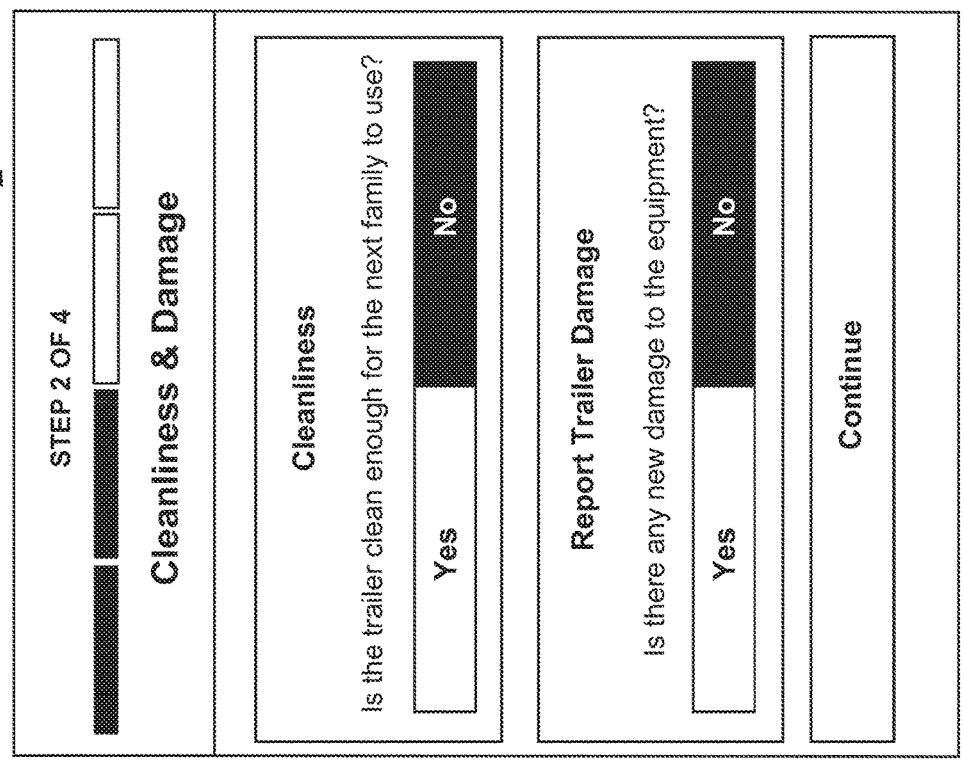
Figure 58:
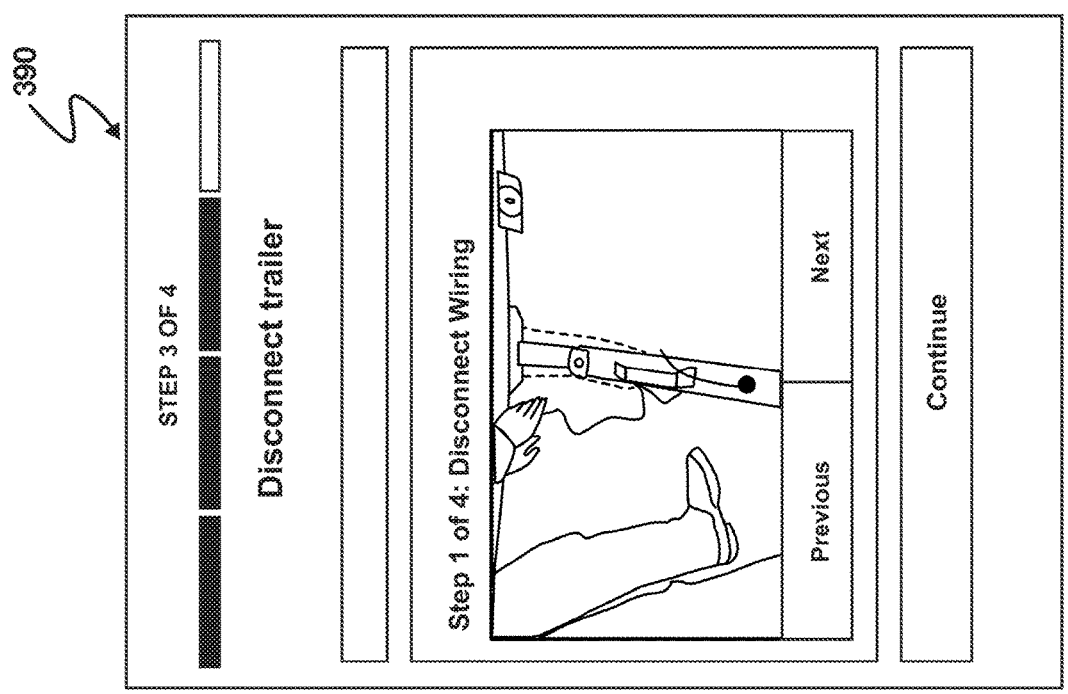
FIGS. 58-61 show a series of exemplary web pages displayed on the screen of a customer's mobile device for illustrating to the customer how to disconnect a rental trailer during the return process
Figure 59:
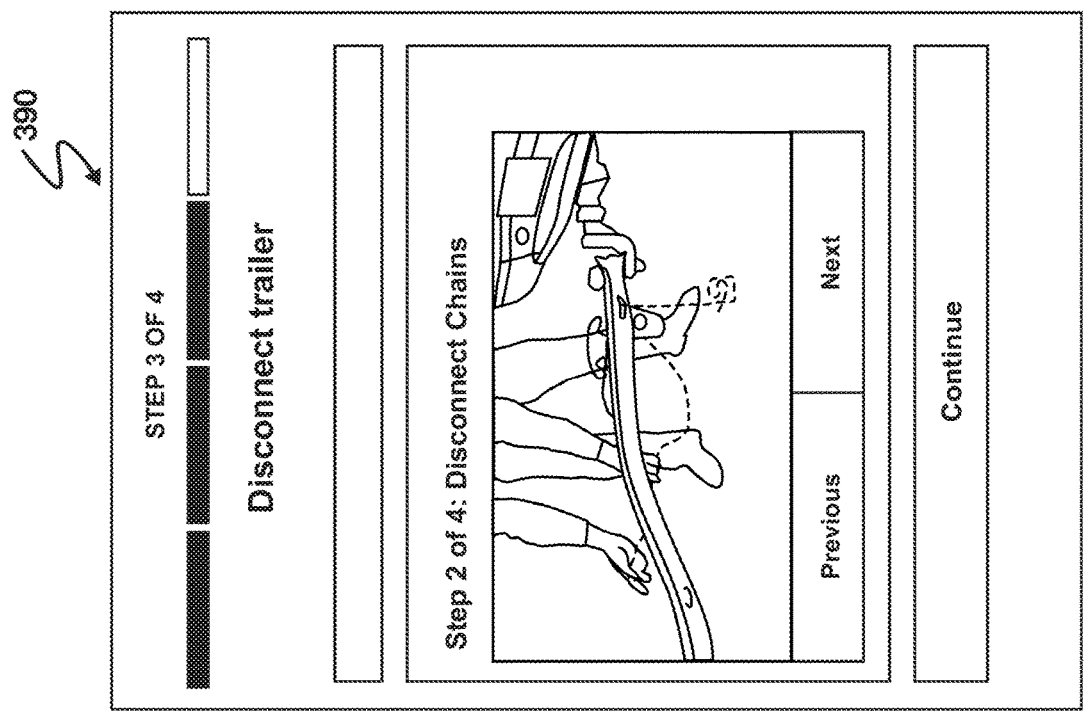
Figure 60:
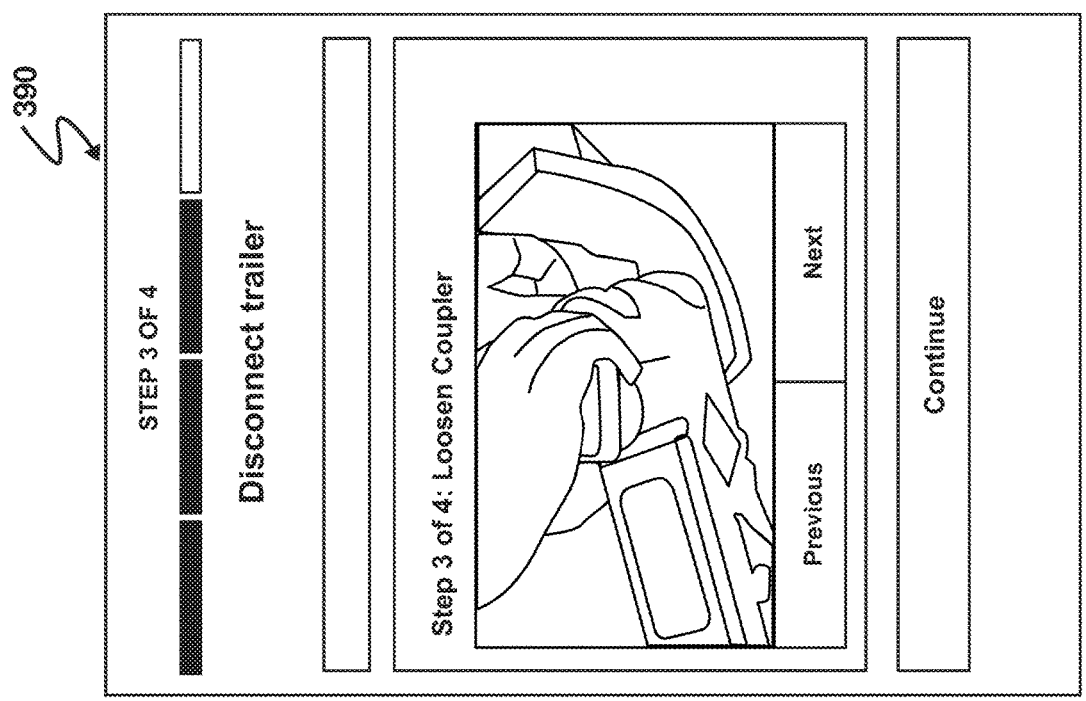
Figure 61:
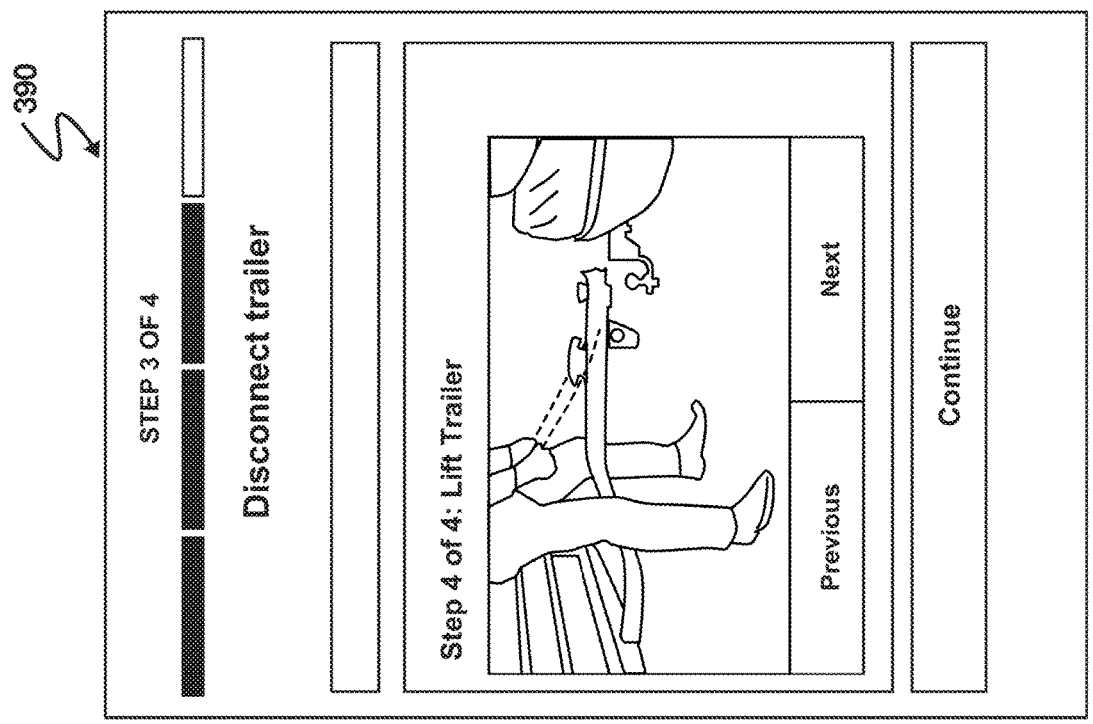

After the customer has completed the questions, the cleanliness and damage questionnaire web page 370a can prompt the customer to upload the cleanliness and damage information by selecting a continue button 378 to proceed with the return process. If the customer has reported new damage to the vehicle as described above, the system 16 will end the return process and prompt the customer to park the vehicle, verify the fuel level (for a truck or van) and place the keys (and documents) in the drop box at the return location. FIG. 51 shows an exemplary document drop web page 310 displayed on the screen of the mobile computer device 11 for this purpose for a truck or van rental. FIG. 56 shows an exemplary document drop web page 310b for a trailer rental. The document drop page 310 includes a message 312 informing the customer that a rental representative will contact them to finalize charges as well as reminders 314 about the appropriate steps for physically returning the rented vehicle. When the document drop page 310 is displayed, the system will end the return process and will keep the rental contract open and make the vehicle unavailable for another rental.

Figure 62:
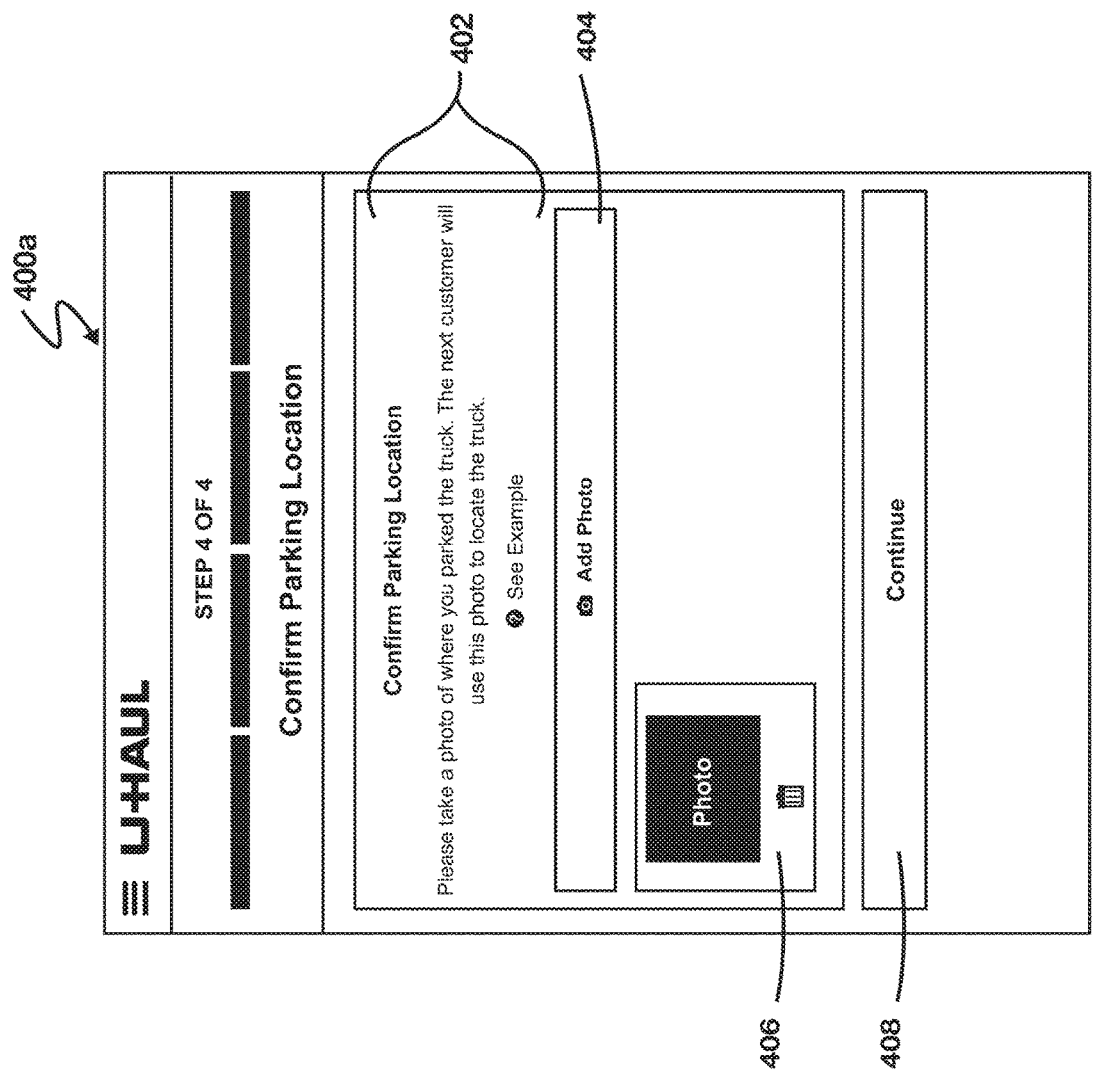
FIG. 62 shows an exemplary web page displayed on the screen of a customer's mobile device for confirming the parking location of a rental truck returned using the return process.
Figure 63:
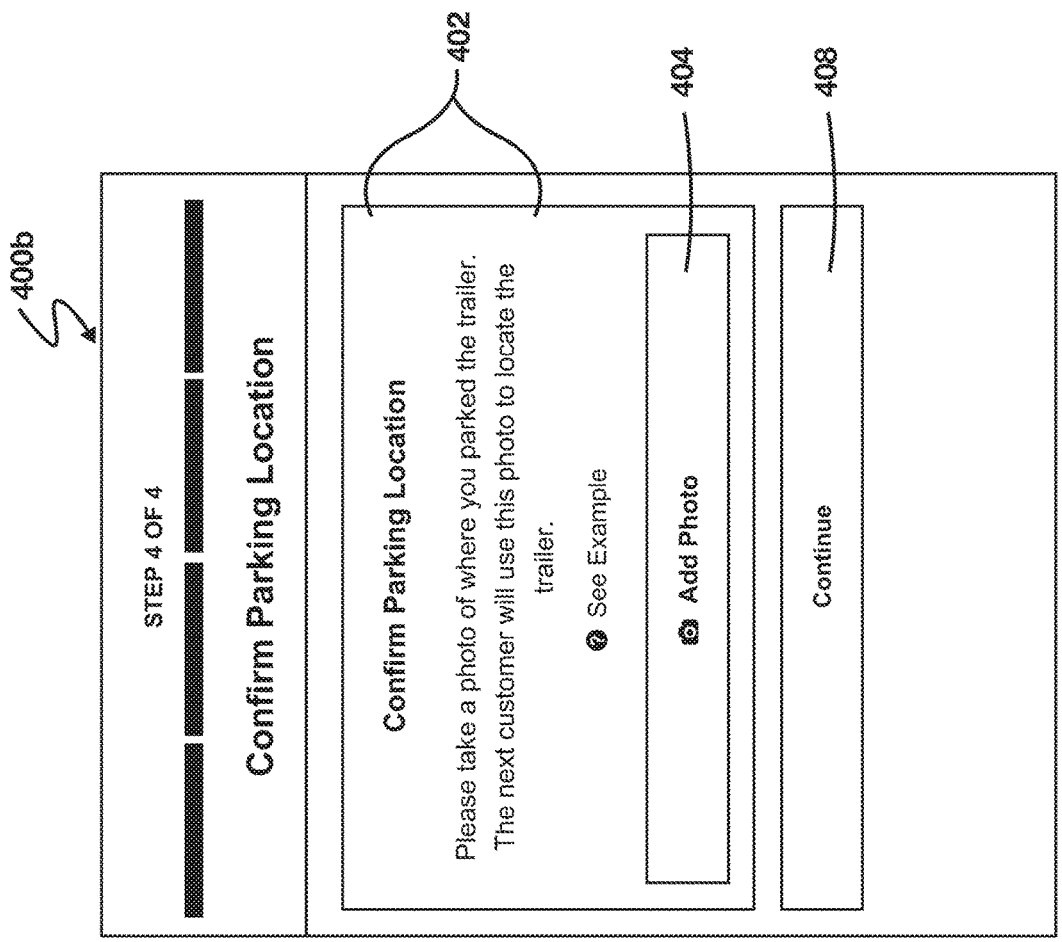
FIG. 63 shows an exemplary web page displayed on the screen of a customer's mobile device for confirming the parking location of a rental trailer returned using the return process.

For return of a trailer, the system 16 can send instructions to the customer's mobile device 11 for disconnecting the trailer. FIGS. 58-61 show a series of exemplary web pages displayed on the screen of a customer's mobile device for illustrating to the customer how to disconnect a rental trailer during the return process After the customer completes the steps of the return described above, the system 16 prompts him or her, via the mobile device 11, to confirm the parking location of the returned vehicle so that the next customer can locate the vehicle for pick-up. FIG. 62 shows an exemplary parking location confirmation web page 400a displayed on the screen of the mobile computer device 11 for this purpose for a truck or van rental. FIG. 63 shows another example of a parking location confirmation web page 400b for a trailer rental. As shown in FIGS. 62 and 63, the parking confirmation web page 400 displays an Add Photo button 404 and instructions 402 to the customer to take a picture of the parking location. When the customer selects the add photo button 404, the mobile computer device 11 activates the camera 46 so that the customer can capture the requested image 406, which is also displayed on the web page 400 for the customer to view. To upload the image 406 and proceed to the final step of the return process, the customer selects a continue button 408.

Figure 66:
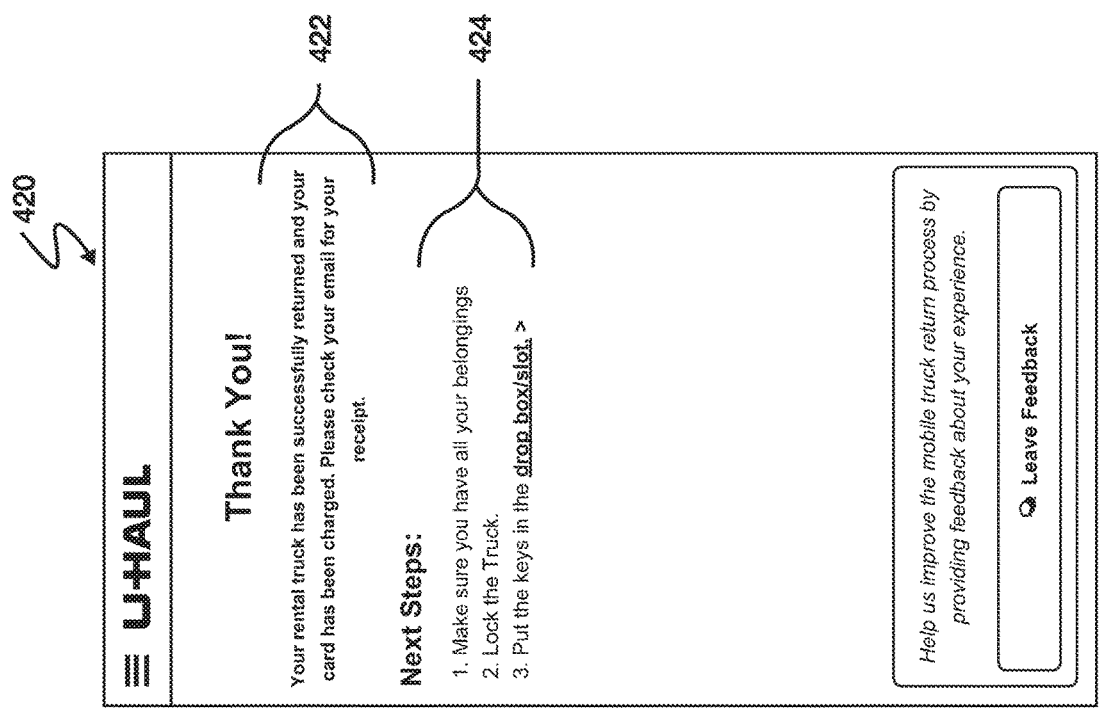
FIG. 66 shows an exemplary mobile version of a rental completion web page displayed on the screen of a customer's mobile device for notifying the customer that the return of a truck has been successfully completed.

In response, the rental management computer system 16 calculates the fees to be charged for the rental, and causes the mobile device to display these pending charges to the customer and to prompt the customer to approve final payment of charges. FIG. 63 shows an exemplary vehicle return summary page 410a served by the system 16 to the mobile device 11 for this purpose for a truck rental, and FIG. 64 shows an exemplary vehicle return summary page 410b for a trailer rental. The vehicle return summary page 410 displays the pending charges 412 as well as a payment menu 414 by which the customer can select the method for paying the charges (or receiving a refund). The vehicle return summary page 410 also displays a vehicle return button 416, which the customer can select to make final payment and to complete the return process. In response, as shown in the exemplary embodiments of FIGS. 66 and 67, the system 16 completes the return process by displaying a thank you page 420, which includes a message 422 to the customer that the vehicle has been successfully returned and the customer has been charged, as well as reminders 424 to the customer to lock the vehicle and place the keys (and documents) in the drop box at the return location. The system 16 then closes the rental contract.

Customer Verification Interface for Rental Personnel

Figure 68:
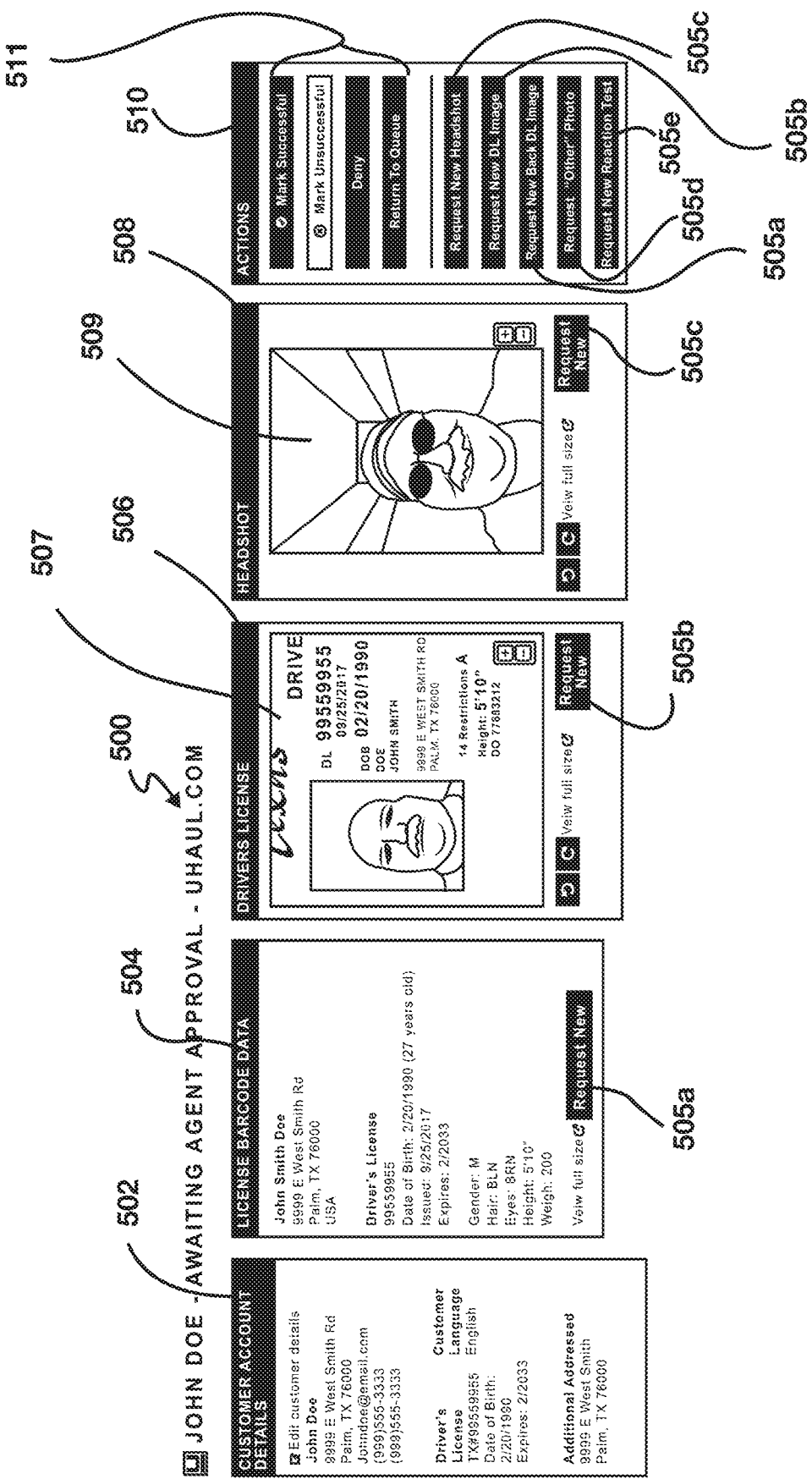
FIGS. 68A-68C show an exemplary embodiment of a verification approval web page displayed on a computer screen for use by rental personnel for verifying a rental customer according to the present invention.

FIGS. 68A-68C show an exemplary embodiment of a verification approval web page 500 displayed on a computer screen for use by rental personnel for verifying a rental customer according to the present invention. The rental personnel can use this web page 500 to view information stored in the database 30 relating to the customer, including simultaneously displaying and comparing the customer account details with the driver's license information and the customer's uploaded current photograph with his or her driver's license photograph. In one embodiment, the approval web page 500 displays a customer account details section 502, a license barcode data section 504, a driver's license section 506, a headshot photo section 508, an actions section 510, a reservation information section 512, another photo section 514, a customer history section 516, a text chat section 518, a customer history section 520 and a recent photos section 522.

As shown in FIG. 68A, the customer account details section 502 displays the details of the information stored by the system 16 and associated with the subject account, including the customer's full name, driver's license number, date of birth, and driver's license expiration date. This includes the information originally entered by the customer in the primary driver information section 161 of the checkout page 150b shown in FIG. 7. The license barcode data section 504 displays the information that has been decoded from the uploaded image of the driver's license barcode, as described above. As can be seen from FIG. 68A, displaying the customer account details section 502 near the license barcode data section 504 allows for easy visual comparison by rental personnel to confirm that the customer account information matches the corresponding information derived from the uploaded photograph of the customer's driver' license barcode. In the embodiment of FIG. 68A, the license barcode data section 504 also includes a request button 505a. When this button is selected, the system 16 automatically sends a message to the mobile device 11 requesting that the customer take and upload a new driver's license barcode image.

Still referring to FIG. 68A, the driver's license photo section 506 displays the driver's license photograph 507 that the customer has uploaded with the mobile device 11 during the dispatch process. The headshot photo section 508, displays the customer photograph 509 that the customer uploaded during the dispatch process. As can be seen from FIG. 68A, displaying the driver's license photo section 506 near the headshot photo section 508 allows for easy comparison by rental representative of the driver's license photograph 507 with the uploaded current customer photograph 509. Each of the driver's license photo section 506 and the headshot photo section 508 includes a request button 505b, 505c that can be selected to automatically send a message to the mobile device 11 requesting that the customer take and upload a driver's license photograph or current customer photograph, respectively.

Referring to FIGS. 68B and 68C, the reservation information section 512 of the verification approval web page 500 displays information about the rental contract, including reservation time period, the equipment dispatch location address, the hours of operation for that location and the local time for that location. The other photo section 514 includes information about other photographs requested by rental verification personnel as additional meaningful assurance described above, such as photographs of a utility bill, student identification, military identification, other customer photograph, or the like. The customer history section 516 includes information about the customer's prior rental history and verifications. The text chat section 518 includes a thread of text messages between the customer and the rental verification personnel and a message field that allows rental verification personnel to send a text message to the customer's mobile device 11. The history section 520 displays administrative events during the verification process, as can be seen in more detail in FIG. 68C. The displayed events can include, for example, the "Claimed" event when a rental verification representative is assigned to a session to review a customer's information, a "Viewed" event when the representative views the customer's information, and a "Returned to queue" event indicating when the representative has discontinued working on the session (e.g., for a break time) and the system has placed the customer back in the customer queue to allow another rental verification representative can take over the review. The recent photos section 522, includes thumbnail images of photographs stored in the database 30 that are associated with the customer, such as photographs uploaded during previous transactions with the customer, which thumbnails can be selected to view the related images in full size.

Referring again to FIG. 68A, the actions section 510 of the verification approval web page 500 includes selection buttons that allow rental personnel to direct the system 16 to take certain actions relating to the verification of the customer, such as additional instances of request buttons 505a-505c for requesting new photographs from the customer, a request button 505d for requesting photographs of additional meaningful assurance of the customer's identification or residence, as described above, and a request button 505e for requesting the customer to take a new reaction test. In addition, the actions section 510 include process action buttons 511 with which rental verification personnel can complete certain steps of the verification process, including marking the verification as successful, marking the process as unsuccessful, marking the verification as denied, and returning the customer to the queue. According to some embodiments of the system, the customer verification is marked as unsuccessful when concerns have been raised during the process such that the rental customer is not approved for the rental at the present time (e.g., failure to provide required or request information or a failed reaction test), but the customer may have an opportunity to address those concerns. If a verification is marked as unsuccessful, the system can allow the customer to step through the verification process once again on the same contract. In one preferred embodiment, if the verification is marked as denied, the system will not allow the customer to continue with the mobile device verification process for the rental reservation and will not allow the customer to use the mobile verification process for renting a vehicle for a defined period of time, such as for at least 12 hours.

Upon reading this disclosure, those skilled in the art will appreciate that various changes and modifications may be made to the preferred embodiments of the invention and that such changes and modifications may be made without departing from the spirit of the invention. Therefore, the invention in its broader aspects is not limited to the specific details, representative devices, and illustrative examples shown and described. Accordingly, departures may be made from such details without departing from the spirit or scope of the general inventive concept.

What is claimed is:

1. A method for mobile rental of vehicles, the method comprising:
   storing in a non-transitory computer database reservation information associated with a customer reservation of a rental vehicle to be dispatched from a rental pickup location at a scheduled pickup time, wherein the computer database is accessible by a rental management computer system;
   with the rental management computer system:

before the customer agrees to the terms and conditions of the rental, advising the customer that a mobile device will be required to pick up the rental vehicle;

before the customer picks up the rental vehicle:
- (i) causing the mobile device to display to the customer a user interface element to begin a process for picking up the rental vehicle, (ii) in response to the selection of the user interface element on the mobile device, causing the mobile device to share the mobile device GPS location information with the rental management computer system, and (iii) using the shared mobile device GPS location information to automatically confirm that the customer is at the rental pickup location;
- after confirming that the customer is at the rental pickup location, (i) causing the mobile device to display to the customer one or more interface elements to capture an image of the customer's driver's license and to upload the driver's license image to the rental management computer system, wherein the driver's license image includes a photograph of the customer, and (ii) causing the mobile device to display one or more interface elements to the customer to prompt the customer to, with the mobile device, capture a current image of the customer and upload the current image of the customer to the rental management computer system; and
- using the uploaded driver's license image, the uploaded current customer image and the reservation information to verify the identity of the customer before approving the customer to pick up the rental vehicle.

2. The method of claim 1 further comprising causing the mobile device to prompt the customer to include the customer's surroundings in the uploaded current image of the customer to show that the customer is physically present at the rental pickup location or near the rental vehicle.

3. The method of claim 1 wherein the step of causing the mobile device to display one or more interface elements to the customer to prompt the customer to capture a current image of the customer and to upload the current image of the customer comprises causing the mobile device to prompt the customer to use the mobile device to capture a current image of the customer holding the customer's driver's license and to upload the current image of the customer holding the customer's driver's license to the rental management computer system.

4. The method of claim 1 further comprising, after confirming that the customer is at the rental pickup location, also causing the mobile device to prompt the customer to use the mobile device to capture an image of a barcode on the customer's driver's license and to upload the barcode image to the rental management computer system for verifying the identity of the customer.

5. The method of claim 1 further comprising, after confirming that the customer is at the rental pickup location, causing the mobile device to prompt the customer to use the mobile device to capture an image of a secondary form of identification that includes a photograph of the customer and the customer's name and to upload the image of the secondary form of identification to the rental management computer system.

6. The method of claim 1 wherein the step of using the current uploaded driver's license image, the uploaded current customer image and the reservation information to verify the identity of the customer comprises comparing the photograph of the customer in the uploaded driver's license image to the uploaded current customer image and confirming that the location where the equipment is being dispatched is in the state that issued the customer's license.

7. The method of claim 1 further comprising, before the customer returns the rental vehicle to a contracted rental return location, with the rental management computer system prompting the customer via the mobile device to confirm that the customer is at the contracted rental return location, including (i) causing the mobile device to display to the customer a share location interface element for returning the rental vehicle, (ii) in response to the selection of the share location interface element on the mobile device, causing the mobile device to share the mobile device GPS location information with the rental management computer system, and (iii) using the shared mobile device GPS location information to automatically confirm that the customer is at the contracted rental return location.

8. The method of claim 1 further comprising, with the rental management computer system, associating with the uploaded current customer image a timestamp indicating when the customer image was uploaded.

9. The method of claim 1 further comprising, with the rental management computer system, storing meta data associated with the uploaded current customer image that indicates when the uploaded current customer image was created.

10. The method of claim 1 further comprising downloading to the mobile device from the rental management computer system stored fuel level and mileage information for the rental vehicle and causing the mobile device to prompt the customer to use the mobile device to capture one or more images of the mileage display or fuel level display of the rental vehicle and to send the one or more mileage or fuel level display images to the rental management computer system.

11. The method of claim 10 further comprising, if the downloaded fuel level and mileage information is not accurate, prompting the customer to manually input to the mobile device corrected fuel level and mileage information for the rental vehicle and to use the mobile device to upload the corrected fuel level and mileage information to the rental management computer system before driving the vehicle.

12. A rental management computer system for mobile rental of vehicles, the system comprising:
- a database operative to store reservation information associated with a customer reservation of a rental vehicle, wherein the reservation information includes a scheduled pickup time and pickup location for the rental vehicle;
- an input component of a website operative to receive information from a mobile device used by the customer, including image information and location information; and
- a processor in communication with the database and the input component of the website and operative to:
  - advise the customer, before the customer agrees to the terms and conditions of the rental, that a mobile device will be required to pick up the rental vehicle; and
  - after the customer makes the customer reservation confirm via the mobile device that the customer is at the rental pickup location, including being operative to (i) cause the mobile device to display to the customer a user interface element to begin a process for picking up the rental vehicle, (ii) in response to the selection of the user interface element on the mobile device, cause the mobile device to share the mobile device GPS location information with the rental management computer system, and (iii) use the shared mobile device GPS location information to automatically confirm that the customer is at the rental pickup location;

after confirmation that the customer is at the rental location, (i) to cause the mobile device to display one or more interface elements to the customer to capture an image of the customer's driver's license and to upload to the rental management computer system the driver's license image, wherein the driver's license image includes a photograph of the customer; and (ii) to cause the mobile device to display one or more interface elements to the customer to capture a current image of the customer and upload to the rental management computer system the current customer image; and an output component of the website operative with the processor to display the uploaded driver's license image, the uploaded current customer image and the stored reservation information to an operator to verify the identity of the customer before the customer is approved to pick up the rental vehicle.

13. The system of claim 12 wherein the processor is operative to confirm via the mobile device that the customer is at the rental pickup location by prompting the customer to include in the uploaded current customer image the customer's surroundings showing that the customer is physically present at the rental location or near the rental vehicle.

14. The system of claim 12 wherein the current customer image comprises an image of the customer holding the customer's driver's license.

15. The system of claim 12 wherein the processor is further operative to cause the mobile device to prompt the customer to use the mobile device to capture an image of a barcode on the customer's driver's license and to upload the barcode image to the rental management computer system.

16. The system of claim 12 wherein the processor is further operative to cause the mobile device to prompt the customer to use the mobile device to capture an image of a secondary form of identification that includes a photograph associated with the customer's name.

17. The system of claim 12 wherein the output component is further operative to display the uploaded driver's license image and the uploaded current customer image to allow an operator to compare the photograph of the customer in the uploaded driver's license image to the uploaded current customer image and to display information that the operator can use to confirm that the location where the equipment is being dispatched is in the state that issued the customer's license.

18. The system of claim 12 wherein the processor is further operative to cause the mobile device to prompt the customer to confirm via the mobile device that the customer is at a contracted rental return location before the customer returns the rental vehicle including being operative to (i) cause the mobile device to display to the customer a share location interface element for returning the rental vehicle, (ii) in response to the selection of the share location interface element on the mobile device, cause the mobile device to share the mobile device GPS location information with the rental management computer system, and (iii) use the shared mobile device GPS location information to automatically confirm that the customer is at the contracted rental return location.

19. The system of claim 12 wherein the processor is further operative to download to the mobile device fuel level and mileage information for the rental vehicle and to cause the mobile device to prompt the customer to capture one or more images of the fuel level or mileage displays of the rental vehicle for confirming the accuracy of the downloaded fuel level and mileage information and to send the captured image information to the rental management computer system.

20. The system of claim 19 wherein the processor is further operative, if the downloaded fuel level and mileage information is not accurate, to cause the mobile device to prompt the customer to manually input to the mobile device corrected fuel level and mileage information for the rental vehicle and to use the mobile device to upload the corrected fuel level and mileage information to the rental management computer system before driving the vehicle.

21. The method of claim 7 wherein using the shared mobile device GPS location information to automatically confirm that the customer is at the contracted rental return location includes confirming that the customer is at the contracted rental return location if the mobile device location is within a pre-defined minimum distance from the contracted rental return location.

22. The system of claim 18 wherein the processor is operative to automatically confirm that the customer is at the contracted rental return location if the mobile device location is within a pre-defined minimum distance from the contracted rental return location.

* * * * *